US007157511B2

United States Patent
Bobsein et al.

(10) Patent No.: US 7,157,511 B2
(45) Date of Patent: Jan. 2, 2007

(54) PHOSPHITE ADDITIVES IN POLYOLEFINS

(75) Inventors: Rex L. Bobsein, Bartlesville, OK (US); Bryan E. Hauger, Bartlesville, OK (US); William R. Coutant, Stillwater, OK (US); John Rathman, Bartlesville, OK (US)

(73) Assignee: Chevron PhillipsChemical Company LP

( * ) Notice: Subject to any disclaimer, the term of this patent is extended or adjusted under 35 U.S.C. 154(b) by 436 days.

(21) Appl. No.: 10/719,940

(22) Filed: Nov. 21, 2003

(65) Prior Publication Data

US 2005/0113494 A1 May 26, 2005

(51) Int. Cl.
*C08K 5/527* (2006.01)

(52) U.S. Cl. ........................ 524/128; 524/151; 524/153

(58) Field of Classification Search ................ 524/128, 524/151, 153
See application file for complete search history.

(56) References Cited

U.S. PATENT DOCUMENTS

| | | | |
|---|---|---|---|
| 3,219,622 A | 11/1965 | Luciano et al. | |
| 4,116,926 A | 9/1978 | York | |
| 4,290,941 A | 9/1981 | Zinke et al. | |
| 4,341,880 A | 7/1982 | Toyada et al. | |
| 4,371,647 A | 2/1983 | Mingawa et al. | |
| 4,504,615 A | 3/1985 | Mills | |
| 4,590,231 A | 5/1986 | Seltzer et al. | |
| 4,824,885 A | 4/1989 | Magni et al. | |
| 4,957,956 A | 9/1990 | Neri et al. | |
| 5,023,285 A | 6/1991 | Horn | |
| 5,106,892 A | 4/1992 | Chiolle et al. | |
| 5,225,526 A | 7/1993 | Fukawa et al. | |
| 5,250,593 A * | 10/1993 | Ishii et al. | 524/100 |
| 5,438,086 A | 8/1995 | Stevenson et al. | |
| 6,096,811 A * | 8/2000 | Amos et al. | 524/89 |
| 6,224,791 B1 * | 5/2001 | Stevenson et al. | 252/589 |
| 6,613,823 B1 * | 9/2003 | Battiste et al. | 524/127 |
| 6,770,693 B1 * | 8/2004 | Stein et al. | 524/128 |
| 6,992,124 B1 * | 1/2006 | Wick et al. | 524/100 |
| 2003/0158306 A1 * | 8/2003 | Battiste et al. | 524/128 |
| 2005/0288403 A1 * | 12/2005 | de la Cruz et al. | 524/99 |

OTHER PUBLICATIONS

Klender et al., "Further Studies . . . Polyolefins," ANTEC Conference, Baton Rouge, Louisiana, pp. 225-245 (1985).
Zahalka, H. et al., "Advances in Polyethylene Stabilization" (General Electric Specialty Chemicals Polyolefins Conference—Houston, TX) [Feb. 26, 2003].

* cited by examiner

*Primary Examiner*—Peter Szekely

(57) ABSTRACT

The whiteness and stability after processing of a polyolefin have been found to be improved upon the addition of a combination of at least one high activity phosphite and at least one hydrolytically stable phosphite.

50 Claims, 30 Drawing Sheets

PHOSPHITE ADDITIVES IN POLYOLEFINS

FIELD OF INVENTION

This invention is related to the field of polyolefins. Particularly, this invention relates to the field of phosphite additives in polyolefins, methods of making such polyolefins, methods of using such polyolefins, and polyolefin compositions.

BACKGROUND OF THE INVENTION

Polymers are used in a variety of diverse applications. For example, such applications include food packaging, electronic components, automobile parts, fibers and fabrics, and medical equipment. Polymers could not perform such diverse functions without the assistance of a very broad range of polymer additives. Without additives, polymers can degrade during processing and over time can lose impact strength, discolor, and become embrittled. Additives not only overcome these and other limitations, but also can impart improved performance properties to the final product.

One type of additive is antioxidants which usually are used to retard the oxidative degradation of polymers. Degradation can be initiated when free radicals, highly reactive species with an unpaired electron, are created in polymers by heat, ultraviolet radiation, mechanical shear, and/or metallic impurities. It is believed when a free radical is formed, a chain reaction can begin that initiates polymeric oxidation. Subsequent reaction of the radical with an oxygen molecule can yield a peroxy radical, which then can react with an available hydrogen atom to form an unstable hydroperoxide and another free radical. In the absence of an antioxidant, these reactions can become self-propagating and can lead to polymer degradation.

There are two basic types of antioxidants, primary and secondary antioxidants. It is believed that primary antioxidants can intercept and stabilize free radicals by donating active hydrogen atoms. It also is believed that secondary antioxidants can prevent formation of additional free radicals by decomposing unstable hydroperoxides into a stable product. When primary antioxidants, such as hindered phenols, are utilized, polymers can have a more yellow color than unstabilized polymers, therefore decreasing the commercial value of polymers. Secondary antioxidants, such as phosphite compounds, often are utilized to increase the stability and whiteness of polymers.

Unfortunately, phosphite additives also can create difficulties in polymer production and applications and cause a deleterious effect on polymer stability and color. First, some phosphite additives can cause polymer clumping and can be difficult to feed into the polymer production process. Some phosphites are hydrolytically unstable and can react with water resulting in a lower active phosphite concentration for stabilizing polymers. Applications employing phosphite additives can result in a reduced quality in the physical properties of polyolefins. Accordingly, there is a need in the polyolefin industry for a phosphite additive product that increases polymer stability and improves the whiteness of polymers.

SUMMARY OF THE INVENTION

The present invention is directed to olefin homopolymer and copolymer compositions and methods of making and using such compositions which have at least two specific phosphites. Due to the presences of these phosphites, polyolefins are produced having improved color and stability over polyolefins containing only one of the two phosphites, even when an ultraviolet absorber or light stabilizer is present in the composition. The composition of the present invention comprises a polyolefin; a first high activity phosphite, such as an arylalkyl diphosphite having a formula,

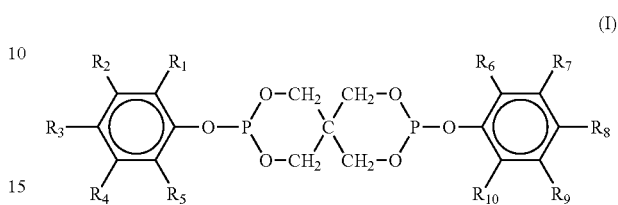

(I)

and a hydrolytically stable phosphite comprising a triarylphosphite having a formula,

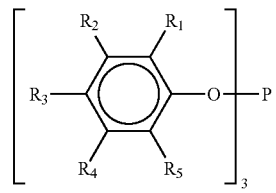

The various "R" moieties are defined below.

In accordance with the present invention, a composition of matter is formed by combining components comprising:
a) a polyolefin;
b) at least one high activity phosphite comprising an arylalkyl diphosphite having a formula,

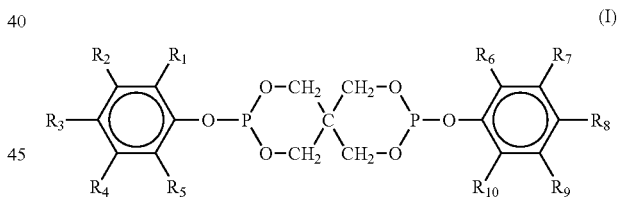

(I)

wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, and/or cycloaliphatic organic radicals having from about 1 to about 20 carbon atoms per radical;
c) at least one hydrolytically stable phosphite comprising a triarylphosphite having a formula:

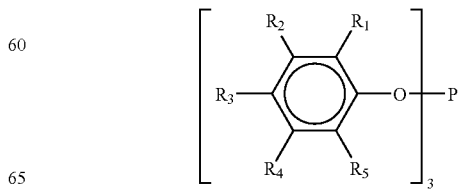

wherein $R_1$, $R_2$, $R_3$, $R_4$, and $R_5$, are selected from hydrogen or straight-chained or branched, cyclic or acyclic, aromatic or aliphatic, and mixed aliphatic, aromatic, and/or cycloaliphatic organic radicals having from about 1 to about 20 carbon atoms per radical;

d) optionally, a primary polymer stabilizer;
e) optionally, an acid scavenger;
f) optionally, an inorganic base, Lewis base, or aliphatic amine;
g) optionally, water; and
h) optionally, a hindered amine.

The at least one high activity phosphite and the at least one hydrolytically stable phosphite are present in the composition in respective amounts sufficient to raise the Phillips Color Number (PE #) with processing to a value greater than the PE # of a composition formed by combining like amounts of the polyolefin, the high activity phosphite, a hindered phenol, water, and an acid scavenger.

In another aspect of the present invention, a composition is formed by combining the following components:

a) a polyolefin selected from homopolymers of one mono-1-olefin having from about 2 to about 10 carbon atoms per molecule or copolymers of at least 2 different mono-1-olefins having about 2 to about 10 carbon atoms per molecule;
b) a high activity phosphite comprising an arylalkyl diphosphite having a formula,

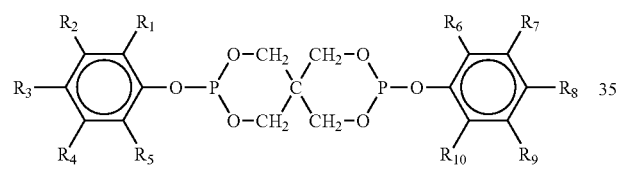

(I)

wherein $R_2$, $R_4$, $R_5$, $R_7$, $R_9$, and $R_{10}$ are hydrogen and $R_1$, $R_3$, $R_6$, and $R_8$ are mixed aliphatic and aromatic organic radicals having from about 1 to about 20 carbon atoms per radical;
c) a hydrolytically stable phosphite comprising a triarylphosphite having a formula,

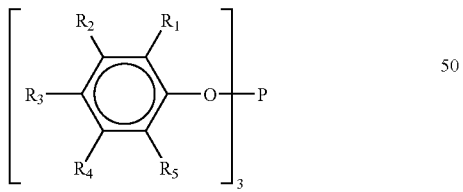

wherein $R_2$, $R_4$, and $R_5$ in the triarylphosphite are hydrogen and $R_1$ and $R_3$ are selected from straight-chained or branched organic radicals having from about 1 to about 20 carbon atoms per radical, the high activity phosphite and the hydrolytically stable phosphite being present in a total phosphite amount within a range of about 50 mg/kg to about 20,000 mg/kg based on the mass of the neat polyolefin;
d) optionally, another arylalkyl diphosphite of formula (I), wherein $R_2$, $R_4$, $R_5$, $R_7$, $R_9$, and $R_{10}$ in the another arylalkyl diphosphite are hydrogen and $R_1$, $R_3$, $R_6$, and $R_8$ are selected from straight-chained or branched organic radicals having from about 1 to about 20 carbon atoms per radical;
e) optionally, a hindered phenol in an amount within a range of about 50 mg/kg to about 5000 mg/kg based on the mass of the neat polyolefin;
f) optionally, water in an amount within a range of 1 mg/kg to about 5000 mg/kg based on the mass of the neat polyolefin;
g) optionally, a hindered amine in an amount within a range of about 50 mg/kg to about 5,000 mg/kg based on the mass of the neat polyolefin;
h) optionally, triisopropanolamine in an amount within a range of about 0.25 mg/kg to about 100 mg/kg based on the mass of the neat polyolefin; and
i) optionally, an acid scavenger in an amount within a range of about 1.25 mg/kg to about 500 mg/kg based on the mass of the neat polyolefin.

Yet, in another aspect of the present invention, a process is described comprising blending:

a) a polyolefin;
b) a high activity phosphite comprising an arylalkyl diphosphite having a formula,

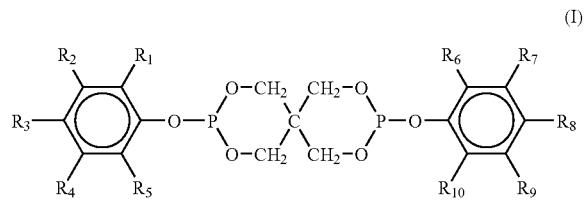

(I)

wherein $R_1$, $R_2$, $R_3$, $R_4$, $R_5$, $R_6$, $R_7$, $R_8$, $R_9$, and $R_{10}$ can be the same or different and are selected from hydrogen or straight chained or branched, cyclic or acyclic, aromatic or aliphatic, and mixed aliphatic, aromatic, or cycloaliphatic organic radicals having from about 1 to about 20 carbon atoms per radical;
c) a hydrolytically stable phosphite comprising a triarylphosphite having a formula,

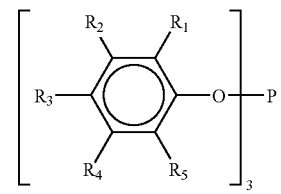

wherein $R_1$, $R_2$, $R_3$, $R_4$, and $R_5$ are selected from hydrogen or straight chained or branched, cyclic or acyclic, aromatic or aliphatic, and mixed aliphatic, aromatic, or cycloaliphatic organic radicals having from about 1 to about 20 carbon atoms per radical;
d) optionally, another arylalkyl diphosphite of formula (I), wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, and/or cycloaliphatic organic radicals having from about 1 to about 20 carbon atoms per radical, which is different from the high activity phosphite;

e) optionally, a hindered phenol;
f) optionally, water;
g) optionally, an acid scavenger;
h) optionally, a hindered amine; and
i) optionally, triisopropanolamine.

Still, in another aspect of the present invention, a process is described to improve the melt stability upon recycle of a polyolefin which comprises blending:
a) a polyolefin;
b) a high activity phosphite comprising an arylalkyl diphosphite having a formula,

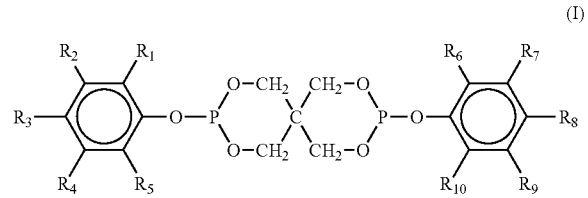

(I)

wherein $R_1$, $R_2$, $R_3$, $R_4$, $R_5$, $R_6$, $R_7$, $R_8$, $R_9$, and $R_{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;
c) a hydrolytically stable phosphite comprising a triarylphosphite having a formula,

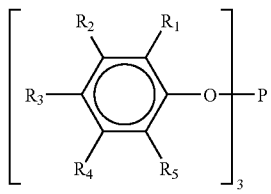

wherein $R_1$, $R_2$, $R_3$, $R_4$, and $R_5$ are selected from hydrogen or straight-chained or branched, cyclic or acyclic, aromatic or aliphatic, and mixed aliphatic, aromatic, or cycloaliphatic organic radicals having from about 1 to about 20 carbon atoms per radical;
d) optionally, another arylalkyl diphosphite of formula (I), wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, or cycloaliphatic organic radicals having from about 1 to about 20 carbon atoms per radical, which is different from the high activity phosphite;
e) optionally, a hindered amine in an amount within a range of about 50 mg/kg to about 5,000 mg/kg based on the mass of the neat polyolefin;
f) optionally, triisopropanolamine in an amount within a range of about 0.25 mg/kg to about 100 mg/kg based on the mass of the neat polyolefin;
g) optionally, a hindered phenol;
h) optionally, water; and
i) optionally, an acid scavenger.

Further, in accordance with the present invention, a process to improve the Phillips Color Number or whiteness index of a polyolefin comprises blending:

a) a polyolefin;
b) a high activity phosphite comprising an arylalkyl diphosphite having a formula,

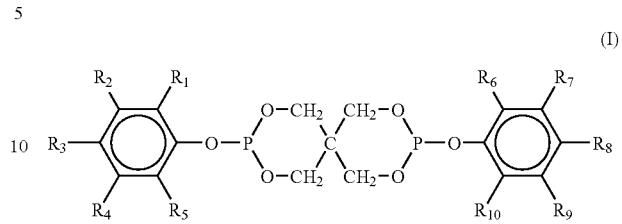

(I)

wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, or cycloaliphatic organic radicals having from about 1 to about 20 carbon atoms per radical;
c) a hydrolytically stable phosphite comprising a triarylphosphite having a formula,

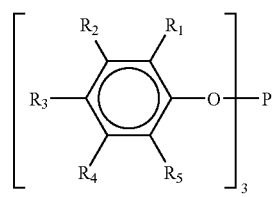

wherein $R_1$, $R_2$, $R_3$, $R_4$, and $R_5$ are selected from hydrogen or straight-chained or branched, cyclic or acyclic, aromatic or aliphatic, and mixed aliphatic, aromatic, or cycloaliphatic organic radicals having from about 1 to about 20 carbon atoms per radical;
d) optionally, another arylalkyl diphosphite of formula (I), wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, or cycloaliphatic organic radicals having from about 1 to about 20 carbon atoms per radical, which is different from the high activity phosphite;
e) optionally, a hindered amine in an amount within a range of about 50 mg/kg to about 5,000 mg/kg based on the mass of the neat polyolefin;
f) optionally, triisopropanol amine in an amount within a range of about 0.25 mg/kg to about 100 mg/kg based on the mass of the neat polyolefin;
g) optionally, a hindered phenol;
h) optionally, water; and
i) optionally, an acid scavenger.

The processes of the present invention mentioned above and described in detail below employ a blending procedure which includes mixing, pelletizing, extruding, and any combination thereof.

Even further, in another aspect of the present invention, an article of manufacture is prepared from a polymer produced by a process comprising blending:
a) a polyolefin;
b) a high activity phosphite comprising an arylalkyl diphosphite having a formula,

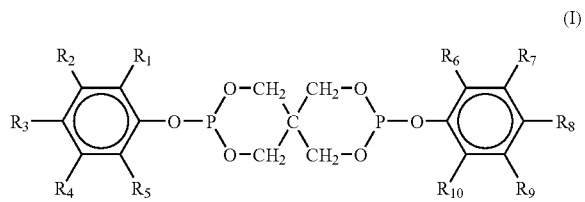

(I)

wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, or cycloaliphatic organic radicals having from about 1 to about 20 carbon atoms per radical;

c) a hydrolytically stable phosphite comprising a triarylphosphite having a formula,

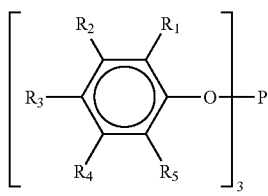

wherein $R^1$, $R^2$, $R^3$, $R^4$, and $R^5$ are selected from hydrogen or straight-chained or branched, cyclic or acyclic, aromatic or aliphatic, and mixed aliphatic, aromatic, and/or cycloaliphatic organic radicals having from about 1 to about 20 carbon atoms per radical;

d) optionally, a second arylalkyl diphosphite of formula (I), wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, or cycloaliphatic organic radicals having from about 1 to about 20 carbon atoms per radical, which is different from the high activity phosphite;

e) optionally, a hindered amine in an amount within a range of about 50 mg/kg to about 5,000 mg/kg based on the mass of the neat polyolefin;

f) optionally, triisopropanolamine in an amount within a range of about 0.25 mg/kg to about 100 mg/kg based on the mass of the neat polyolefin;

g) optionally, a hindered phenol;

h) optionally, water; and i) optionally, an acid scavenger.

DETAILED DESCRIPTION OF INVENTION

Polyolefins

Figure 1:
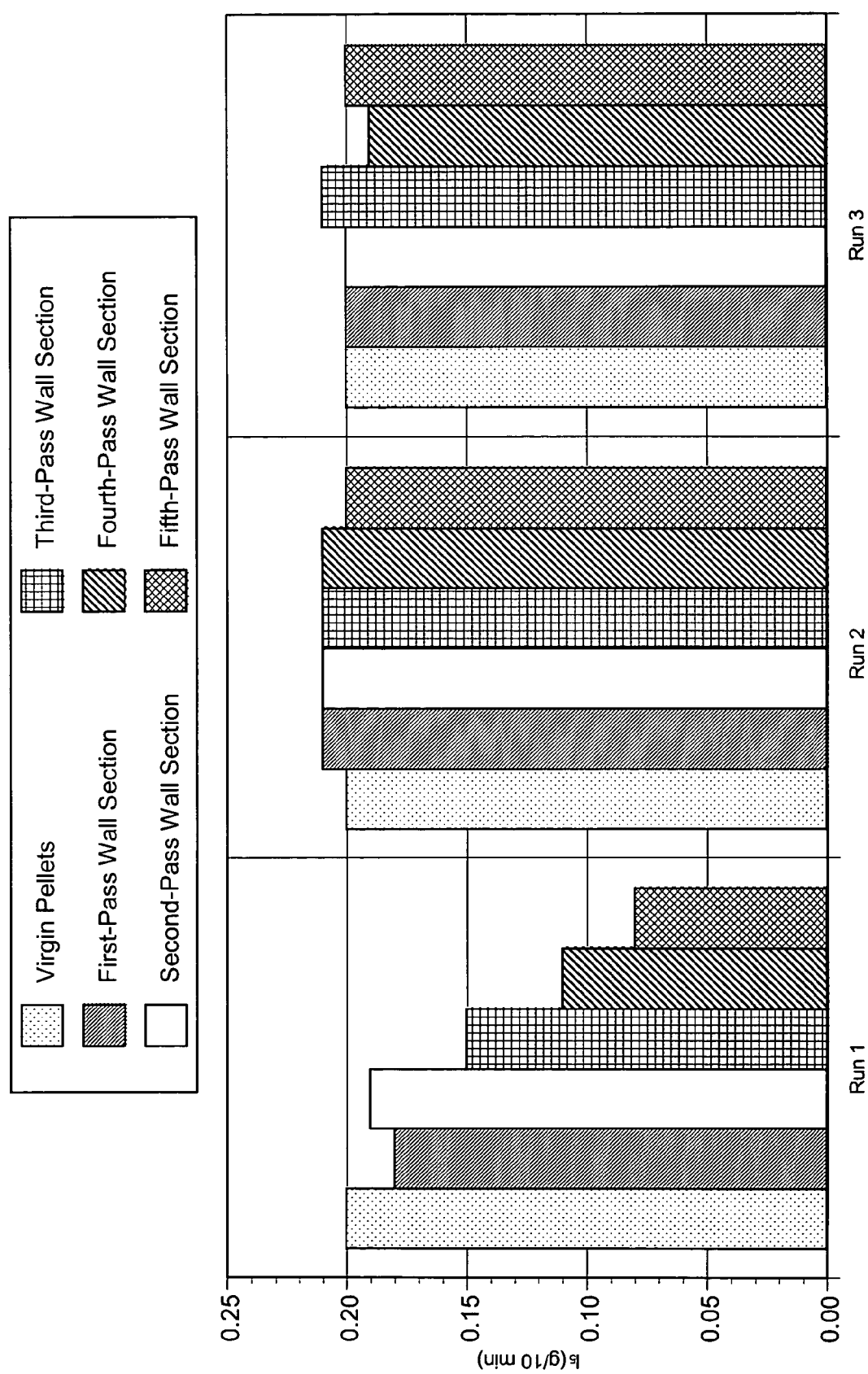
FIG. 1 compares the effect of regrind on $I_5$ for various compositions.
Figure 2:
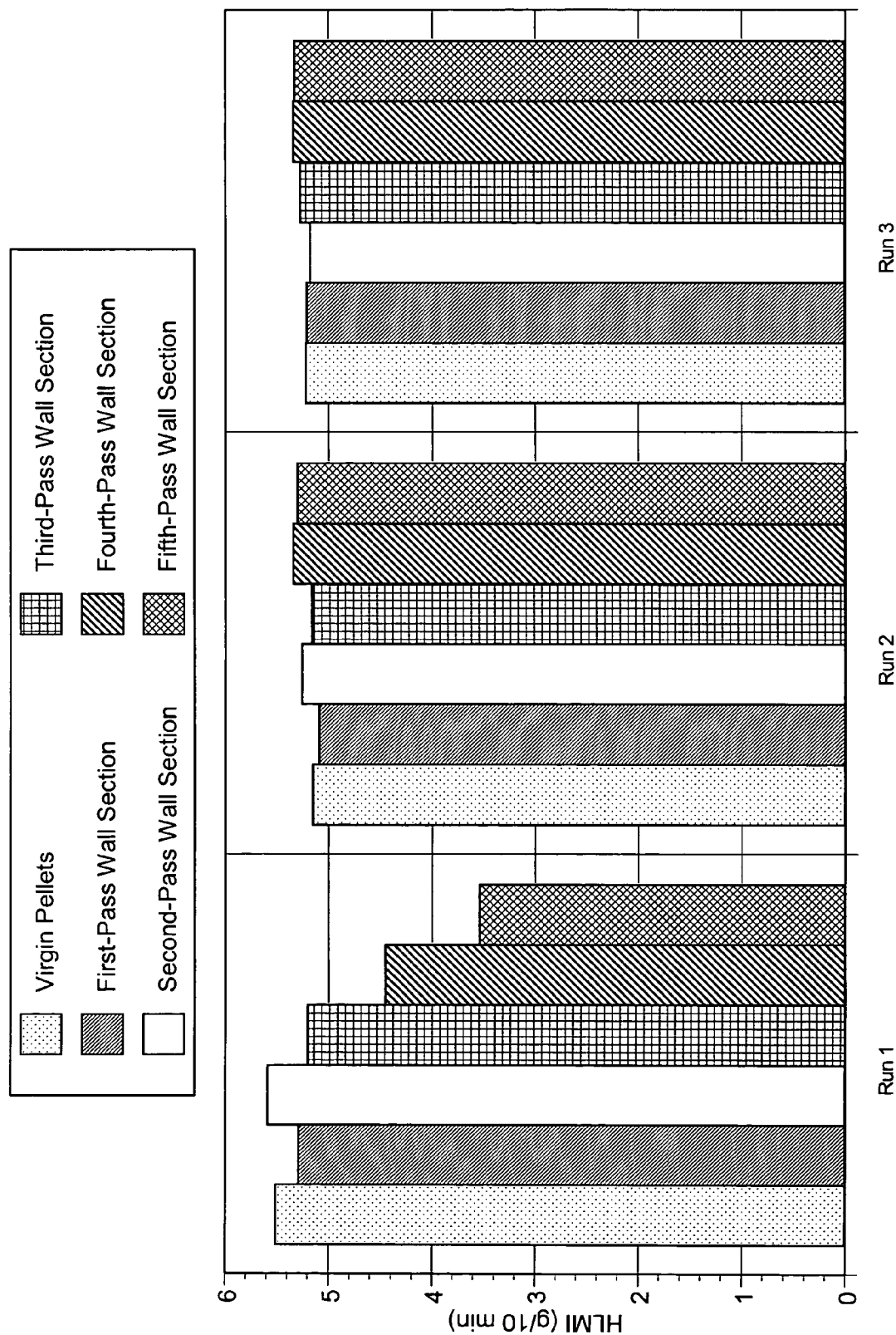
FIG. 2 compares the effect of regrind on HLMI for various compositions.
Figure 3:
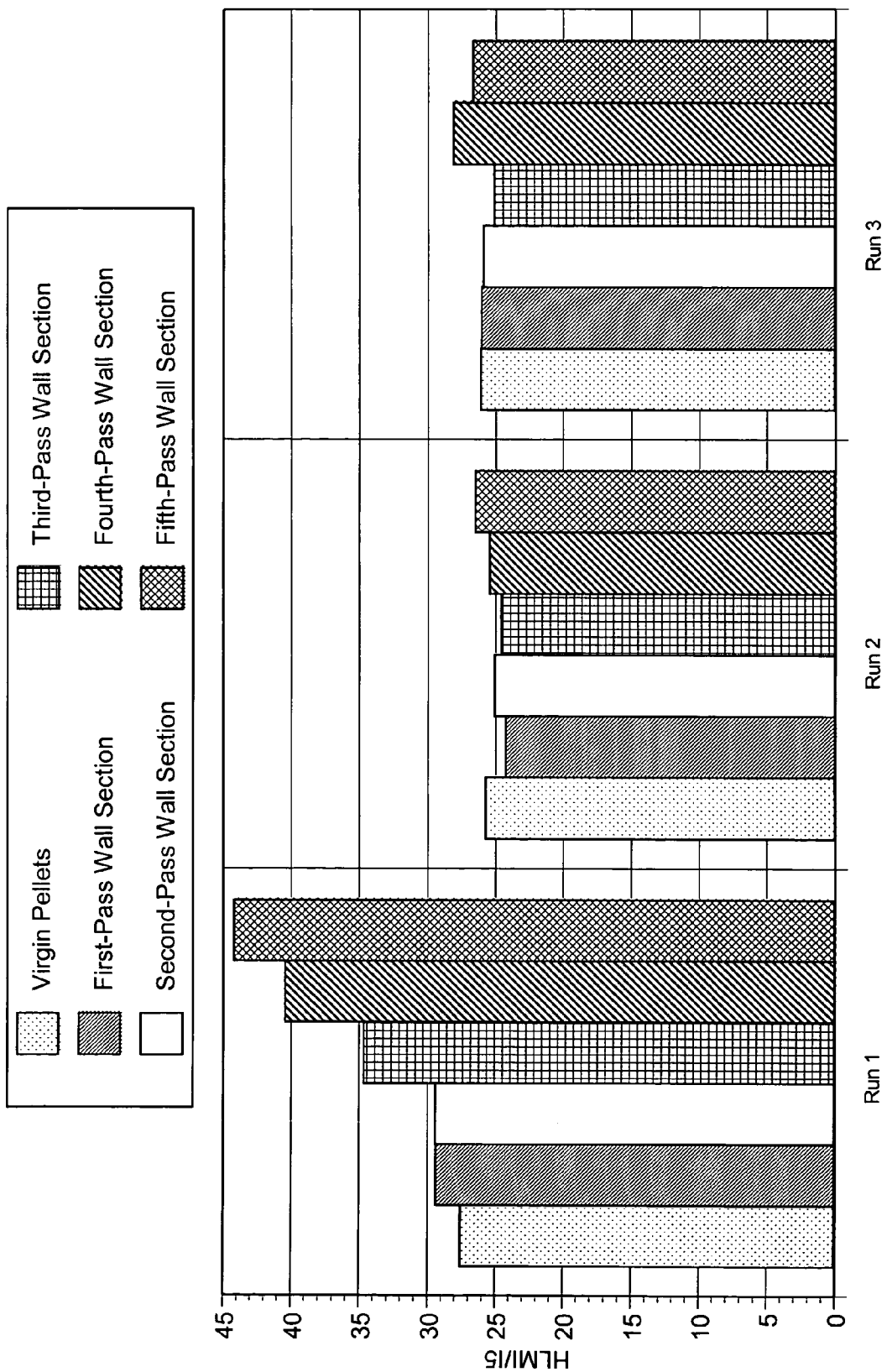
FIG. 3 compares the effect of regrind on HLMI/$I_5$ for various compositions.
Figure 4:
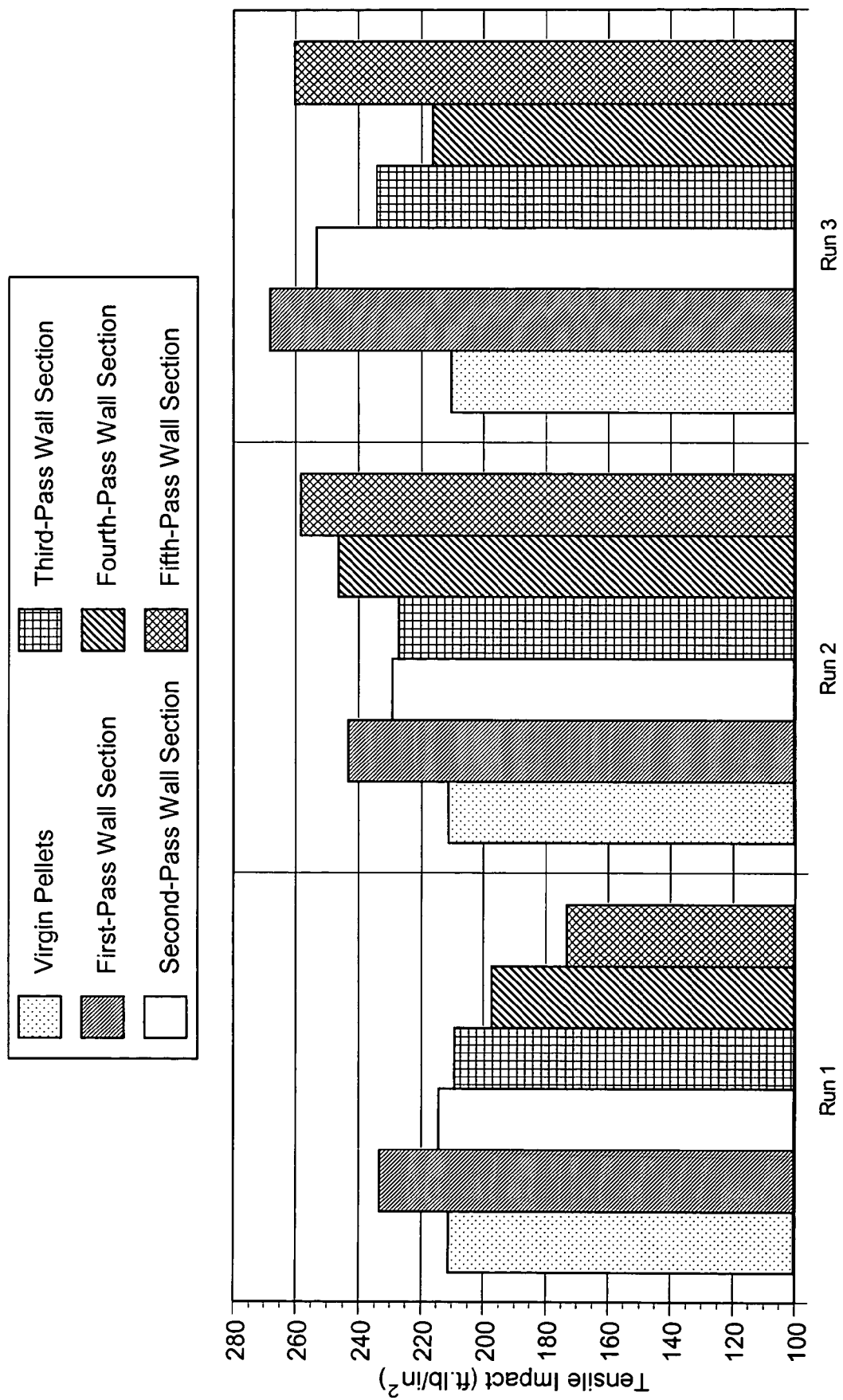
FIG. 4 compares the effect of regrind on tensile impact for various compositions.
Figure 5:
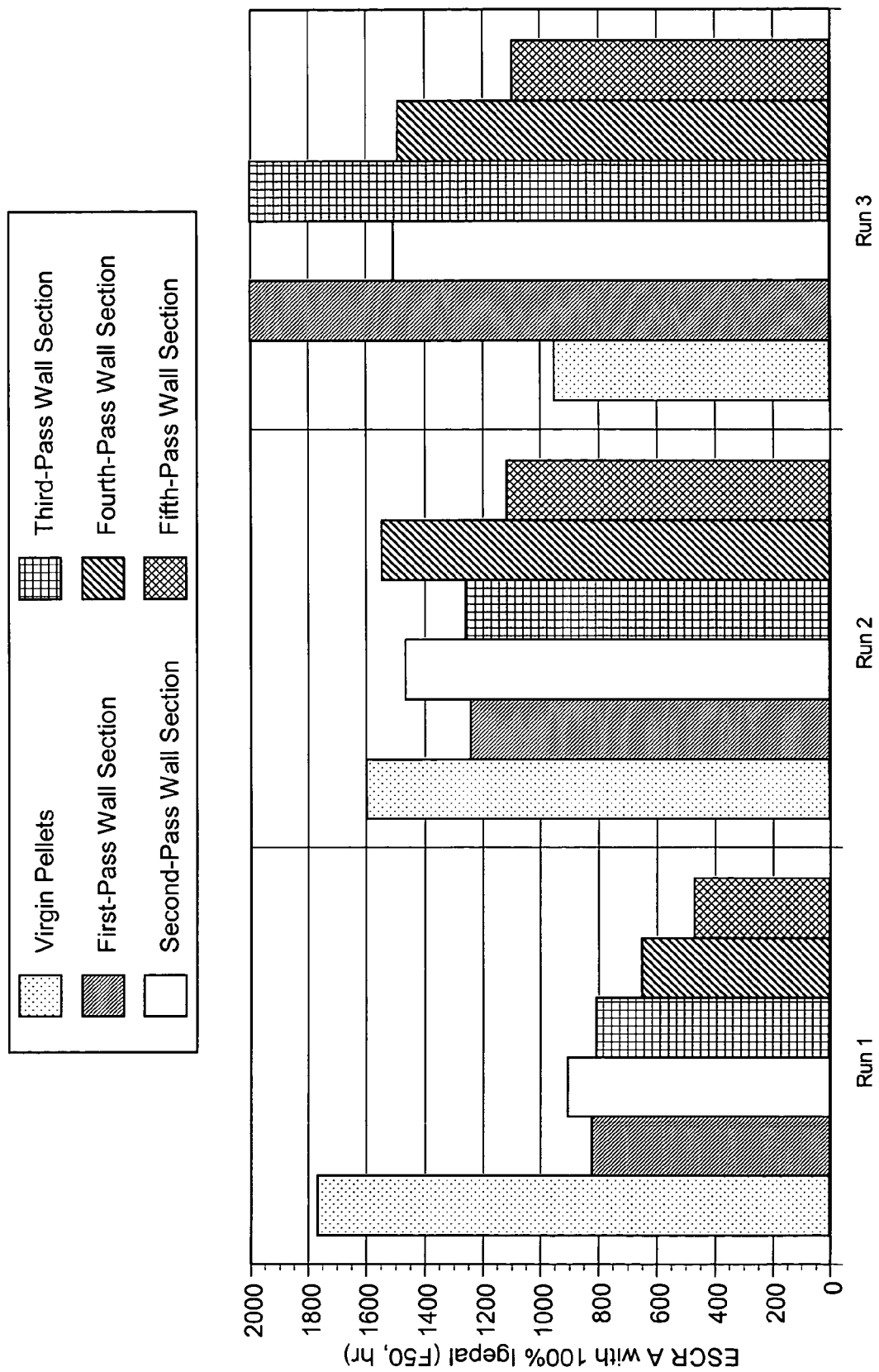
FIG. 5 compares the effect of regrind on ESCR A for various compositions.
Figure 6:
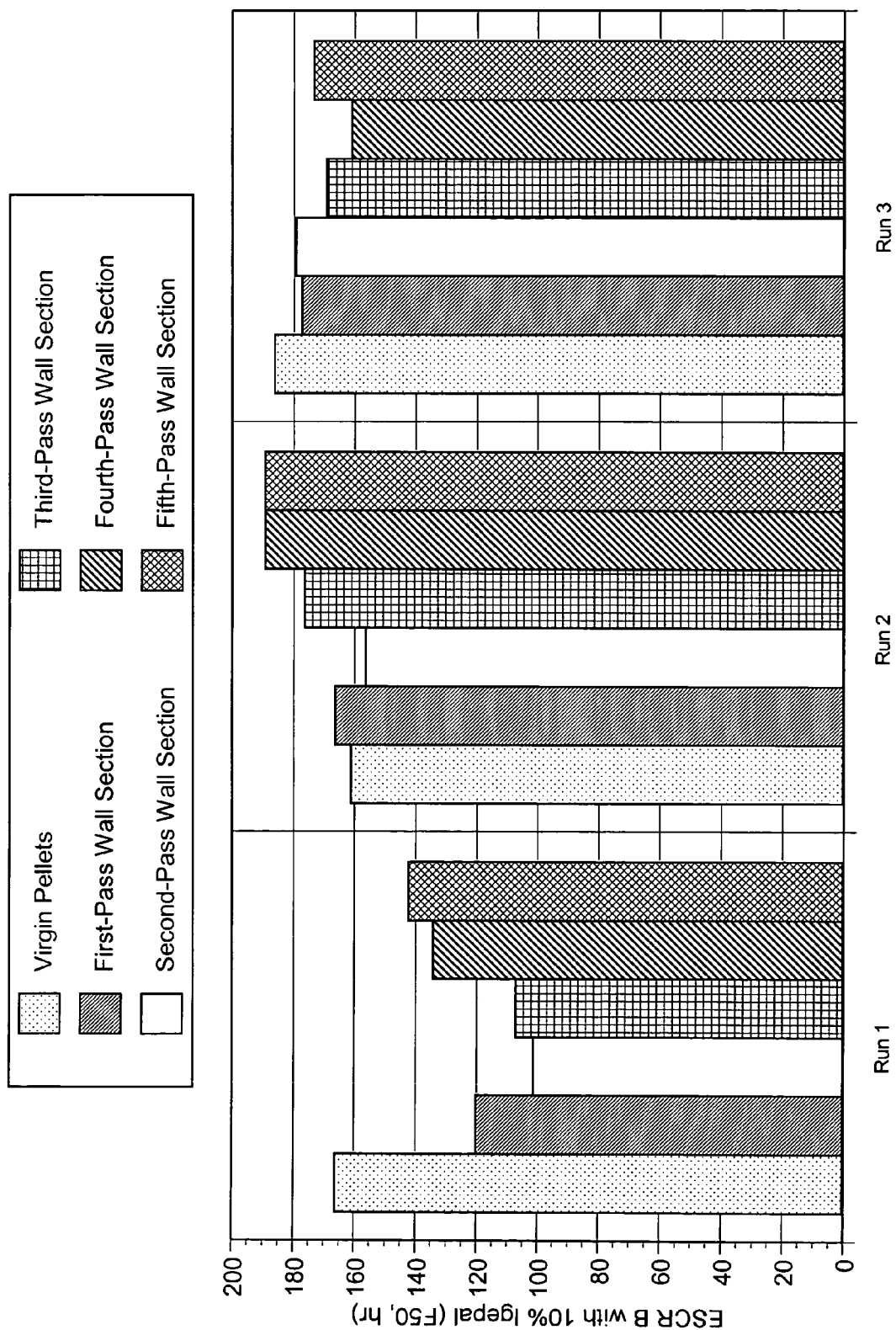
FIG. 6 compares the effect of regrind on ESCR B for various compositions.
Figure 7:
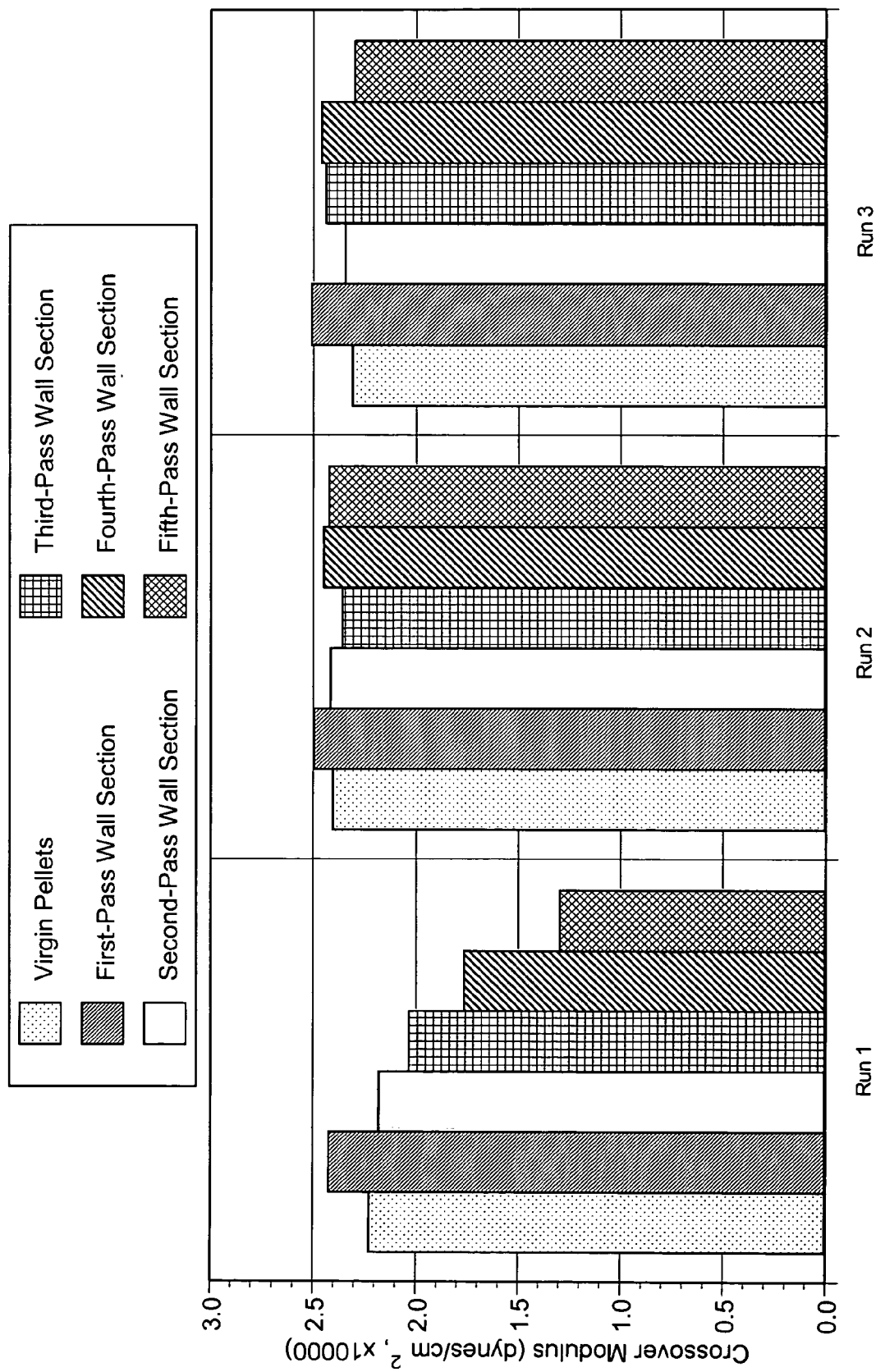
FIG. 7 compares the effect of regrind on crossover modulus for various compositions.
Figure 8:
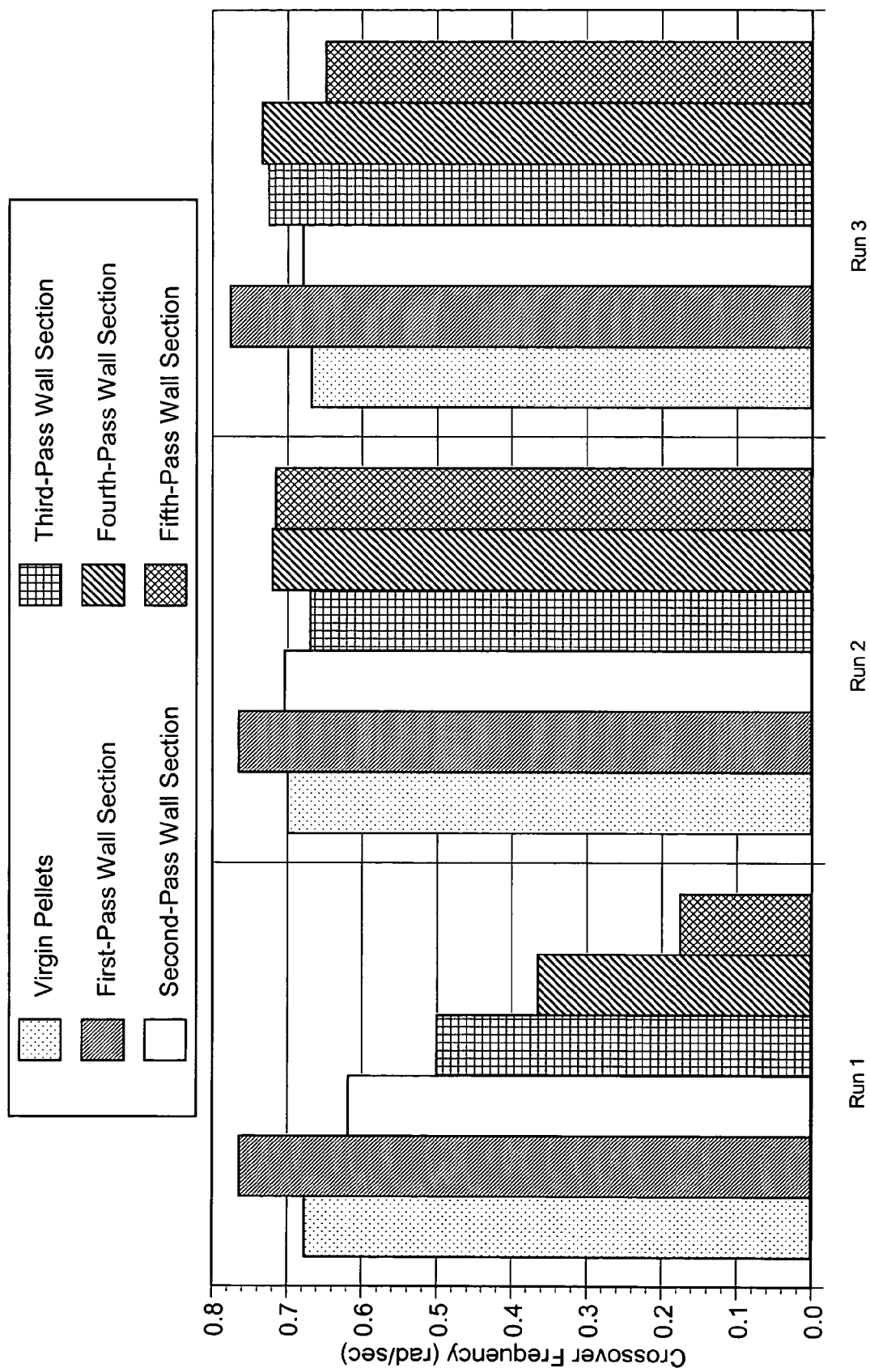
FIG. 8 compares the effect of regrind on crossover frequency for various compositions.
Figure 9:
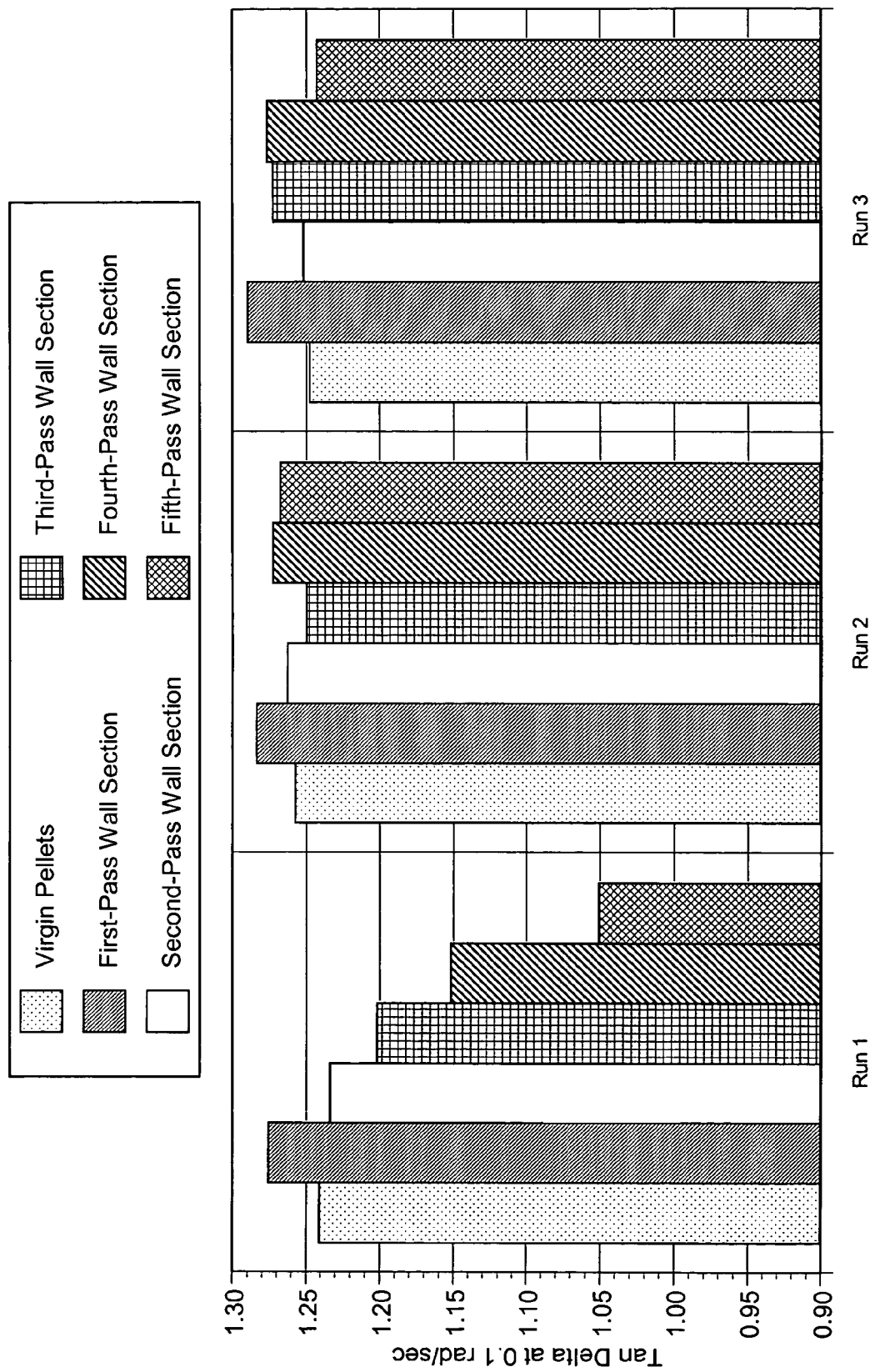
FIG. 9 compares the effect of regrind on Tan Delta for various compositions.
Figure 10:
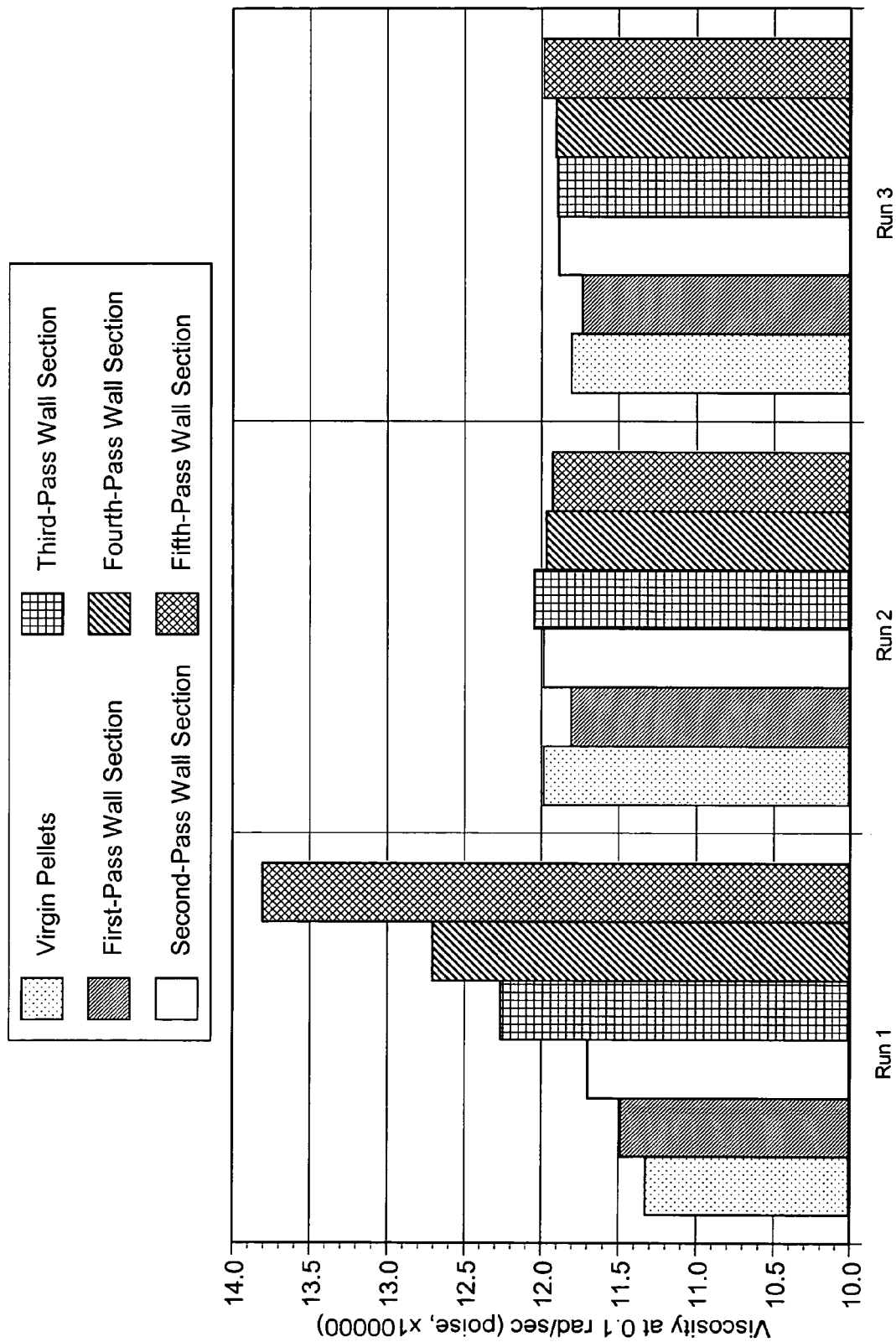
FIG. 10 compares the effect of regrind on viscosity at 0.1 rad/sec for various compositions.
Figure 11:
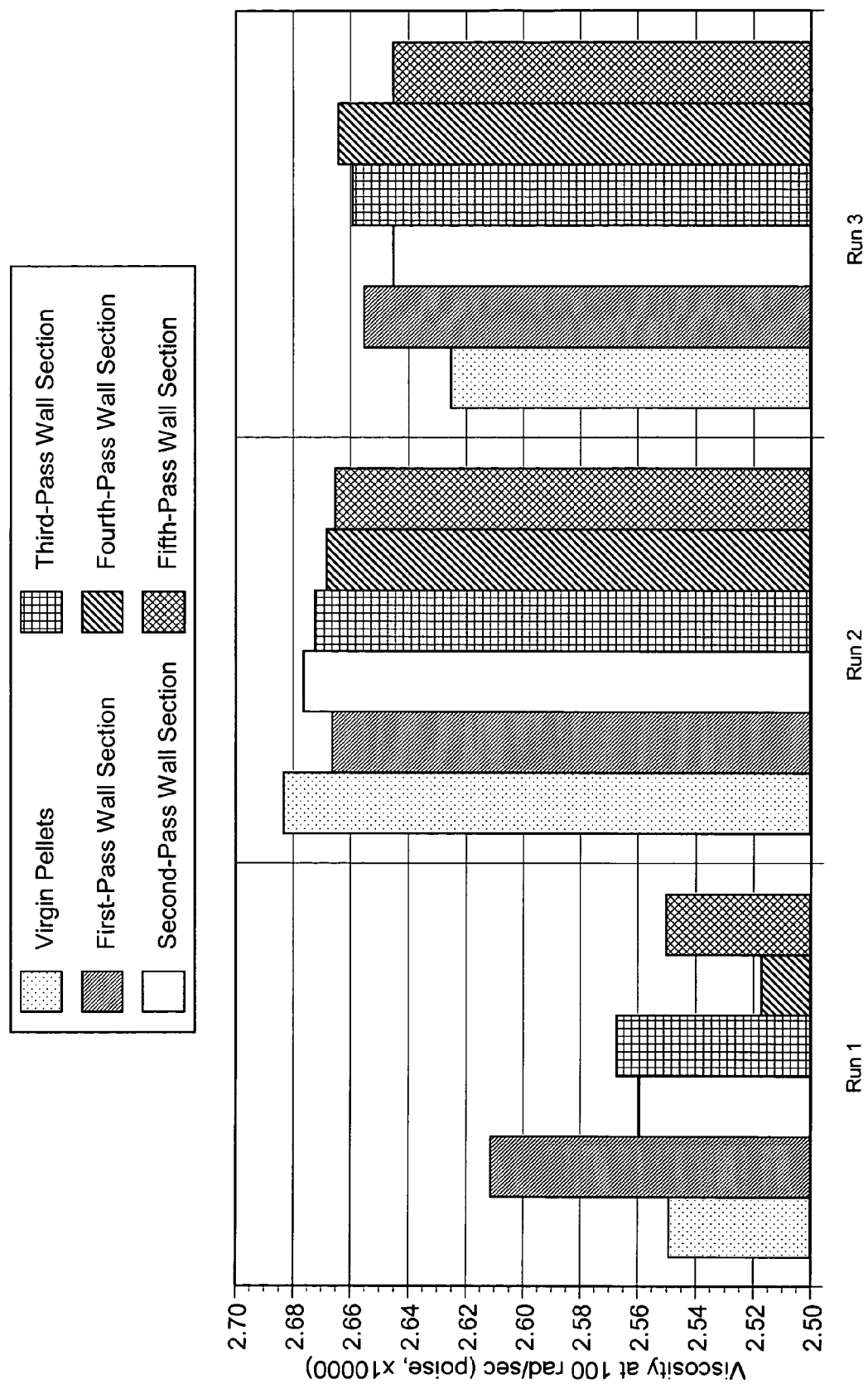
FIG. 11 compares the effect of regrind on viscosity at 100 rad/sec for various compositions.
Figure 12:
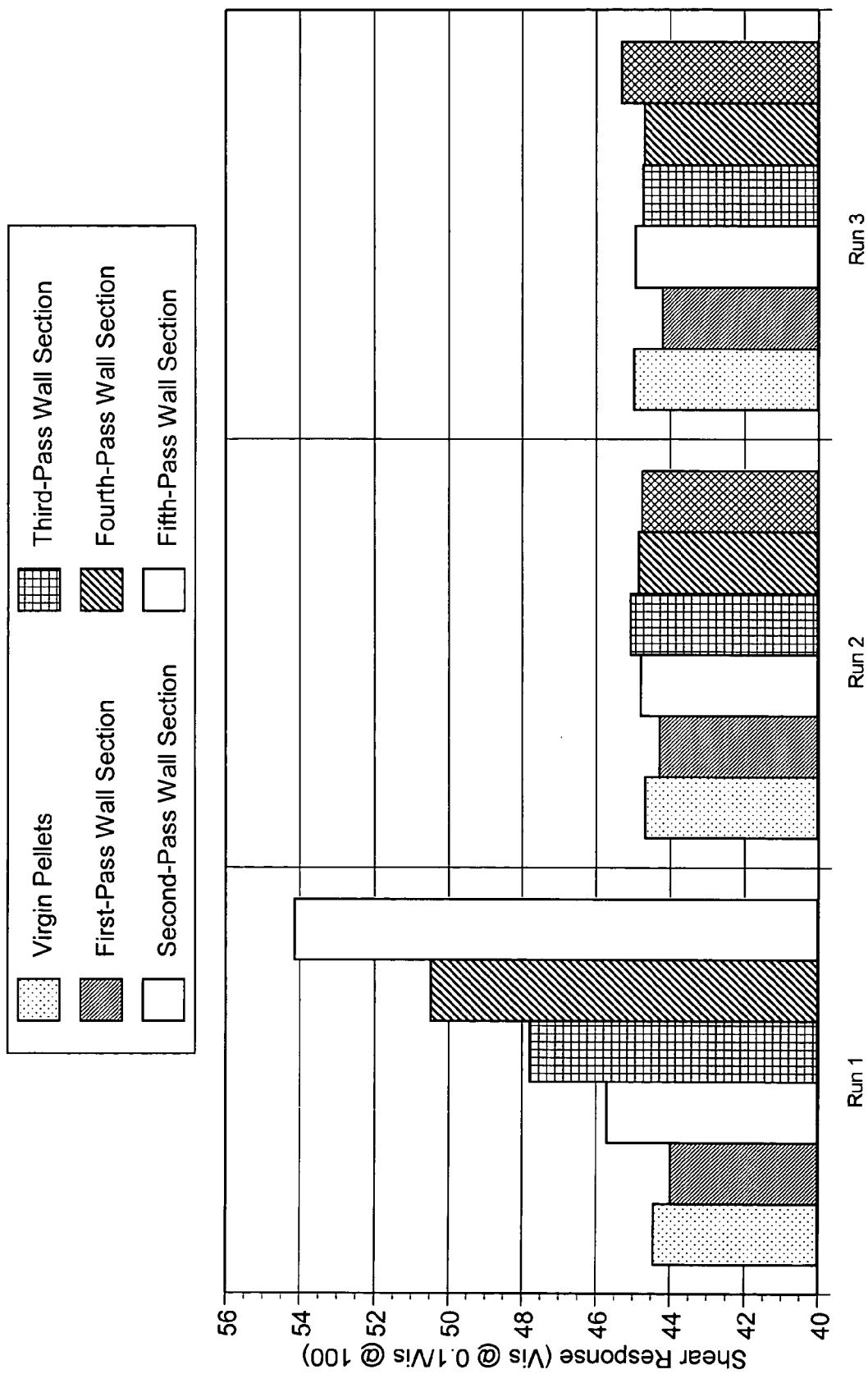
FIG. 12 compares the effect of regrind on shear response for various compositions.
Figure 13:
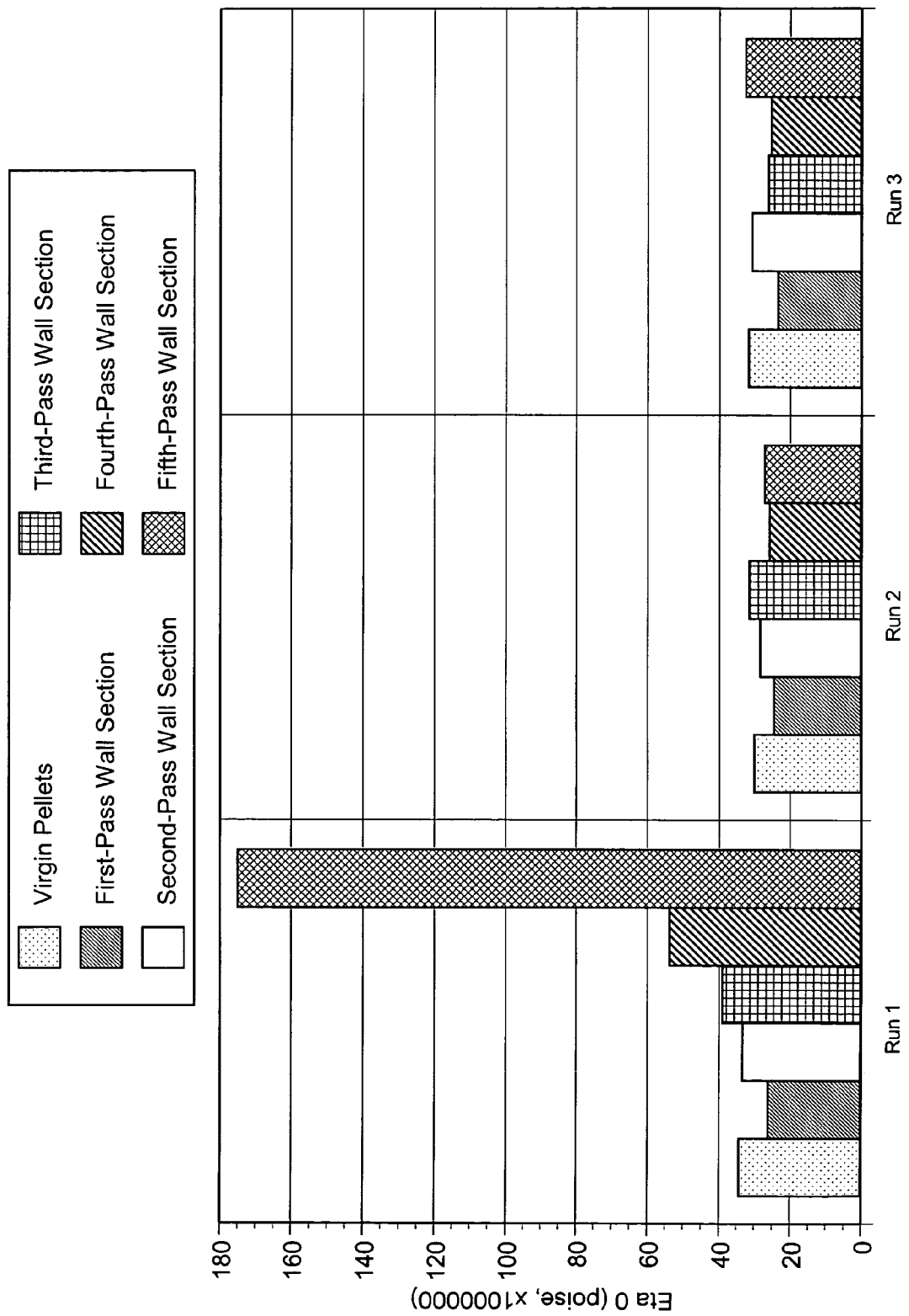
FIG. 13 compares the effect of regrind on Eta (0), zero shear viscosity, for various compositions.
Figure 14:
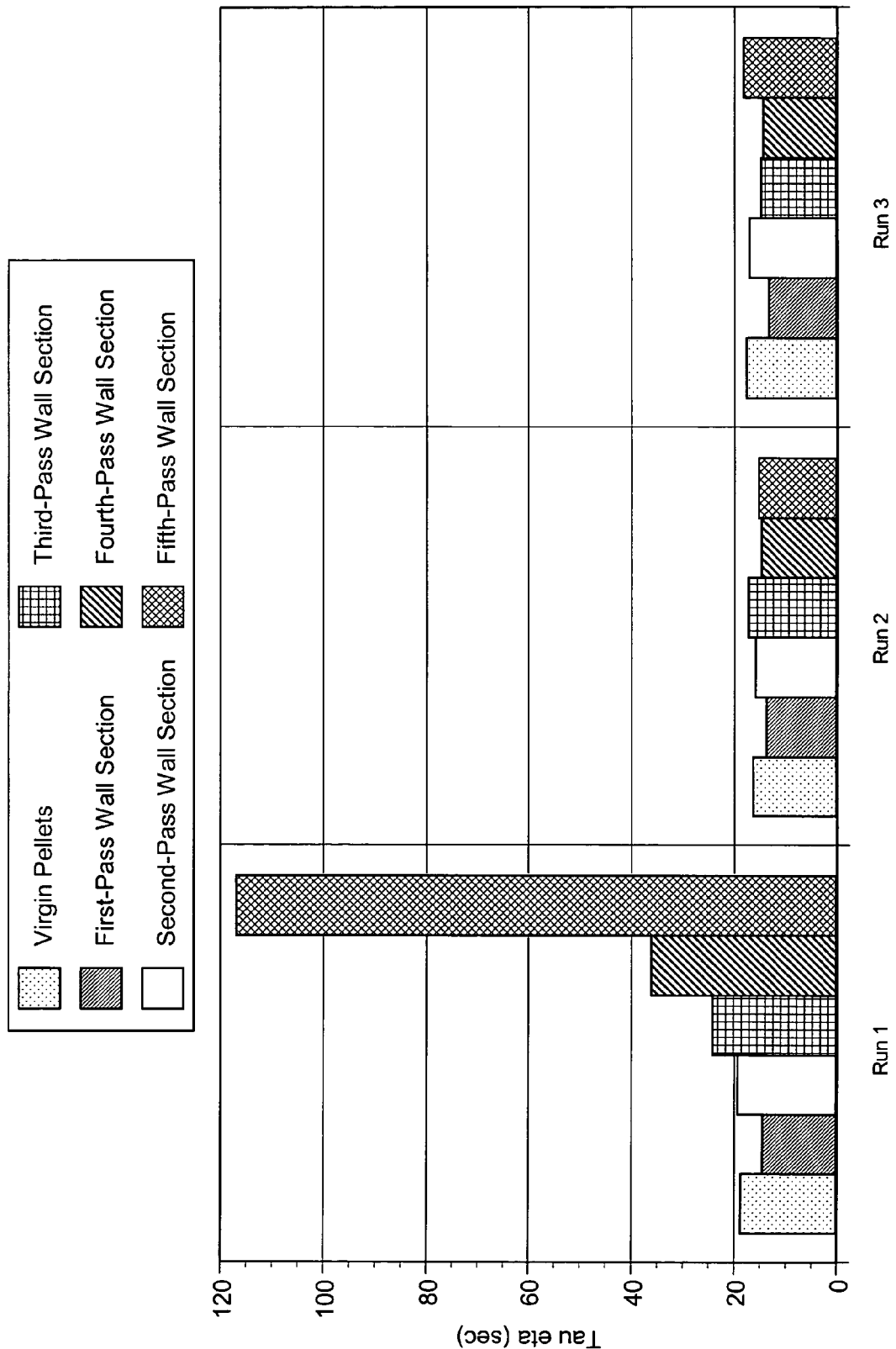
FIG. 14 compares the effect of regrind on Tau eta for various compositions.
Figure 15:
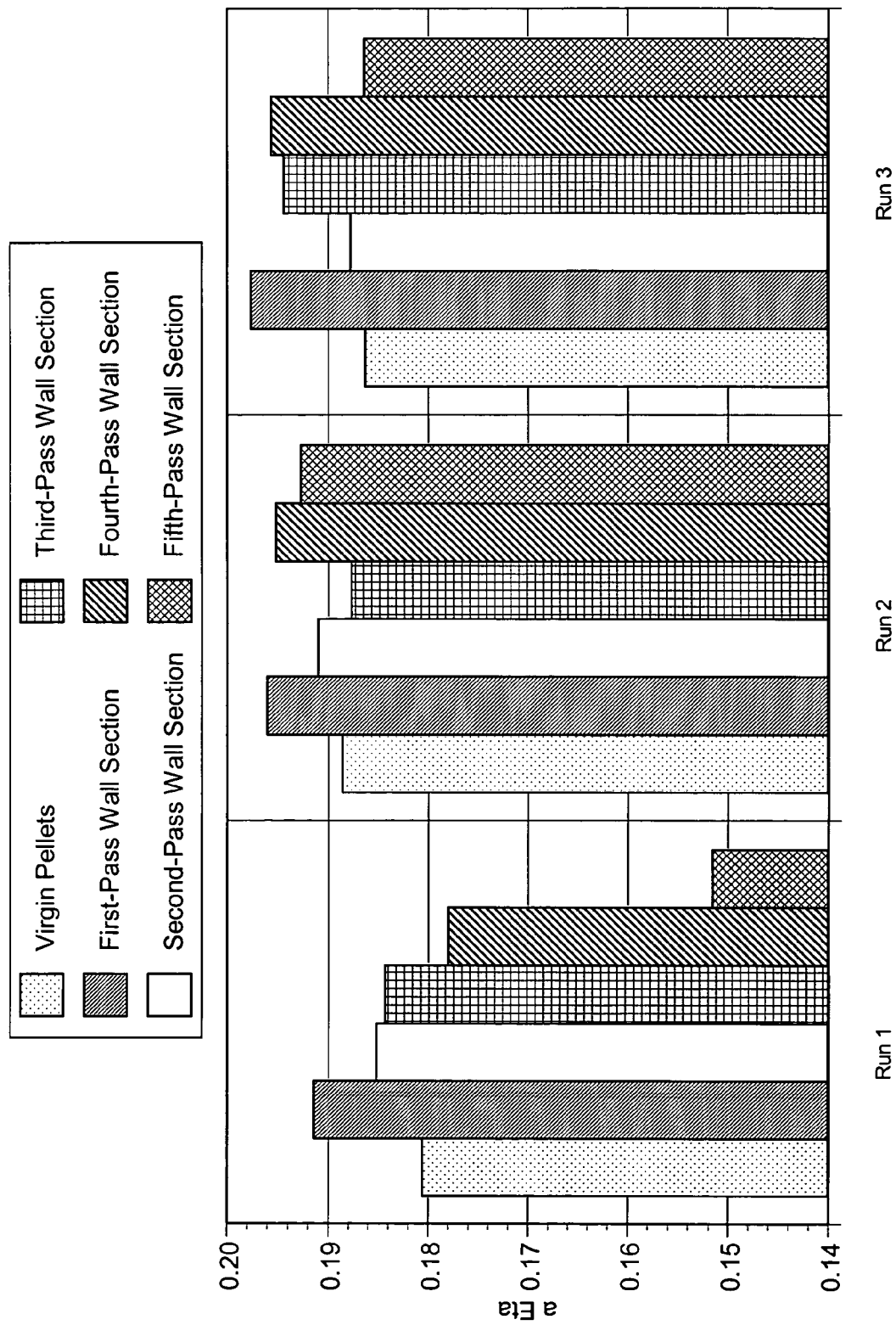
FIG. 15 compares the effect of regrind on a Eta for various compositions.
Figure 16:
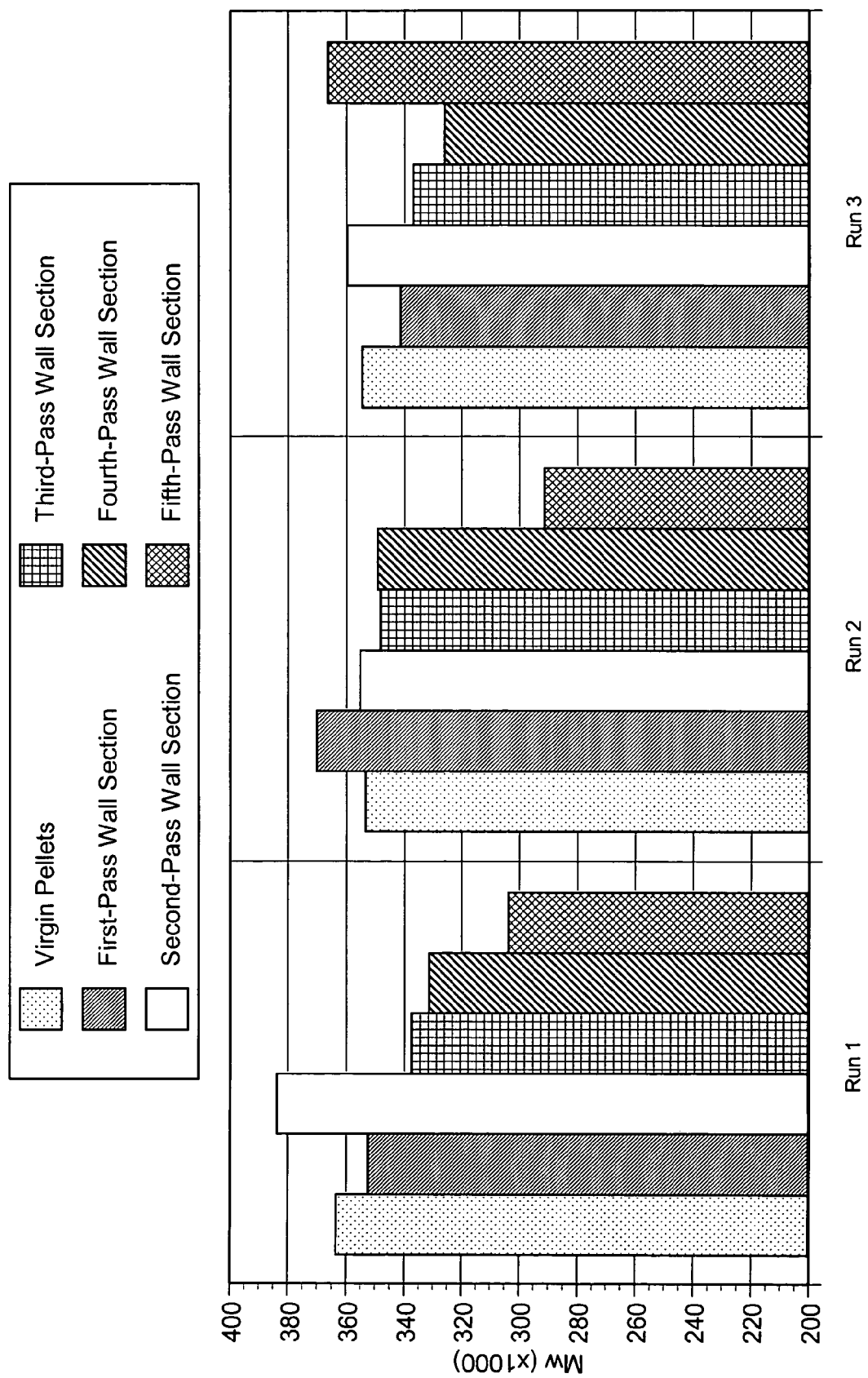
FIG. 16 compares the effect of regrind on Mw for various compositions.
Figure 17:
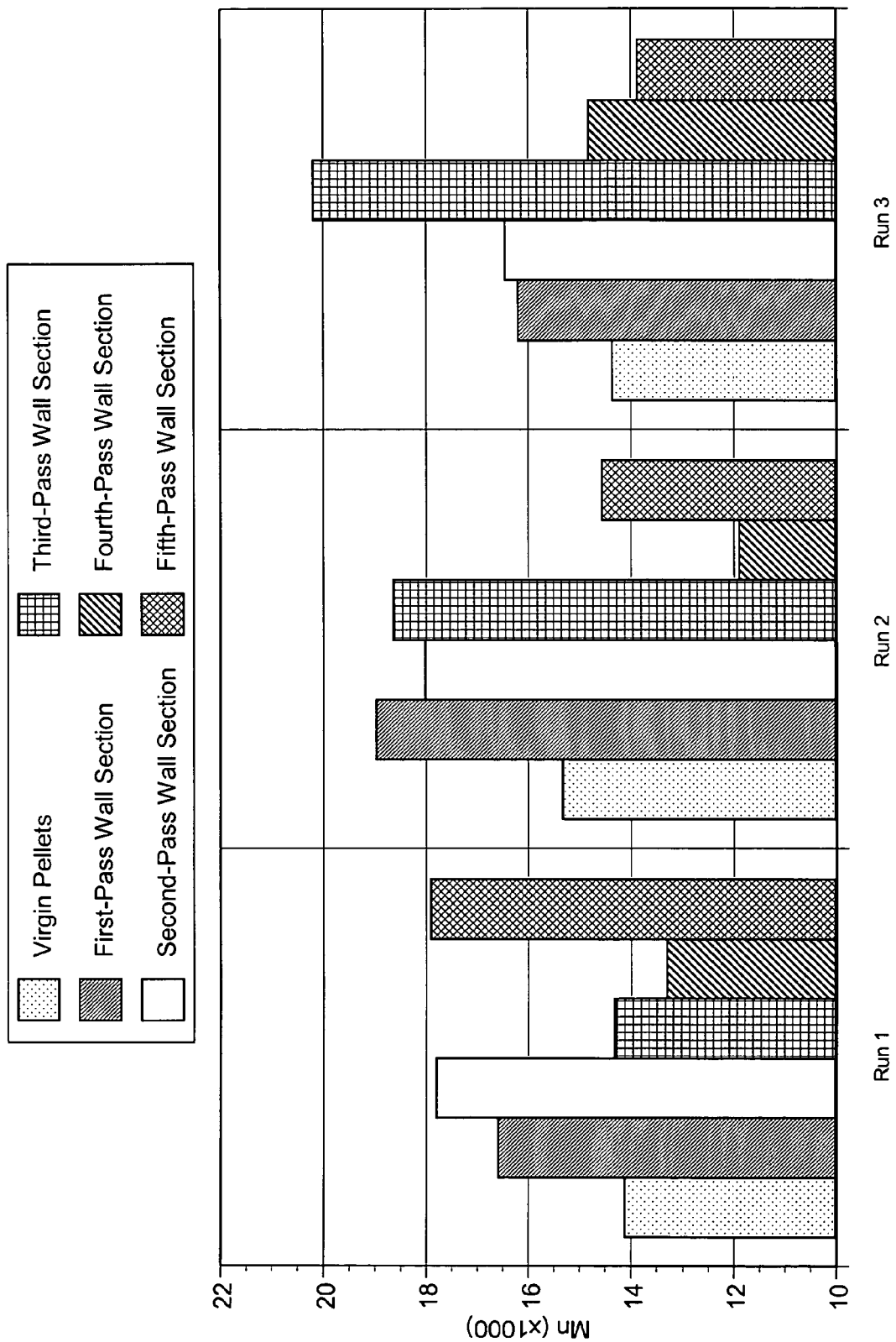
FIG. 17 compares the effect of regrind on Mn for various compositions.
Figure 18:
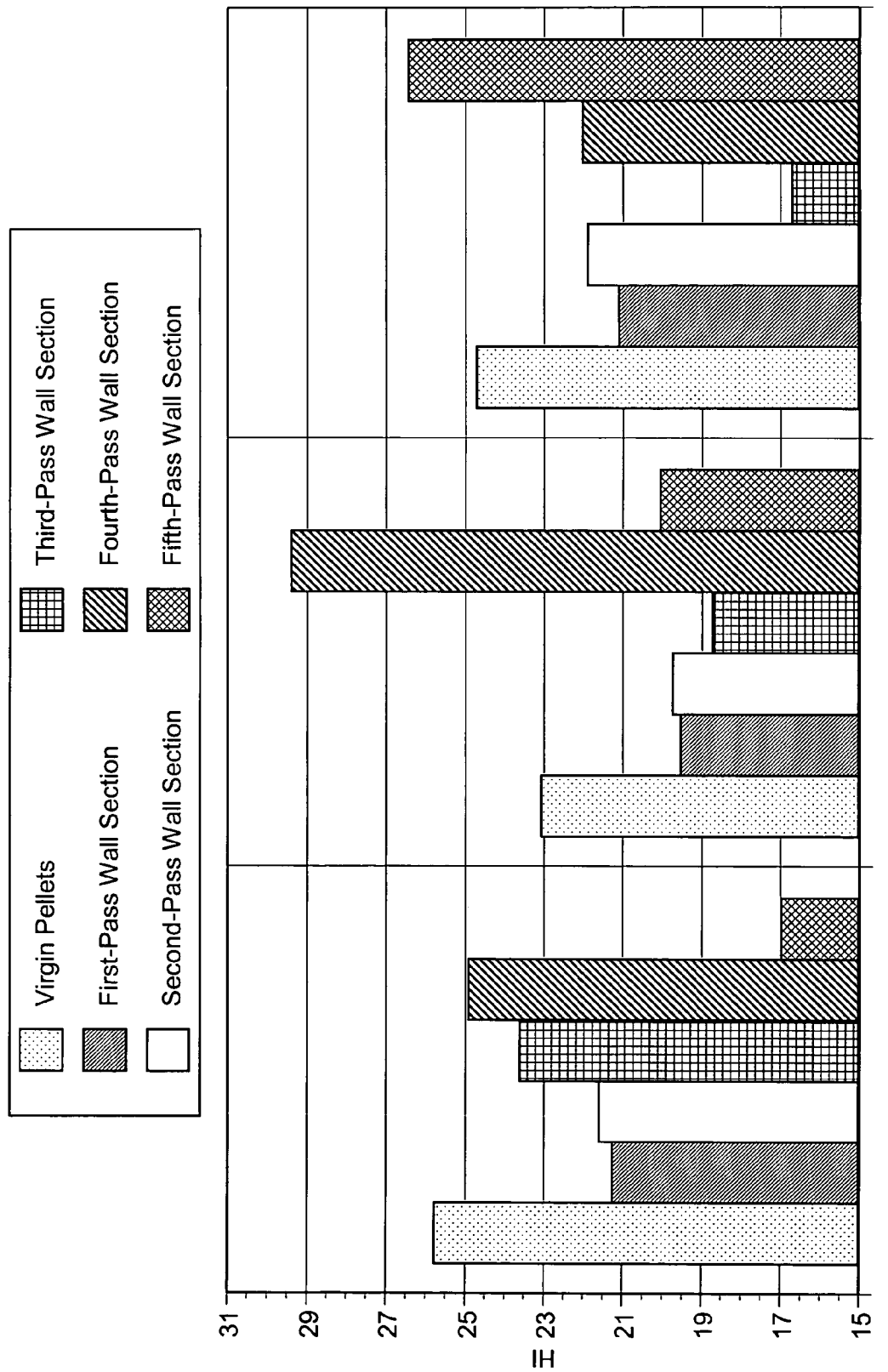
FIG. 18 compares the effect of regrind on HI for various compositions.
Figure 19:
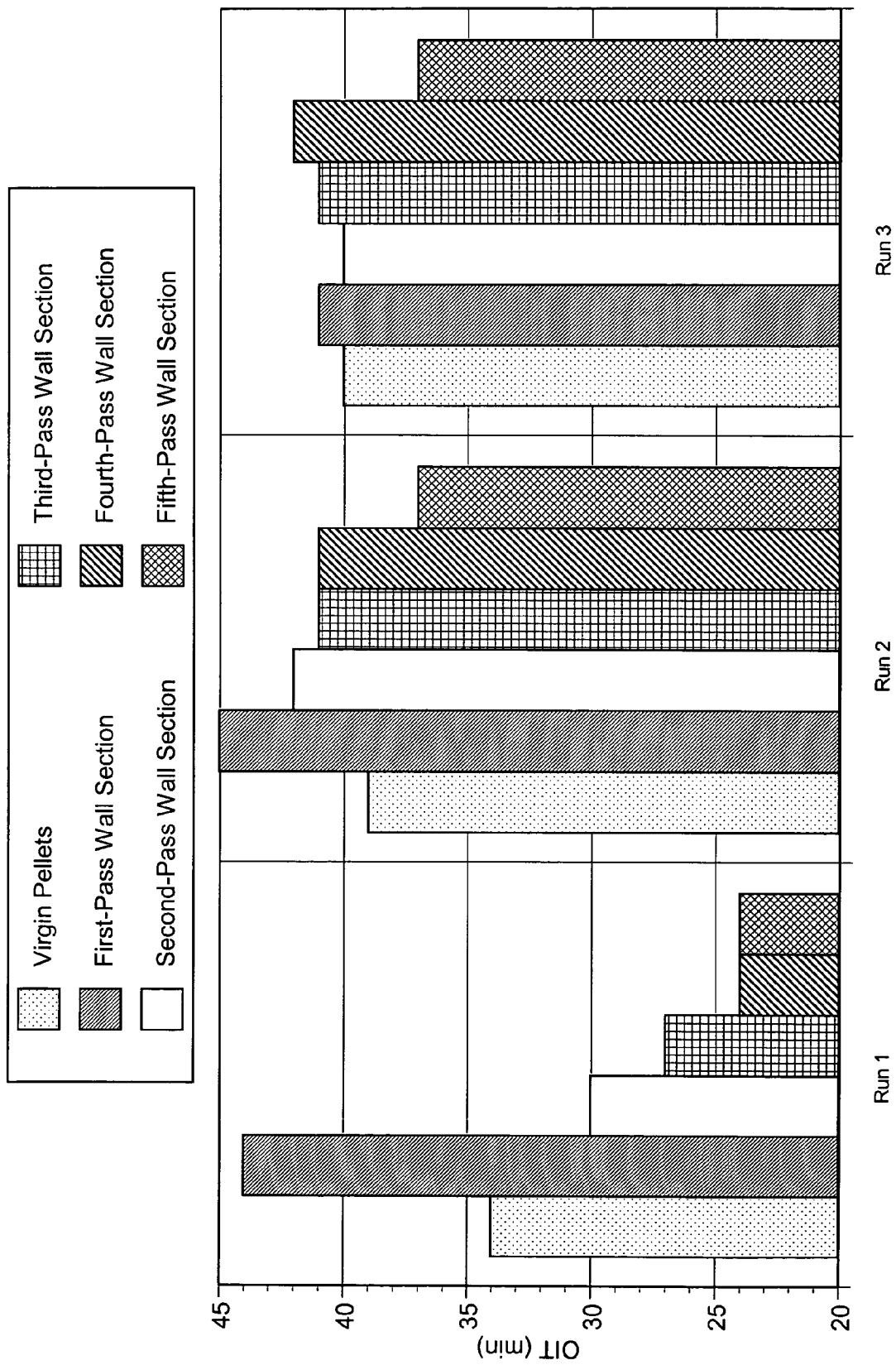
FIG. 19 compares the effect of regrind on OIT for various compositions.
Figure 20:
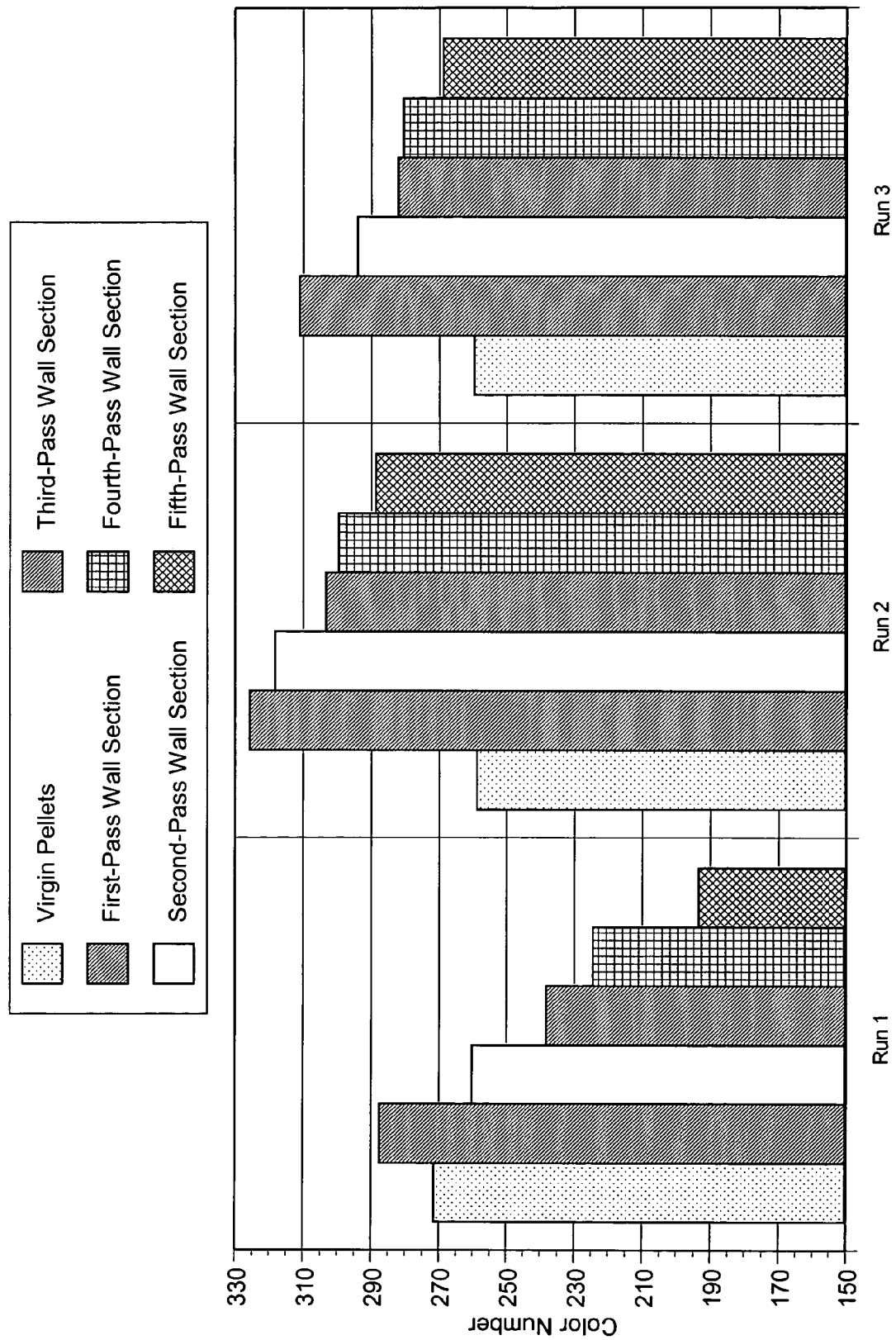
FIG. 20 compares the effect of regrind on the Phillips Color Number (PE #) for various compositions.

The term "polyolefin", as used in this invention, includes homopolymers as well as copolymers of olefinic compounds. Usually, such homopolymers comprise one mono-1-olefin having about 2 to about 10 carbon atoms per molecule, and typically, about 2 to about 6 carbon atoms per molecule. Exemplary mono-1-olefins, which produce polyolefins with excellent properties, include, but are not limited to, ethylene, propylene, 1-butene, 1-pentene, 1-hexene, and 1-octene. In one aspect of the present invention, the mono-1-olefin is ethylene due to its ease of use in this invention.

Applicable copolymers comprise at least 2 different mono-1-olefins, a monomer and one or more comonomers, each having from about 2 to about 16 carbon atoms per molecule. For example, such monomers, which produce polyolefins with excellent properties, include, but are not limited to, ethylene, propylene, 1-butene, 1-pentene, 1-hexene, and 1-octene. Again, ethylene may be employed as the mono-1-olefin due to ease of use in the present invention. Exemplary comonomers include, but are not limited to, aliphatic 1-olefins, such as propylene, 1-butene, 1-pentene, 4-methyl-1-pentene, 1-hexene, 1-octene, and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. In one aspect of the present invention, the copolymer comprises of ethylene and a higher alpha-olefin comonomer having from about 3 to about 16 carbon atoms per molecule. Propylene, 1-butene, 1-pentene, 1-hexene, 4-methyl-1-pentene, and 1-octene may be employed as comonomers for use with ethylene due to ease of copolymerization and excellent resultant copolymer properties. Usually, such polymers comprise about 1 to about 20 weight percent comonomers based on the total weight of the polyolefin.

Generally, a polyolefin can be obtained through polymerization of an olefinic compound or compounds by conventional techniques known in the art. For example, a polyolefin can be produced by solution polymerization, slurry polymerization, or gas phase polymerization using conventional equipment and contacting processes. The term "neat" polyolefin, as used in this disclosure, means a polyolefin produced from a process prior to the addition of any additives. In one aspect of the present invention, a polyolefin can be prepared in the presence of an inorganic oxide supported chromium oxide catalyst system, due to its excellent polyolefin production capabilities. As used in this disclosure, the term "support" refers to a carrier for another catalytic component. Any support useful to support catalyst systems can be used. Exemplary inorganic oxide catalyst system supports include, but are not limited to, inorganic oxides, either alone or in combination, phosphated inorganic oxides, mixed oxides thereof, and any mixture thereof. For example, supports selected from silica, silica-alumina, alumina, fluorided alumina, silated alumina, thoria, aluminophosphate, aluminum phosphate, phosphated silica, phosphated alumina, silica-titania, coprecipitated silica/titania, fluorided/silated alumina, and any mixture thereof may be employed in the present invention. One example of the inorganic oxide of an inorganic oxide supported chromium oxide catalyst system is a silica-titania support.

In another aspect of the present invention, homopolymers as well as copolymers of olefinic compounds produced using a transition metal halide catalyst, also known as "Ziegler-type" or Ziegler-Natta type catalysts, may be employed. Generally, the transition metal halide catalyst comprises a metal halide compound and a transition metal compound. The metal halide compound is selected from metal dihalides and metal hydroxyhalides. Such transition metal compounds comprise a transition metal in the group IIIB, IVB, VB, VIB, VIIB or VIII transition metals within the respective group number of the Periodic Table of the Elements (CRC Handbook of Chemistry and Physics, 78$^{th}$ ed. 1997–1998). For example, group IVB would include titanium, zirconium, etc. and group VIII would include palladium, platinum, cobalt, etc. Suitable transition metal halide catalysts are disclosed in U.S. Pat. Nos. 4,325,837 and 4,394,291, both of which are incorporated herein in their entirety.

In yet another aspect of the present invention, homopolymers as well as copolymers of olefinic compounds produced using a catalyst composition comprising a metallocene may be employed. Suitable catalyst compositions are disclosed in U.S. Pat. Nos. 6,300,271; 5,576,259; 5,631,202; and 5,614,455, all of which are incorporated herein in their entirety.

As a result of polymerization by a chromium oxide catalyst system supported on a silica-titania support, a polyolefin can contain a minor amount of titania in the recovered polyolefin. Such polyolefins can contain from about 1 mg/kg to about 10 mg/kg, based on the mass of neat polyolefin, titanium catalyst residue calculated as titanium. Although not bound by theory, it is believed that catalyst residue comprising titanium can contribute to increasing discoloration of polyolefins upon addition of hindered phenols.

Phosphite Additives

Chemical additives frequently are combined with polymers to improve selected physical properties of polymers. For example, antioxidants can be added to improve heat, light, and oxidation stability. As defined in this disclosure, the "stability" of a polymer is an indication or measure of how the polymer is affected by external forces, such as, for example, light, heat, and oxygen, acting on or reacting with the polymer. Stability, in other words, is a measure of changes that can occur in and/or to the polymer.

Primary polymer stabilizers, such as hindered phenols, are often utilized as a primary antioxidant, however, such stabilizers can discolor polyolefins. Phosphite additives can be utilized to remedy this discoloration problem providing whiteness to polyolefins, and in addition, phosphite additives also can improve the stability of polyolefins. However, some phosphite additives are hygroscopic, and upon absorption of water, phosphites can clump and can be difficult to feed into polymer production processes. Some phosphites are hydrolytically unstable and can react with water, thereby resulting in a lower active phosphite concentration for stabilizing polymers. Furthermore, this hydrolysis reaction can leave moisture and acidic residues in polymers.

It has been discovered in this invention, that the addition of two specific phosphites to polyolefins can produce a polyolefin having improved color and stability over polyolefins containing only one of the two phosphites. The composition of the present invention comprises a polyolefin; a first high activity phosphite, such as an arylalkyl diphosphite having a formula,

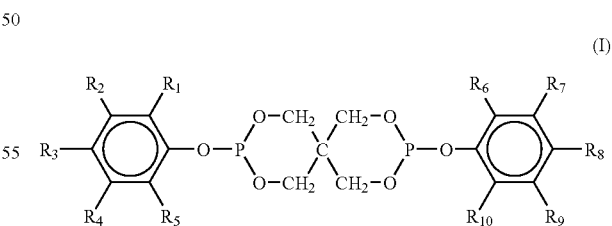

(I)

wherein $R_1$, $R_2$, $R_3$, $R_4$, $R_5$, $R_6$, $R_7$, $R_8$, $R_9$, and $R_{10}$ can be the same or different and are selected from hydrogen and straight-chained or branched, cyclic or acyclic, aromatic or aliphatic, and mixed aliphatic, aromatic, and/or cycloaliphatic organic radicals having from about 1 to about 20 carbon atoms per radical; and a hydrolytically stable phosphite comprising a triarylphosphite having a formula,

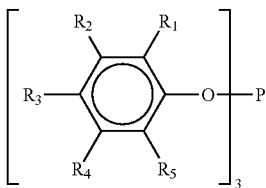

wherein $R_1$, $R_2$, $R_3$, $R_4$, and $R_5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical.

Optionally, the composition may comprise a second high activity phosphite which is different from the first high activity phosphite. For example, the second high activity phosphite may comprise an arylalkyl diphosphite of formula (1), wherein $R_1$, $R_2$, $R_3$, $R_4$, $R_5$, $R_6$, $R_7$, $R_8$, $R_9$, and $R_{10}$ can be the same or different and are selected from hydrogen and straight-chained or branched, cyclic or acyclic, aromatic or aliphatic, and mixed aliphatic, aromatic, and/or cycloaliphatic organic radicals having from about 1 to about 20 carbon atoms per radical, which is different from the arylalkyl diphosphite employed as the first high activity phosphite.

In one aspect of the present invention, $R_2$, $R_4$, $R_5$, $R_7$, $R_9$, and $R_{10}$ in the arylalkyl diphosphite employed as the first high activity phosphite are hydrogen and $R_1$, $R_3$, $R_6$, and $R_8$ are mixed aliphatic and aromatic organic radicals having from about 1 to about 20 carbon atoms per radical. As used in this disclosure, "mixed aliphatic and aromatic organic radicals" are radicals with both an aliphatic component and an aromatic component. In another aspect of the present invention, the first high activity phosphite is bis(2,4-dicumylphenyl)pentaerythritol disphosphite since it provides the excellent resultant polymer color and stability. Bis(2,4-dicumylphenyl)pentaerythritol disphosphite can be obtained commercially from Dover Chemical Corporation under the name Doverphos® S-9228. Depending on the synthesis methods and conditions employed, bis(2,4-dicumylphenyl) pentaerythritol diphosphite can contain up to about 15% of the cage formation as disclosed in U.S. Pat. No. 5,428,086, hereinafter incorporated by reference. Alternatively, or in addition to bis(2,4-dicumylphenyl)pentaerythritol disphosphite, bis(2,4-di-t-butylphenyl)pentaerythritol diphosphite, commercially available as Ultranox® 626, which is a registered trademark of General Electric Co. may be employed as a high activity phosphite.

In another aspect of the present invention, $R_2$, $R_4$, $R_7$, and $R_9$ in the arylalkyl diphosphite employed as the first high activity phosphite are hydrogen and $R_1$, $R_3$, $R_5$, $R_6$, $R_8$, and $R_{10}$ may be independently selected from straight-chained and branched organic radicals having from about 1 to about 20 carbon atoms per radical or mixed aliphatic and aromatic organic radicals having from about 1 to about 20 carbon atoms per radical. Alternatively, such first high activity phosphite may be employed as the second high activity phosphite.

When the optional second high activity phosphite is a second arylakyl diphosphite, $R_2$, $R_4$, $R_5$, $R_7$, $R_9$, and $R_{10}$ in the second arylalkyl diphosphite may be hydrogen and $R_1$, $R_3$, $R_6$, and $R_8$ may be selected from straight-chained and branched organic radicals having from about 1 to about 20 carbon atoms per radical. For example, bis(2,4-di-tert-butylphenyl)pentaerythritol diphosphite may be employed as the second arylalkyl diphosphite since it provides the excellent resultant polymer stability and color. Bis(2,4-di-tertbutyl)pentaerythritol disphosphite can be obtained commercially from GE Specialty Chemicals under the names Ultranox® 626, which is in powder form, Ultranox® 626A, which is in free flowing granular form, and Ultranox® 627A, which is in free flowing form and contains an inorganic neutralizer.

Additionally, when the optional second high activity phosphite is a second arylakyl diphosphite, $R_2$, $R_4$, $R_7$, and $R_9$ in the second arylalkyl diphosphite may be hydrogen and $R_1$, $R_3$, $R_5$, $R_6$, $R_8$, and $R_{10}$ may be selected from straight-chained and branched organic radicals having from about 1 to about 20 carbon atoms per radical. For example, bis(2,6-di-tert-butyl,4-methylphenyl)pentaerythritol diphosphite may be employed as the second arylalkyl diphosphite since it provides the excellent resultant polymer stability and color. Bis(2,6-di-tert-butyl,4-methylphenyl)pentaerythritol diphosphite can be obtained commercially from Amfine Chemical Corporation under the tradename PEP-36.

In another aspect of the present invention, $R_2$, $R_4$, and $R_5$ in the triarylphosphite are hydrogen and $R_1$ and $R_3$ are selected from straight-chained and branched organic radicals having from about 1 to about 20 carbon atoms per radical. The straight-chained and branched organic radicals include, but are not limited to, methyl, tert-butyl, and 1,1-dimethylpropyl. Exemplary triarylphosphites include, but are not limited to, tris-(2,4-di-text-butylphenyl phosphite; tris-(2-tert-butylphenyl)phosphite; tris-[2-(1,1-dimethylpropyl)-phenyl]phosphite; and tris-[2,4-di-(1,1-dimethylpropyl)-phenyl]phosphite. In yet another aspect of the present invention, the triarylphosphite is tris(2,4-di-tert-butylphenyl)phosphite since it can provide improved resultant polymer stability and color. Tris(2,4-di-tert-butylphenyl)phosphite can be obtained commercially from Dover Chemical Corporation under the name Doverphos® S-480.

The first high activity phosphite and hydrolytically stable phosphite can be present in a total phosphite amount within a range of about 1 mg/kg to about 20,000 mg/kg based on the mass of neat polyolefin. Concentrations below 1 mg/kg can be insufficient to improve color and improve stability of the polyolefins, and amounts above 20,000 mg/kg may exceed U.S. Food and Drug Administration limitations, increase costs, and provide no additional benefit to the polyolefins. In one aspect of the present invention, the first high activity phosphite and the hydrolytically stable phosphite are present in a total phosphite amount within a range of about 1 mg/kg to about 2000 mg/kg based on the mass of the neat polyolefin. In another aspect of the present invention, the first high activity phosphite and the hydrolytically stable phosphite are present in a total phosphite amount within a range of 1 mg/kg to 1500 mg/kg based on the mass of neat polyolefin. These ranges are optimum since they provide improved polyolefin color and stability at minimum cost.

Generally, the hydrolytically stable phosphite can be present in the polymer in an amount within a range of about 2% to about 90% by weight of the total amount of the high activity phosphite and the hydrolytically stable phosphite added to the neat polyolefin. Concentrations below about 2% by weight based on the total amount of phosphites added can be insufficient to improve color and improve stability of the polyolefins, and amounts above about 90% by weight based on the total amount of phosphites added fail to provide the synergistic effects of improved polyolefin color and stability caused by the first high activity phosphite. In one aspect of the present invention, the hydrolytically stable phosphite is present in the polymer in an amount within a range of about 5% to about 75% by weight of the total amount of the first high activity phosphite and the hydrolytically stable phosphite added to the neat polyolefin. In another aspect of the present invention, the hydrolytically stable phosphite is present in the polymer in an amount within the range of 10% to 60% of the total amount of the first high activity phosphite and the hydrolytically stable phosphite added to the neat polyolefin. These ranges have been shown to provide the excellent synergistic effects between the first high activity phosphite and the hydrolytically stable phosphite to improve polyolefin color and stability.

Primary Polymer Stabilizers

There are many different primary polymer stabilizers which may be employed in the present invention. For example, hindered phenols are employed in the polymer industry as primary polymer stabilizers. There are many hindered phenols which are equally suitable for use in the invention either singly or in combination with each other that are well known to those skilled in the art. Generally, the primary polymer stabilizer may be present in an amount less than about 5000 mg/kg based on the mass of the neat polyolefin. Typically, when present, the amount of water in the composition is in a range of about 50 mg/kg to about 2500 mg/kg based on the mass of the neat polyolefin. The hindered phenol is selected from monophenols, bisphenols, thiobisphenols, polyphenols, hydroxybenzyl aromates, amides of β-(3,5-di-tert-butyl-4-hydroxyphenyl)-propionic acid, esters of β-(3,5-di-tert-butyl-4hydroxyphenyl)-propionic acid with mono- or polyvalent alcohols, spiro compounds, and mixtures thereof.

Exemplary monophenols include, but are not limited to, 2,6-di-tert-butyl-4-methylphenol; 2-tert-butyl-4-methoxyphenol; and 4-(hydroxymethyl)-2,6-di-tert butylphenol.

Exemplary bisphenols include, but are not limited to, 2,2'-methylene-bis-(6-tert-butyl-4-methylphenol); 2,2'-methylene-bis-(6-tert-butyl4-ethylphenol); 2,2-methylene-bis-[4-methyl-6-(α-methylcyclohexyl)-phenol]; 1,1-bis-(5-tert-butyl-4-hydroxy-2-methyl-phenyl)-butane; 2,2-bis-(5-tert-butyl-4-hydroxy-2-methylphenyl)-butane; 2,2-bis-(3,5-di-tert-butyl-4-hydroxyphenyl)-propane; 1,1,3-tris-(5-tert-butyl-4-hydroxy-2-methylphenyl)butane; 2,2-bis-(5-tert-butyl-4-hydroxy-2-methylphenyl)-4-n-dodecylmercaptobutane; 1,1,5,5-tetra-(5-tert-butyl-4-hydroxy-2-methyl-phenyl)-pentane; ethylene glycol-bis-[3,3-bis-(3'-tert-butyl-4'-hydroxybenzyl)-butyrate]; 1,1-bis-(3,5-dimethyl-2-hydroxyphenyl)-3-(n-dodecylthio)-butane; and 4,4'-thio-bis-(6-tert-butyl-3-methylphenol).

Exemplary thiobisphenols include, but are not limited to, 4,4'-thiobis(6-tert-butyl-m-cresol); 1,1'-thiobis(2-naphthol); and 2,2'-thiobis(4-methyl-6-tert-butylphenol).

Exemplary polyphenols include, but are not limited to, tetrakis(methylene-3-(3,5-di-tert-butyl-4-hydroxyphenyl) propionate) methane; 1,3,5-trimethyl-2,4,6-tris(3,5-di-tert-butyl-4-hydroxybenzyl)-benzene; 1,3,5-tris(3,5-di-tert-butyl-4-hydroxybenzyl)isocyanurate; and tetrakis[methylene (3,5-di-tert-butyl-4-hydroxyhydrocinnamate)]methane.

Exemplary hydroxybenzyl aromates include, but are not limited to, 1,3,5-tri-(3,5-di-tert-butyl-4-hydroxybenzyl)-2,4,6-trimethylbenzene; 2,2-bis-(3,5-di-tert-butyl-4-hydroxybenzyl)-malonic acid-dioctadecyl ester; 1,3,5-tris-(3,5-di-tert-butyl-4-hydroxybenzyl)-isocyanurate; and 3,5-di-tert-butyl-4hydroxybenzyl-phosponic acid-diethyl ester.

Exemplary amides of β-(3,5-di-tert-butyl-4-hydroxyphenyl)-propionic acid include, but are not limited to, 1,3,5-tris-(3,5-di-tert-butyl-4-hydroxyphenyl-propionyl-hexahydro-s-triazine and N,N'-di(3,5-di-tert-butyl-4-hydroxyphenyl-propionyl)-hexamethylenediamine.

Exemplary hindered phenols include, but are not limited to, esters of β-(3,5-di-tert-butyl-4-hydroxyphenyl)-propionic acid with mono- or polyvalent alcohols, such as with methanol, octadecanol, 1,6-hexanediol, ethylene glycol, thiodiethylene glycol, neopentyl glycol, pentaerythritol, and tris-hydroxyethyl-isocyanurate.

Exemplary spiro compounds include, but are not limited to, diphenolic spiro-diacetals or spiro-diketals, such as, for example, 2,4,8,10-tetraoxaspiro-[5,5]-undecane substituted in the 3- and 9-position with phenolic radicals, such as 3,9-bis-(3,5-di-tert-butyl-4-hydroxyphenyl)-2,4,8,10-tetraoxaspiro-[5,5]-undecane and 3,9-bis-[1,1-dimethyl-2-(3,5-ditert-butyl-4-hydroxyphenyl)-ethyl]-2,4,8,10-tetraoxaspiro-[5,5]-undecane.

In one aspect of the present invention, hindered phenols are selected from tetrakis[methylene(3,5-di-tert-butyl-4-hydroxyhydrocinnamate)]methane; 1,3,5-tri-(3,5-di-tert-butyl-4-hydroxybenzyl)-2,4,6-trimethylbenzene; β-(3,5-di-tert-butyl-4-hydroxyphenyl)-propionic acid-n-octadecyl ester; 2,6-di-tert-butyl-4-methyl-phenol; 3,9-bis-[1,1-dimethyl-2-(3,5-di-tert-butyl-4-hydroxy-phenyl)-ethyl]-2,4,8,10-tetraoxaspiro-[5,5]-undecane, and mixtures thereof. These hindered phenols provide improved color and stability for polyolefins.

In another aspect of the present invention, the hindered phenol compound is tetrakis[methylene(3,5-di-tert-butyl-4-hydroxyhydrocinnamate)]methane, since it provides excellent color and stability polyolefin properties. Tetrakis[methylene(3,5-di-tert-butyl-4-hydroxyhydrocinnamate)]methane can be obtained commercially from Ciba Specialty Chemicals as Irganox® 1010.

Generally, the hindered phenol is present in an amount less than about 5000 mg/kg based on the mass of neat polyolefin. Further, the hindered phenol may be present in an amount within the range of about 1 mg/kg to about 2000 mg/kg based on the mass of neat polyolefin. Yet, the hindered phenol may be present in an amount within a range of 50 mg/kg to 1000 mg/kg based on the mass of neat polyolefin. Hindered phenol concentrations above 5000 mg/kg can exceed FDA limits and increase production costs, and phenol concentrations below 50 mg/kg can be too low to ensure polyolefin stability.

Water Addition

In accordance with this invention, it has been found that the addition, or presence, of water can improve the color of the polyolefin over polyolefins without water. However, the presence of water is not required. Generally, water may be present in an amount up to about 5000 mg/kg based on the mass of neat polyolefin. Alternatively, water may be present in an amount up to about 2000 mg/kg based on the mass of neat polyolefin. Yet, water may be present in an amount up to 1000 mg/kg based on the mass of neat polyolefin. Water concentrations above 5000 mg/kg can cause bubbles in the polyolefin making it commercially unacceptable. Typically, when present, the amount of water in the composition is in a range of about 1 mg/kg to about 5000 mg/kg based on the mass of the neat polyolefin.

Water added to the polyolefin can have a pH within a range of about 4 to about 10. Further, the water can have a pH within a range of about 6 to about 8. A pH lower than 4 can cause production equipment to corrode, and water at a pH higher than 10 can react with the hindered phenol reducing the stability of the polyolefin.

Polymer Additives

The resulting stabilized polyolefin compositions of this invention comprising the polyolefin, the high activity phosphite, and the hydrolytically stable phosphite, with or without the presence of either the primary polymer stabilizer or water, may optionally also contain various conventional additives, such as the following:

(1) Antioxidants, including, but not limited to, (1.1) Alkylated hydroquinones, such as, for example, 2,6-di-t-butyl-4-methoxyphenol; 2,5-di-t-butyl-hydroquinone; 2,5-di-6-amyl-hydroquinone; and 2,6-diphenyl-4-octadecyloxyphenol;

(1.2) Hydroxylated thiodiphenyl ethers, such as, for example, 2,2'-thio-bis-(6-t-butyl-4-methylphenol); 2,2'-thio-bis-(4-octylphenol); 4,4'-thio-bis-(6-t-butyl-3-methylphenol); and 4,4'-thio-bis-(6-t-butyl-2-methylphenol);

(1.3) Benzyl compounds, such as, for example, 1,3,5-tris-(3,5-di-t-butyl-4-hydroxybenzyl)-2,4,6-trimethylbenzene; bis(3,5-di-t-butyl-4-hydroxybenzyl)sulfide; isooctyl-3,5-di-t-butyl-4-hydroxybenzyl-mercaptoacetate; bis-(4-t-butyl-3-hydroxy-2,6-dimethylbenzyl)dithiolterephthalate; 1,3,5-tris (3,5-di-t-butyl-4-hydroxybenzyl)isocyanurate; 1,3,5-tris(4-t-butyl-3-hydroxy-2,6-dimethylbenzyl)isocyanurate; dioctadecyl-3,5-di-t-butyl-4-hydroxybenzyl-phosphonate; calcium salt of monoethyl 3,5-di-t-butyl-4-hydroxybenzylphosphonate; and 1,3,5-tris-1,3,5-dicyclohexyl-4-hydroxybenzyl)isocyanurate;

(1.4) Acylaminophenols, such as, for example, 4-hydroxy-lauric acid anilide; 4-hydroxy-stearic acid anilide; 2,4-bis-octylmercapto-6-(3,5-t-butyl-4-hydroxy-anilino)-s-triazine; and octyl-n-(3,5-di-t-butyl-4-hydroxyphenyl)-carbamate;

(1.5) Esters of β-(5-t-butyl-4-hydroxy-3-methyl-phenyl) propionic acid with monohydric or polyhydric alcohols, such as, for example, methanol; diethyleneglycol; octadecanol; triethyleneglycol; 1,6-hexanediol; pentaerythritol; neopentylglycol; tris-hydroxyethyl isocyanurate; thiodiethyleneglycol; N,N'-bis(hydroxyethyl)oxalic acid diamide; and di-hydroxyethyl oxalic acid diamide;

(2) UV absorbers and light stabilizers (2.1) 2-(2'-Hydroxyphenyl)-benzotriazoles, such as, for example, the 5'-methyl-, 3',5'-di-t-butyl-, 5'-t-butyl-, 5'-(1,1,3,3-tetramethylbutyl)-, 5-chloro-3'-, 5'-di-t-butyl-, 5-chloro-3'-t-butyl-5'-methyl-, 3'-sec-butyl-5'-t-butyl, 4'-octoxy, 3',5'-di-t-amyl-, and 3',5'-bis-(α,α-dimethylbenzyl)-derivatives;

(2.2) 2-Hydroxy-benzophenones, such as, for example, the 4-hydroxy-, 4-methoxy-, -octoxy-, 4-decyloxy-, 4-dodecyloxy-, 4-benzyloxy-, 4,2',4'-trihydroxy-, and 2'-hydroxy-4,4'-dimethoxy-derivatives.

(2.3) Esters of substituted and unsubstituted benzoic acids, such as, for example, phenyl salicylate; 4-t-butylphenyl-salicylate; octylphenyl salicylate; dibenzoyl-resorcinol; bis-(4-t-butylbenzoyl)-resorcinol; benzoylresorcinol; 2,4-di-t-butyl-phenyl-3,5-di-t-butyl-4-hydroxybenzoate; and hexadecyl-3,5-di-t-butyl-4-hydroxybenzoate;

(2.4) Acrylates, such as for example, α-cyano-β,β-diphenylacrylic acid ethyl ester or isooctyl ester; α-carbomethoxy-cinnamic acid methyl ester; α-cyano-β-methyl-p-methoxy-cinnamic acid methyl ester or butyl ester; α-carbomethoxy-p-methoxy-cinnamic acid methyl ester; and N-(β-carbomethoxy-β-cyano-vinyl)-2-methyl-indoline.

(2.5) Nickel compounds, such as, for example, nickel complexes of 2,2'-thio-bis-[4-(1,1,3,3-tetramethylbutyl)-phenol], such as the 1:1 or 1:2 complex, optionally with additional ligands such as n-butylamine, triethyanolamine or N-cyclohexyl-di-ethanolamine, nickel dibutyl-dithiocarbamate, nickel salts of 4-hydroxy-3,5-di-t-butylbenzylphosphonic acid monoalkyl esters, such as of the methyl, ethyl or butyl ester, nickel complexes of ketoximes such as of 2-hydroxy-4-methyl-phenyl undecyl ketoxime, and nickel complexes of 1-phenyl-4-lauroyl-5-hydroxy-pyrazol, optionally with additional ligands.

(2.6) Sterically hindered amines, such as, for example bis-(2,2,6,6-tetramethylpiperidyl)-sebacate; bis-(1,2,2,6,6-pentamethylpiperidyl)-sebacate; n-butyl-3,5-di-t-butyl-4-hydroxybenzyl malonic acid bis-(1,2,2,6,6-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylendiamine and 4-t-octylamino-2,6-dichloro-1,3,5-s-triazine; tris-(2,2,6,6-tetramethylpiperidyl)-nitrilotriacetate; tetrakis-(2,2,6,6-tetramethyl-4-piperidyl)-1,2,3,5-butane-tetracarbonic acid; 1,1'-(1,2-ethanediyl)-bis-(3,3,5,5-tetramethylpiperazinone). Such amines include hydroxylamines derived from hindered amines, such as di-(1-hydroxy-2,2,6,6-tetramethylpiperidin-4-yl)sebacate; 1-hydroxy-2,2,6,6-tetramethyl-4-benzoxypiperidine; 1-hydroxy-2,2,6,6-tetramethyl-4(3,5-di-t-butyl-4-hydroxyhydrocinnamoyloxy)piperidine; and N-(1-hydroxy-2,2,6,6-tetramethylpiperidin-4-yl)-ε-caprolactam.

(2.7) Oxalic acid diamides, such as, for example, 4,4'-dioctyloxy-oxanilide; 2,2'-di-octyloxy-5,5-di-t-butyl-oxanilide; 2,2'-di-dodecyloxy-5,5'-di-t-butyl-oxanilide, 2-ethoxy-2'-ethyl-oxanilide; N,N'-bis(3-dimethylaminopropyl)-oxalamide; 2-ethoxy-5-t-butyl-2'-ethoxyanilide and its mixture with 2-ethoxy-2'-ethyl-5,4'-di-t-butyloxanilide and mixtures of o-methoxy and p-methoxy as well as of o-ethoxy and p-ethoxy disubstituted oxanilides.

(3) Metal deactivators, such as, for example, N,N'-diphenyloxalic acid diamide; N-salicylal-N-salicyloylhydrazine; N,N'-bis-salicyloylhydrazine; N,N'-bis-(3,5-di-t-butyl-4-hydroxyphenylpropionyl)-hydrazine; salicyloylamino-1,2,4-triazole; bis-benzylidene-oxalic acid dihydrazide.

(4) Phosphites and phosphonites, such as, for example, triphenyl phosphite; diphenylalkyl phosphites; phenyldialkyl phosphites; tris(nonyl-phenyl)phosphite; trilauryl phosphite; trioctadecyl phosphite; distearyl pentaerythritol diphosphite; tris(2,4-di-t-butyl-phenyl)phosphite; diisodecyl pentaerythritol diphosphite; bis(2,4-di-t-butylphenyl)pentaerythritol diphosphite; tristearyl sorbitol triphosphite; and tetrakis(2,4-di-t-butylphenyl) 4,4'-biphenylene diphosphonite.

(5) Peroxide scavengers, such as, for example, esters of β-thiodipropionic acid, for example, the lauryl, stearyl, myristyl or tridecyl esters, mercaptobenzimidazole or the zinc salt of 2-mercaptobenzimidazole, zinc-dibutyl-dithiocarbamate, dioctadecyldisulfide, pentaerythritol-tetrakis(β-dodecyl-mercapto)-propionate.

(6) Polyamide stabilizers, such as, for example, copper salts in combination with iodides and/or phosphorus compounds and salts of divalent manganese.

(7) Basic co-stabilizers, such as, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, barium stearate, magnesium stearate, sodium ricinoleate, potassium palmirate, antimony pyrocatecholate and zinc pyrocatecholate.

(8) Nucleating agents, such as, for example, 4-t-butylbenzoic acid, adipic acid, and dephenylacetic acid.

(9) Fillers and reinforcing agents, such as, for example, calcium carbonate, silicates, glass fibers, asbestos, talc, kaolin, mica, barium sulfate, metal oxides and hydroxides, carbon black, and graphite.

(10) Aminoxy propionate derivatives, such as, for example, methyl-3-[N,N-dibenzylaminoxy]propanoate; ethyl-3-[N,N-dibenzylaminoxy]propanoate; 1,6-hexamethylene-bis[3-(N,N-dibenzylaminoxy)propionate]; methyl-[2-(methyl)-3-(N,N-dibenzylaminoxy)propionate]; octadecyl-3-[N,N-dibenzyl-aminoxy]propanoic acid; tetrakis[N,N-dibenzylaminoxy)ethyl carbonyl oxymethyl]methane; octadecyl-3-[N,N-diethylaminoxy]propanoate; 3-[N,N-dibenzylaminoxypropanoic acid potassium salt; and 1,6-hexamethylene-bis[3-(N-allyl-N-dodecyl aminoxy)propionate].

(11) Other additives, such as, for example, plasticizers, lubricants, emulsifiers, pigments, optical brighteners, flameproofing agents, antistatic agents, blowing agents and thiosynergists such as dilaurylthiodipropionate or distearylthiodipropionate.

(12) Other additives, such as, for example, oxazaphospholidines, may additionally or alternatively be present.

(13) An inorganic base, a Lewis base, or an aliphatic amine. Aliphatic amines include, but are not limited to, triisopropanolamine (TIPA) and has the formula:

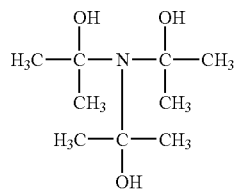

Triisopropanolamine is available commercially under the trademark name of Triisopropanolamine 99 from Dow Chemical Company in Midland, Mich. A blend of bis(2,4-dicumylphenyl)pentaerythritol diphosphite and triisopropanolamine is commercially available under the trademark name of Doverphos S9228T from Dover Chemical Company in Dover, Ohio.

Generally, triisopropanolamine, when present, is in an amount less than about 5% by weight based on the mass of the polyolefin component without additives. In another aspect of the present invention, triisopropanolamine may be present in an amount within the range of about 0.25% by weight to about 3% by weight based on the mass of the polyolefin component without additives. In yet another aspect of the present invention, triisopropanolamine may be present in an amount within a range of 0.5% by weight to 2% by weight based on the mass of the polyolefin component without additives. Typically, when present, the amount of triisopropanolamine in the composition is in a range of about 0.25 mg/kg to about 100 mg/kg based on the mass of the neat polyolefin.

(14) Acid scavenger, such as, a hydrotalcite component which can be any magnesium-aluminum hydroxide compound. Generally, the hydrotalcite component is hydrated and contains a mixture of aluminum hydroxide and a magnesium salt, such as, for example, magnesium sulfate or magnesium phosphate. The hydrotalcite component can be obtained as a natural product or synthetic product. The natural product is held to possess the structure, $Mg_6Al_2(OH)_{16}CO_3 \cdot 4H_2O$. Suitable hydrotalcite components can be selected from the group consisting of $Mg_{0.7}Al_{0.3}(OH)_2(CO_3)_{0.15} \cdot 0.54H_2O$, $Mg_{4.5}Al_2(OH)_{13}CO_3 \cdot 3.5H_2O$, $MgCO_3 \cdot 5Mg(OH)_2 \cdot 2Al(OH)_3 \cdot 4H_2O$, and $Mg_{4.2}Al_2(OH)_{12.4}CO_3$. Preferably, the hydrotalcite component is $MgCO_3 \cdot 5Mg(OH)_2 \cdot 2Al(OH)_3 \cdot 4H_2O$, which is commercially available under the trademark names of DHT-4A and DHT-4V, both from Kyowa Chemical Industry Company in Osaha, Japan. Typically, when present, the amount of the acid scavenger in the composition is in a range of about 1.25 mg/kg to about 500 mg/kg based on the mass of the neat polyolefin.

The hydrotalcite component can also include any zinc-aluminum hydroxide compound. For example, a zinc-aluminum hydroxide is commercially available under the trademark name of ZHT-4D from Kyowa Chemical Industry Company in Osaha, Japan.

Generally, the hydrotalcite component is present in an amount less than about 500 mg/kg based on the mass of the polyolefin component without additives. In another aspect of the invention, the hydrotalcite component is present in an amount within the range of about 1.25 mg/kg to about 500 mg/kg based on the mass of the polyolefin component without additives. Yet, in another aspect of the present invention, the hydrotalcite component is present in an amount within a range of 2.5 mg/kg to 37.5 mg/kg based on the mass of the polyolefin component without additives. These hydrotalcite component ranges efficiently extend the life of the bis(2,4-dicumylphenyl)pentaerythritol in the polyolefin composition.

Other components can be also be blended with the polyolefin composition. For example, antifogging agents, antimicrobial agents, coupling agents, flame retardants, forming agents, fragrances, lubricants, mold release agents, organic peroxides, smoke suppressants, and heat stabilizers. Further information on these compounds can be found in Modern Plastics Encyclopedia, 1992, pages 143–198.

Polyolefin Applications

To produce a polyolefin with improved color, stability, and melt strength after recycling, a process is employed comprising blending the following components:

a) a polyolefin;

b) at least one high activity phosphite comprising an arylalkyl diphosphite having a formula,

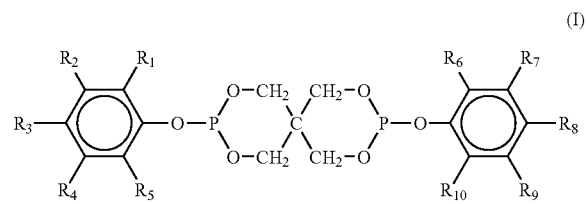

wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, and/or cycloaliphatic organic radicals having from about 1 to about 20 carbon atoms per radical;

c) at least one hydrolytically stable phosphite comprising a triarylphosphite having a formula:

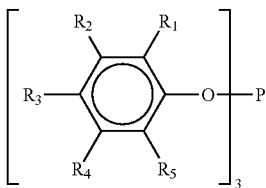

wherein $R_1$, $R_2$, $R_3$, $R_4$, and $R_5$, are selected from hydrogen or straight-chained or branched, cyclic or acyclic, aromatic or aliphatic, and mixed aliphatic, aromatic, and/or cycloaliphatic organic radicals having from about 1 to about 20 carbon atoms per radical;

d) optionally, a primary polymer stabilizer;
e) optionally, an acid scavenger;
f) optionally, an inorganic base, Lewis base, or aliphatic amine; and
g) optionally, water.

The combination of the at least one high activity phosphite and the at least one hydrolytically stable phosphite with the polyolefin improves color over polyolefins produced without water or a second phosphite. In one aspect of the present invention, the hydrolytically stable phosphite is present in the composition in an amount sufficient to raise, after processing, the Phillips Color Number (PE #) to a value greater than the PE # of a composition formed by combining like amounts of the polyolefin, the high activity phosphate, a hindered phenol, and water. In addition, polyolefin stability is improved by the use of the combination of the at least one high activity phosphite, the at least one hydrolytically stable phosphite and the polyolefin.

Furthermore, when the at least one high activity phosphite and the at least one hydrolytically stable phosphite are added to the polyolefin, recycled polyolefins or reworked polyolefins have improved melt strength through multiple regrind passes. As defined in this disclosure, "recycled polyolefins" or "reworked polyolefins" are polyolefins that have been reground or pelletized after having been previously processed by molding, extrusion or other applications. "Regrind passes" is defined as the number of times the polyolefin is ground into pieces to be reused in new applications. Melt strength is a measure of the strength of the plastic while in the molten state. Further discussion of the regrind procedure is provided in the examples below.

Any of the additives herein discussed, excluding water, can be combined with the polyolefins according to any method known in the art and at any time after formation of the polyolefin in production processes, or prior to, during, or after fabrication into articles. Exemplary methods of combining the phosphite additives with the polyolefin, include, but are not limited to, mixing, pelletizing, extruding, and mixtures thereof. The phosphite additives can be preblended together and then combined with the polyolefin, or the phosphite additives can be combined individually with the polyolefin. Phosphite additives of in accordance with the present invention may be in solid form, solution, or a slurry. Further, the polyolefin can be in any form, such as, for example, fluff, powder, granulate, pellet, solution, slurry, and/or emulsion.

Water can be combined with a polyolefin prior to, during, and/or after fabrication of the polyolefin into articles. Water can be added by any method known in the art including water spray or steam injection systems. In one aspect of the present invention, water at ambient temperature is routed via a pumping system to the throat of an extruder. Another aspect of the present invention includes adding water via an atomization spray system. These methods permit uniform water addition to be obtained.

Another aspect of the present invention provides a composition formed by combining components comprising:

a) a polyolefin selected from homopolymers of one mono-1-olefin having from about 2 to about 10 carbon atoms per molecule or copolymers of at least 2 different mono-1-olefins having about 2 to about 10 carbon atoms per molecule;

b) a high activity phosphite comprising an arylalkyl diphosphite having a formula,

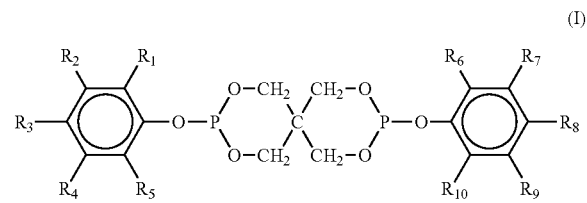

(I)

wherein $R_2$, $R_4$, $R_5$, $R_7$, $R_9$, and $R_{10}$ are hydrogen and $R_1$, $R_3$, $R_6$, and $R_8$ are mixed aliphatic and aromatic organic radicals having from about 1 to about 20 carbon atoms per radical;

c) a hydrolytically stable phosphite comprising a triarylphosphite having a formula,

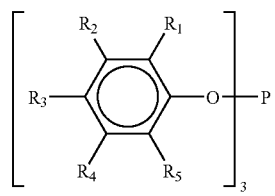

wherein $R_2$, $R_4$, and $R_5$ in the triarylphosphite are hydrogen and $R_1$ and $R_3$ are selected from straight-chained or branched organic radicals having from about 1 to about 20 carbon atoms per radical, the high activity phosphite and the hydrolytically stable phosphite being present in a total phosphite amount within a range of about 50 mg/kg to about 20,000 mg/kg based on the mass of the neat polyolefin;

d) optionally, another arylalkyl diphosphite of formula (I), wherein $R_2$, $R_4$, $R_5$, $R_7$, $Rg_9$ and $R_{10}$ in the another arylalkyl diphosphite are hydrogen and $R_1$, $R_3$, $R_6$, and $R_8$ are selected from straight-chained or branched organic radicals having from about 1 to about 20 carbon atoms per radical;

e) optionally, a hindered phenol in an amount within a range of about 50 mg/kg to about 5000 mg/kg based on the mass of the neat polyolefin;

f) optionally, water in an amount up to about 5000 mg/kg based on the mass of the neat polyolefin;

g) optionally, a hindered amine in an amount within a range of about 50 mg/kg to about 5,000 mg/kg based on the mass of the neat polyolefin; and h) optionally, triisopropanolamine in an amount within a range of about 0.25 mg/kg to about 100 mg/kg based on the mass of the neat polyolefin; and i) optionally, an acid scavenger in an amount within a range of about 1.25 mg/kg to about 500 mg/kg based on the mass of the neat polyolefin.

Some triarylphosphites are relatively hydrolytically resistant compared to arylalkyl diphosphites.

In another aspect of the present invention, a process comprises blending:
a) a polyolefin;
b) a high activity phosphite comprising an arylalkyl diphosphite having a formula,

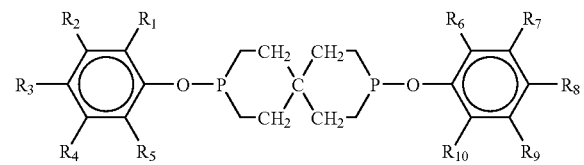
(I)

wherein $R_1$, $R_2$, $R_3$, $R_4$, $R_5$, $R_6$, $R_7$, $R_8$, $R_9$, and $R_{10}$ can be the same or different and are selected from hydrogen or straight chained or branched, cyclic or acyclic, aromatic or aliphatic, and mixed aliphatic, aromatic, or cycloaliphatic organic radicals having from about 1 to about 20 carbon atoms per radical;
c) a hydrolytically stable phosphite comprising a triarylphosphite having a formula,

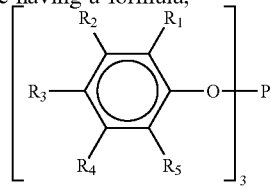

wherein $R_1$, $R_2$, $R_3$, $R_4$, and $R_5$ are selected from hydrogen or straight chained or branched, cyclic or acyclic, aromatic or aliphatic, and mixed aliphatic, aromatic, or cycloaliphatic organic radicals having from about 1 to about 20 carbon atoms per radical;
d) optionally, another arylalkyl diphosphite of formula (I), wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, and/or cycloaliphatic organic radicals having from about 1 to about 20 carbon atoms per radical, which is different from the high activity phosphite;
e) optionally, a hindered phenol; and
f) optionally, water;
g) optionally, hindered amine;
h) optionally, an aliphatic amine; and
i) optionally, an acid scavenger.

Still, in another process of the present invention, melt stability of a polyolefin composition is improved the upon recycle of a polyolefin by blending:
a) a polyolefin;
b) a high activity phosphite comprising an arylalkyl diphosphite having a formula,

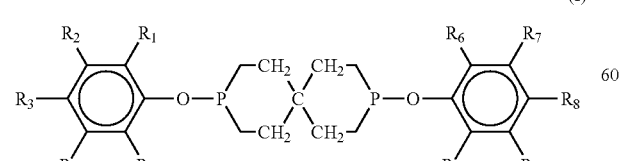
(I)

wherein $R_1$, $R_2$, $R_3$, $R_4$, $R_5$, $R_6$, $R_7$, $R_8$, $R_9$, and $R_{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;
c) a hydrolytically stable phosphite comprising a triarylphosphite having a formula,

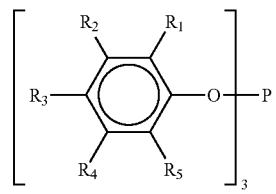

wherein $R_1$, $R_2$, $R_3$, $R_4$, and $R_5$ are selected from hydrogen or straight-chained or branched, cyclic or acyclic, aromatic or aliphatic, and mixed aliphatic, aromatic, or cycloaliphatic organic radicals having from about 1 to about 20 carbon atoms per radical;
d) optionally, another arylalkyl diphosphite of formula (I), wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, or cycloaliphatic organic radicals having from about 1 to about 20 carbon atoms per radical, which is different from the high activity phosphite;
e) optionally, a hindered amine in an amount within a range of about 50 mg/kg to about 5,000 mg/kg based on the mass of the neat polyolefin;
f) optionally, triisopropanolamine in an amount within a range of about 0.25 mg/kg to about 1000 mg/kg based on the mass of the neat polyolefin;
g) optionally, a hindered phenol;
h) optionally, water; and
i) optionally, an acid scavenger.

Further, in accordance with the present invention, a process to improve the Phillips Color Number or whiteness index of a polyolefin comprises blending:
a) a polyolefin;
b) a high activity phosphite comprising an arylalkyl diphosphite having a formula,

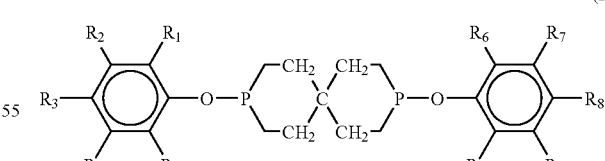
(I)

wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, or cycloaliphatic organic radicals having from about 1 to about 20 carbon atoms per radical;
c) a hydrolytically stable phosphite comprising a triarylphosphite having a formula,

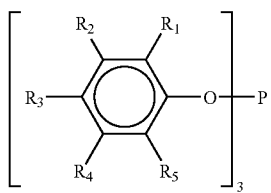

wherein $R_1$, $R_2$, $R_3$, $R_4$, and $R_5$ are selected from hydrogen or straight-chained or branched, cyclic or acyclic, aromatic or aliphatic, and mixed aliphatic, aromatic, or cycloaliphatic organic radicals having from about 1 to about 20 carbon atoms per radical;

d) optionally, another arylalkyl diphosphite of formula (I), wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, or cycloaliphatic organic radicals having from about 1 to about 20 carbon atoms per radical, which is different from the high activity phosphite;

e) optionally, a hindered amine in an amount within a range of about 50 mg/kg to about 5,000 mg/kg based on the mass of the neat polyolefin;

f) optionally, triisopropanolamine in an amount within a range of about 0.25 mg/kg to about 100 mg/kg based on the mass of the neat polyolefin;

g) optionally, a hindered phenol;

h) optionally, water; and i) optionally, an acid scavenger.

Even further, in another aspect of the present invention, an article of manufacture is prepared from a polymer produced by a process comprising blending:

a) a polyolefin;

b) a high activity phosphite comprising an arylalkyl diphosphite having a formula,

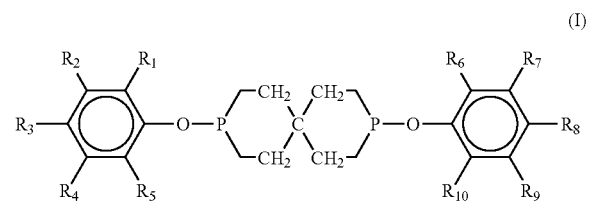
(I)

wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, or cycloaliphatic organic radicals having from about 1 to about 20 carbon atoms per radical;

c) a hydrolytically stable phosphite comprising a triarylphosphite having a formula,

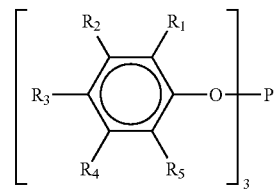

wherein $R_1$, $R^2$, $R^3$, $R^4$, and $R^5$ are selected from hydrogen or straight-chained or branched, cyclic or acyclic, aromatic or aliphatic, and mixed aliphatic, aromatic, and/or cycloaliphatic organic radicals having from about 1 to about 20 carbon atoms per radical;

d) optionally, a second arylalkyl diphosphite of formula (I), wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, or cycloaliphatic organic radicals having from about 1 to about 20 carbon atoms per radical, which is different from the high activity phosphite;

e) optionally, a hindered amine in an amount within a range of about 50 mg/kg to about 5,000 mg/kg based on the mass of the neat polyolefin;

f) optionally, triisopropanolamine in an amount within a range of about 0.25 mg/kg to about 100 mg/kg based on the mass of the neat polyolefin;

e) optionally, a hindered phenol;

f) optionally, water; and i) optionally, an acid scavenger.

The article of manufacture can be produced by any means known in the art, such as, but not limited to, extrusion, blow molding, injection molding, and thermoforming. Further information on processing the polyolefin composition into a manufacture can be found in MODERN PLASTICS ENCYCLOPEDIA, 1992, pages 222–298, which is incorporated herein by reference.

In another aspect of the present invention, a kit may be prepared employing the above-described aspects of the present invention. Accordingly, the kit comprises:

a) at least one high activity phosphite comprising an arylalkyl diphosphite having a formula,

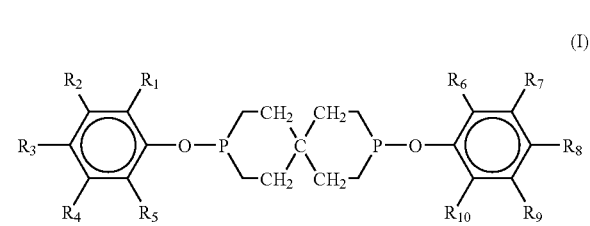
(I)

wherein $R_1$, $R_2$, $R_3$, $R_4$, $R_5$, $R_6$, $R_7$, $R_8$, $R_9$, and $R_{10}$ can be the same or different and are selected from hydrogen or straight-chained or branched, cyclic or acyclic, aromatic or aliphatic, and mixed aliphatic, aromatic, and/or cycloaliphatic organic radicals having from about 1 to about 20 carbon atoms per radical; and b) at least one hydrolytically stable phosphite comprising a triarylphosphite having a formula:

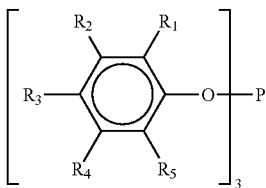

wherein $R_1$, $R_2$, $R_3$, $R_4$, and $R_5$, are selected from hydrogen or straight-chained or branched, cyclic or acyclic, aromatic or aliphatic, and mixed aliphatic, aromatic, and/or cycloaliphatic organic radicals having from about 1 to about 20 carbon atoms per radical. The at least one high activity phosphite and the at least one hydrolytically stable phosphite may be mixed with one another and presented as a mixture in the kit. Alternatively, the at least one high activity phosphite and the at least one hydrolytically stable phosphite may be presented in the kit as separate items. For example, each high activity phosphite and each hydrolytically stable phosphite may be presented in the kit respectively separate from one another or presented as mixtures of high activity phosphites and mixtures of hydrolytically stable phosphites, each mixture being separate from the other.

EXAMPLES

The following examples are provided to assist a person skilled in the art with further understanding of this invention. These examples are intended to be illustrative of the invention but are not meant to be construed as limiting the reasonable scope of the invention.

Chemical compounds utilized in these examples are summarized below:

A. bis(2,4-dicumylphenyl)pentaerythritol diphosphite (CAS No. 154862-43-8), commercially available as Doverphos® S-9228, which is a registered trademark of Dover Chemical Company. Doverphos® 9960C is 95 wt. % Doverphos® S-9228T and 5 wt. % DHT-4A. Doverphos® S-9228T is 99 wt. % Doverphoso S-9228 and 1 wt. % TIPA;

B. bis(2,4-di-t-butylphenyl)pentaerythritol diphosphite (CAS No. 26741-53-7), commercially available as Ultranox® 626, which is a registered trademark of General Electric Co.;

C. bis(2,6-di-tert-butyl,4-methylphenyl)pentaerythritol diphosphite (CAS No. 80693-00-1), commercially available as PEP-36, which is a registered trademark of Amfine Chemical Corporation;

D. bis(2,4-di-t-butylphenyl)pentaerythritol diphosphite, commercially available as Ultranox® 627A, which is a registered trademark of General Electric Co.;

E. bis(2,4-di-t-butylphenyl)pentaerythritol diphosphite, commercially available as Alkanox® P-24, which is a registered trademark of Great Lakes Chemical Co.;

F. tris-(2,4-di-tert-butylphenyl)phosphite commercially obtained as DoverPhos® S-480, which is a registered trademark of Dover Chemical Company;

G. tris(2,4-di-tert-butylphenyl)phosphite, commercially available as Irgafos® 168, which is a registered trademark of Ciba Specialty Chemicals Company;

H. tetrakis [methylene(3,5-di-tert-butyl-4-hydroxy-hydrocinnamate)]methane, a hindered phenol, commercially available as Anox® 20, which is a registered trademark of Great Lakes Chemical Company;

I. tetrakis[methylene(3,5-di-tert-butyl-4-hydroxy-hydrocinnamate)]methane, a hindered phenol, commercially available as Irganox® 1010, which is a registered trademark of Ciba Specialty Chemicals Company;

J. ZHT-4D, an acid scavenger, commercially available from Kyowa Chemical Industry Company;

K. DHT-4A and DHT-4V, acid scavengers, commercially available from Kyowa Chemical Industry Company; and L. UV concentrate is a LDPE carrier with a loading of about 20 wt. % of the total concentrate of Ciba Chimassorb 944. Chimassorb 944 is the commercial product of poly[(6-[1,1,3,3,tetramethylbutyl)amino]-s-triazine-2,4-diyl][(2,2,6,6-tetramethyl-4-piperidyl)imino]hexamethylene[(2,2,6,6-tetramethyl-4-piperidyl)imino]].

The UV concentrate may be present in the composition of the present invention in an amount up to about 2.5 wt. % of the total composition.

In the examples below, the following physical properties were determined in accordance with the respectively indicated ASTM standards:

Flow Rate (HLMI)—ASTM D1505, Condition 190/21.6.
Flow Rate ($I_5$)—ASTM D1505, Condition 190/5.0.
ESCR A—ASTM D1693, Condition A (100% Igepal), F50.
ESCR B 10%—ASTM D1693, Condition B (10% Igepal), F50.
Tensile Impact—ASTM D1822, Type S bar.
Oxidative Induction Time (OIT)—ASTM D3895.

The molecular weight distribution of a polymer, HI, is defined as Mw/Mn, wherein Mn is the number average molecular weight distribution and Mw is the weight average molecular weight distribution. Molecular weights and molecular weight distributions were obtained using a PL 220 SEC high temperature chromatography unit (Polymer Laboratories) with trichlorobenzene (TCB) as the solvent, with a flow rate of about 1 mL/minute at a temperature of about 145° C. BHT (2,6-di-tert-butyl-4-methylphenol) at a concentration of 0.5 g/L was used as a stabilizer in the TCB. An injection volume of about 200 L was used with a nominal polymer concentration of about 1.5 mg/mL. Dissolution of the sample in stabilized TCB was carried out by heating at about 150° C. for about 5 hours with occasional, gentle agitation. The columns used were three PLgel Mixed A LS columns (7.8×300 mm) and were calibrated with a broad linear polyethylene standard (Phillips Marlex® BHB 5003) for which the molecular weight had been determined.

Melt viscosity was determined as follows. Samples were compression molded at about 184° C. for a total of three minutes. The samples were allowed to melt at a relatively low pressure for about one minute and then subjected to a high molding pressure for about an additional two minutes. The molded samples were then quenched in a cold press at room temperature. Room temperature is defined herein as about 25° C. 2 mm×25.4 mm diameter disks were stamped out of the molded slabs for rheological characterization. Fluff samples were stabilized with 0.1 wt % BHT dispersed in acetone characterization. Fluff samples were stabilized with 0.1 wt % BHT dispersed in acetone Small-strain oscillatory shear measurements were performed on a Rheometrics Inc. (now TA Instruments) ARES oscillatory rheometer using parallel-plate geometry. The test chamber of the rheometer was blanketed in nitrogen in order to minimize polymer degradation. The rheometer was preheated to the initial temperature of the study. Upon sample loading and after oven thermal equilibration, the specimens were squeezed between the plates to a 1.6 mm thickness and the excess was trimmed. A total time of approximately 8 minutes elapsed between the time the sample was inserted between the plates and the time the frequency sweep was started.

Strains were generally maintained at a single value throughout a frequency sweep but larger strain values were used for low viscosity samples to maintain a measurable torque. Smaller strain values were used for high viscosity samples to avoid overloading the torque transducer and to keep within the linear viscoelastic limits of the sample. The instrument automatically reduces the strain at high frequencies if necessary to keep from overloading the torque transducer.

Viscosity data were fit with a Carreau-Yasuda model (Eq. 1) to obtain estimates of the zero shear viscosity, viscous relaxation time, and breadth parameter.

$$|\eta^*|=\eta_0/[1+(\omega\tau_\eta)^a]^{((1-n)/a)},\qquad(Eq.\ 1)$$

where: $|\eta^*|$=magnitude of the complex viscosity
107 =angular frequency
$\eta_0$=zero shear viscosity
$\tau_\eta$=viscous relaxation time
a=breadth parameter
n=power law parameter, fixed at 0.1818

Viscosities at 0.1 and 100 rad/s were obtained from the Carreau-Yasuda fit to the data. G' (storage modulus) and G" (loss modulus) data were used to determine the crossover (G'=G") modulus and angular frequency and the loss tangent (G"/G') at angular frequencies of 0.1 and 100 rad/s.

The Regrind or Multi-Pass Test was conducted utilizing the following procedure. Processing was conducted on a Kautex KB-25 blow-molding machine at a temperature of about 420° F. with a nine-gallon drop impact mold. Tooling employed during the evaluation was a 4.5 inch diverging die. A standard processing procedure was conducted for this evaluation. A die gap of approximately 0.196 inch was used during the main processing portion of the evaluation.
1. Sample virgin pellets and process through blow-molding machine.
2. Extrude nine gallon container.
3. Sample extruded container (first pass wall section).
4. Chop container into pieces and run pieces back through blow-molding machine to produce a nine gallon container.
5. Sample extruded container from step 4 (second pass wall section).
6. Chop container from step 4 into pieces and run pieces back through blow-molding machine to produce a nine gallon container.
7. Sample extruded container from step 6 (third pass wall section).
8. Chop container from step 6 into pieces and run pieces back through blow-molding machine to produce a nine gallon container.
9. Sample extruded container from step 8 (forth pass wall section).
10. Chop container from step 8 into pieces and run pieces back through blow-molding machine to produce a nine gallon container.
11. Sample extruded container from step 10 (fifth pass wall section).
12. Test material from respective pass walls and pass regrinds for MI, color, GPC, Impact Strength, tensile properties, etc. as indicated in the figures.

Sample preparation for the Regrind Test: Commercial fluff of a copolymer of hexene and ethylene was dry blended with each additive package using a double cone blender.

Extrusion Line: A Werner and Pfleiderer ZSK-40 twin screw extruder with a gear pump was used to extrude the samples for the Regrind Test. The die plate employed for the referenced blend was a standard 10-hole voss die for the ZSK-40 extruder. The hole diameters are 0.1875 inch. Approximate pellet size was 0.125 inch diameter×0.125 inch length.

Processing Conditions for the Regrind Test:
Nitrogen purge on feed chute to extruder to exclude oxygen.
Process Rate—about 80 kg/hr
Extruder Screw Speed—about 290 rpm
Gear Pump Speed—about 21 rpm
Melt Discharge Temperature—about 266° C.

The additives were blended into the polymer powder ("fluff") for each sample being evaluated and then extruded to provide the respective stabilized polyethylene composition. The stabilized polyethylene composition was then reground four times in accordance with the Regrind Test, i.e. initial extrusion, followed by four (4) more repeat steps of regrind and extrusion as specified above. After each regrind pass, the melt strength of the polyethylene was tested to observe the effect of the phosphite additives. Melt strength was determined by measuring the time a parison hangs on a die before it falls off the die. Longer times indicate higher melt strength. Testing of these final, multi-pass samples comprised (a) blow molding containers from each sample, and (b) several tests then performed on the blow molded containers. Also included in the evaluation was processing the first pass regrind with the addition of 1 wt. % UV concentrate (Ciba Chimassorb 944) as in Examples 4–6 and 10–12. The final level of Ciba Chimassorb 944 in the molded part was about 0.2 wt. %. Each package was evaluated on resin stability, processing stability, resin color, and interaction with ultraviolet (UV) additives when present. Applicants believe that this overall procedure mimics the anticipated industry end-use exposure and environment for the polymer of the present invention.

Color evaluation was conducted for the samples of the respective stabilized polyethylene compositions described below. The samples were analyzed by a Hunter Lab D25 Optical Sensor purchased from Hunter Associate Laboratory, Inc. This analysis provided Hunter "a" and Hunter "b" color values for each sample. Hunter "a" value indicates color variation between red and green. Negative Hunter "a" values indicate greenness; positive Hunter "a" values indicate redness. Hunter "b" value indicates color variation between blue and yellow. Negative Hunter "b" numbers indicate blueness; positive Hunter "b" values indicate yellowness. Hunter "L" value indicates color variation between white and black. Negative Hunter "L" values indicate blackness; positive Hunter "L" values indicate whiteness.

Hunter "a", "b", and "L" values were converted to a Phillips Color Number (PE #) by the formula:

$$PE\ \#=L(0.0382L-0.056a-0.3374b)$$

A higher PE# is an indicator of whiter polyethylene.

The compositions identified by Run Number in the following examples were made employing a copolymer of hexene and ethylene with a density of 0.955 g/cc measured by ASTM D1505. The weight percents (wt. %) values of the various additives are percent by weight of the total weight of the composition. When TIPA is present, the amount present within the composition is in accordance with the detailed discussion above.

Examples 1–6

The following compositions were prepared and evaluated as described above.

| Run Number | Additive | Amount in Composition (wt. %) |
|---|---|---|
| 1 | Irganox 1010 | 0.07 |
|   | Doverphos S-9228 | 0.10 |
|   | DHT-4A | 0.01 |
| 2 | Irganox 1010 | 0.07 |
|   | Doverphos 9960C | 0.05 |
|   | Irgafos 168 | 0.05 |
| 3 | Irganox 1010 | 0.07 |
|   | Ultranox 627A | 0.05 |
|   | Irgafos 168 | 0.05 |
| 4 | Irganox 1010 | 0.07 |
|   | Doverphos S-9228 | 0.10 |
|   | DHT-4A | 0.01 |
|   | UV Concentrate | 1.00 |
| 5 | Irganox 1010 | 0.07 |
|   | Doverphos 9960C | 0.05 |
|   | Irgafos 168 | 0.05 |
|   | UV Concentrate | 1.00 |
| 6 | Irganox 1010 | 0.07 |
|   | Ultranox 627A | 0.05 |
|   | Irgafos 168 | 0.05 |
|   | UV Concentrate | 1.00 |

Figure 21:
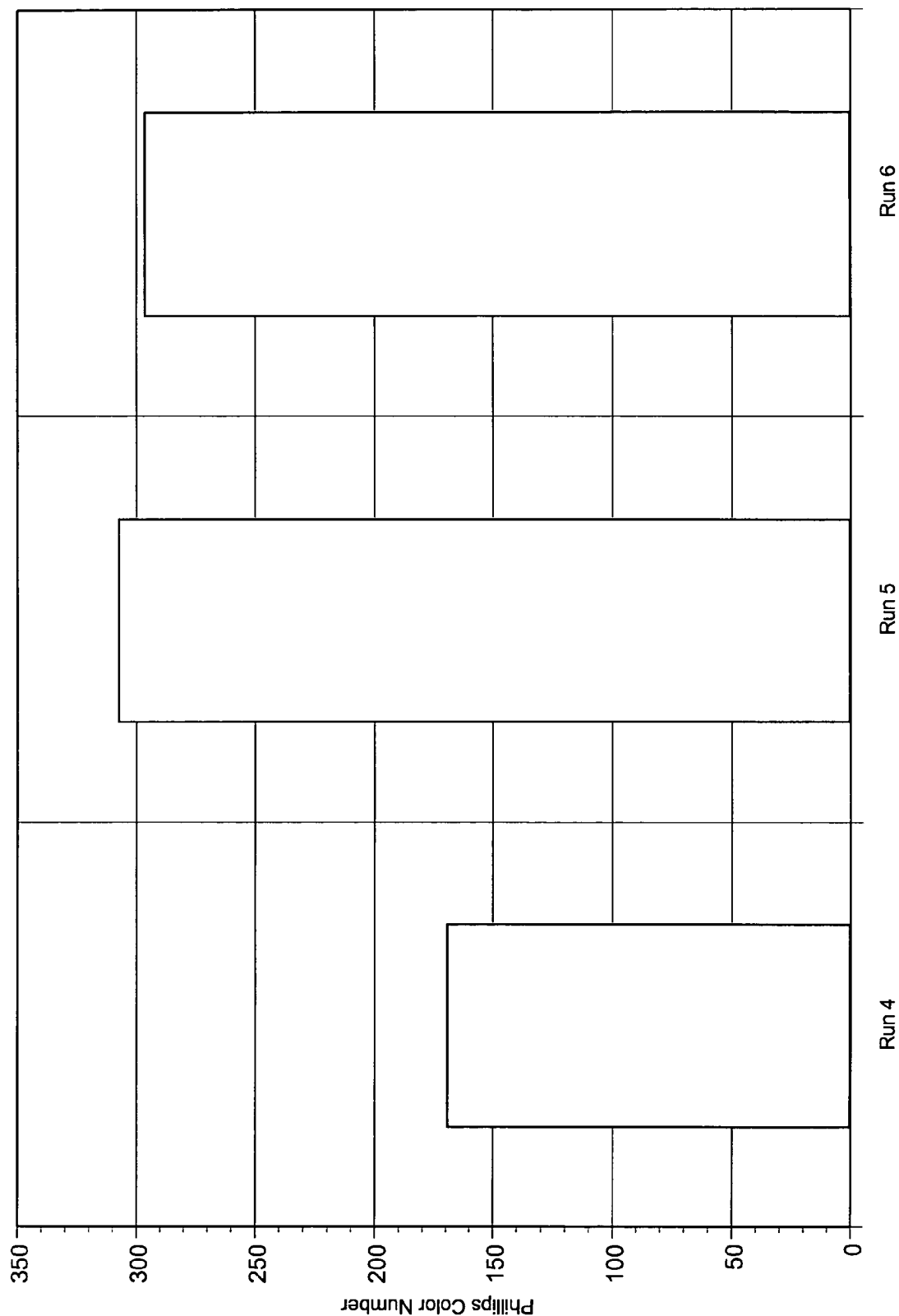
FIG. 21 compares the effect of the addition of a UV concentrate on the Phillips Polyethylene Color Number for various compositions.
Figure 22:
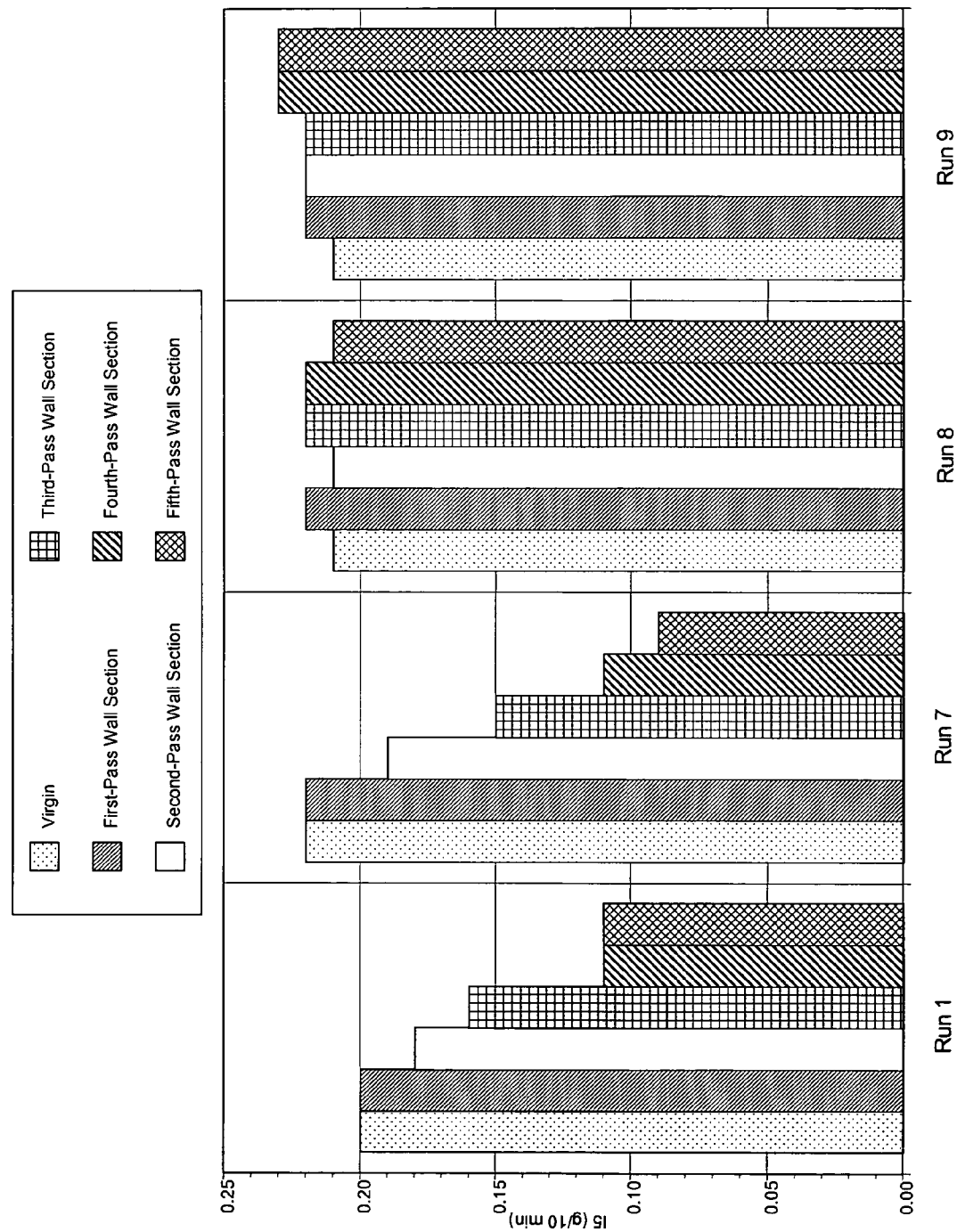
FIG. 22 compares the effect of regrind on $I_5$ for various compositions.
Figure 23:
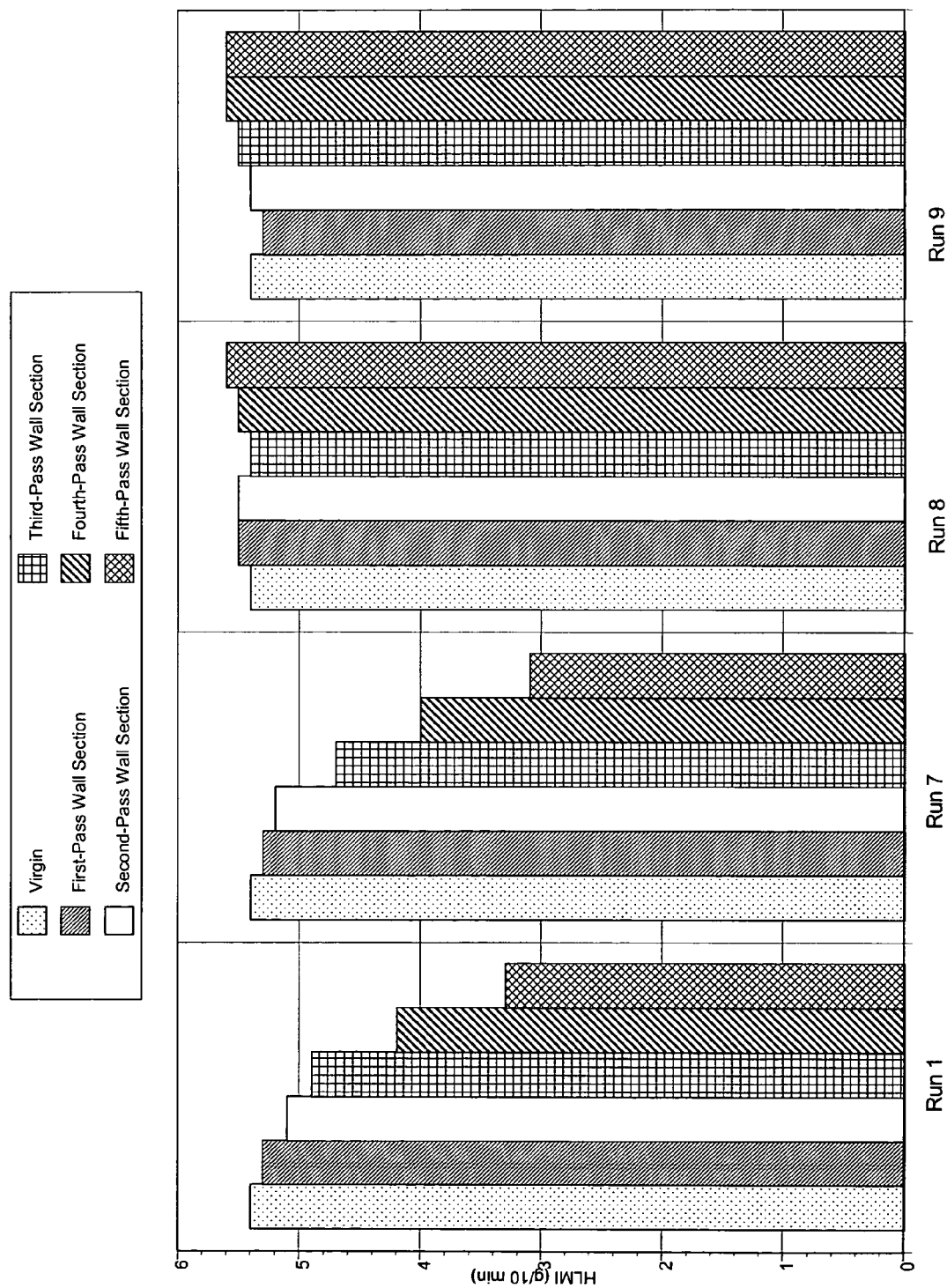
FIG. 23 compares the effect of regrind on HLMI for various compositions.
Figure 24:
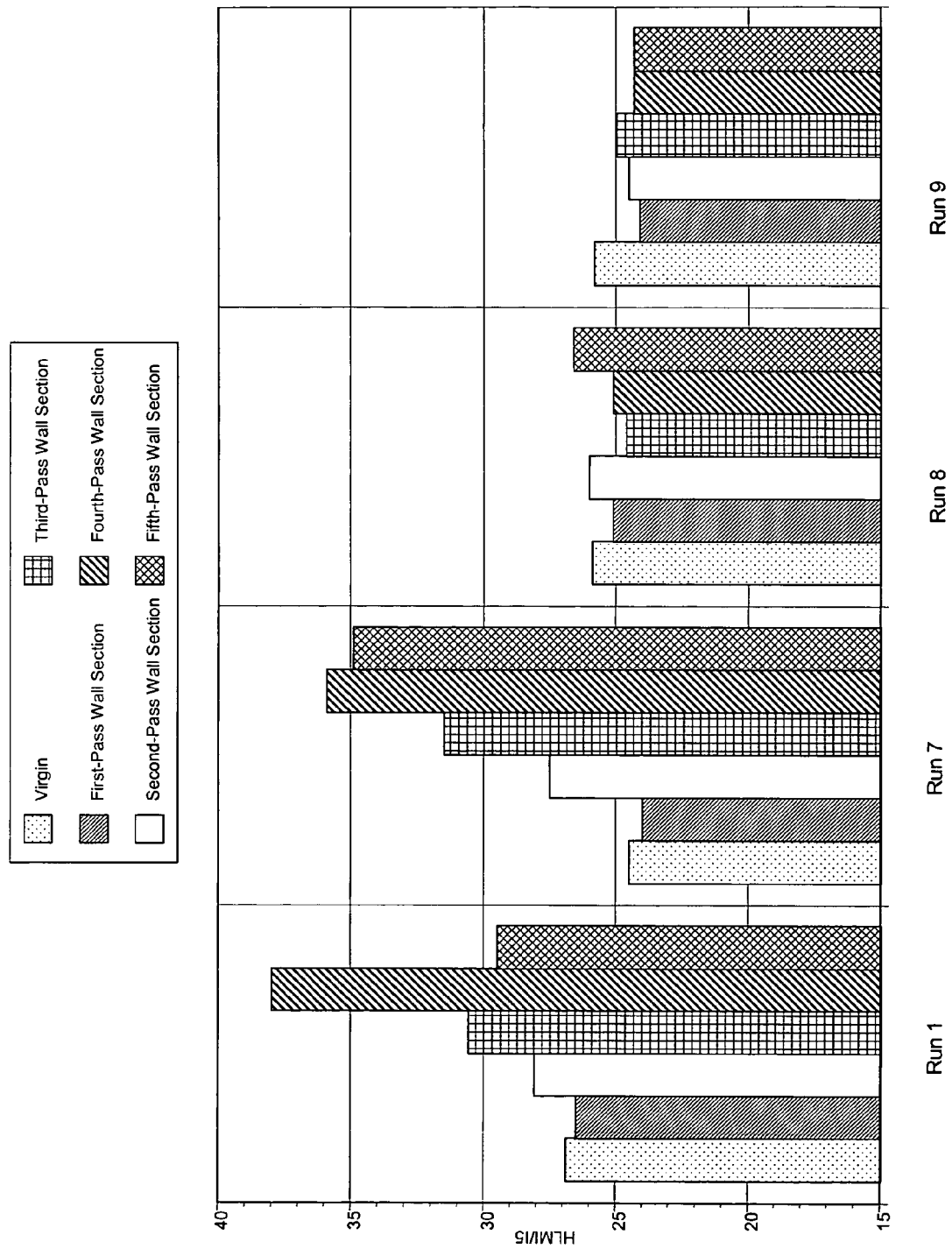
FIG. 24 compares the effect of regrind on HLMI/$I_5$ for various compositions.
Figure 25:
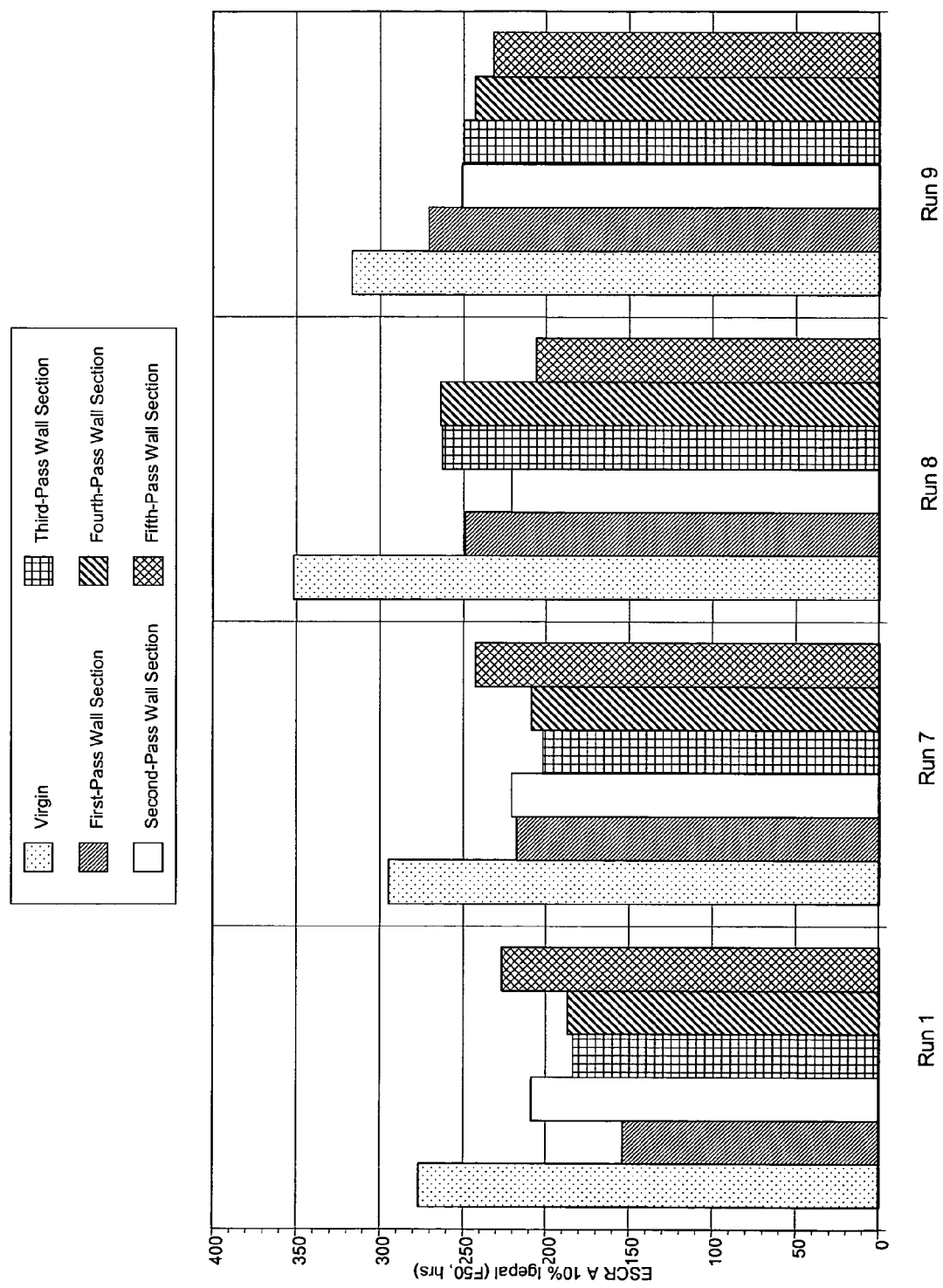
FIG. 25 compares the effect of regrind on ESCR A for various compositions.
Figure 26:
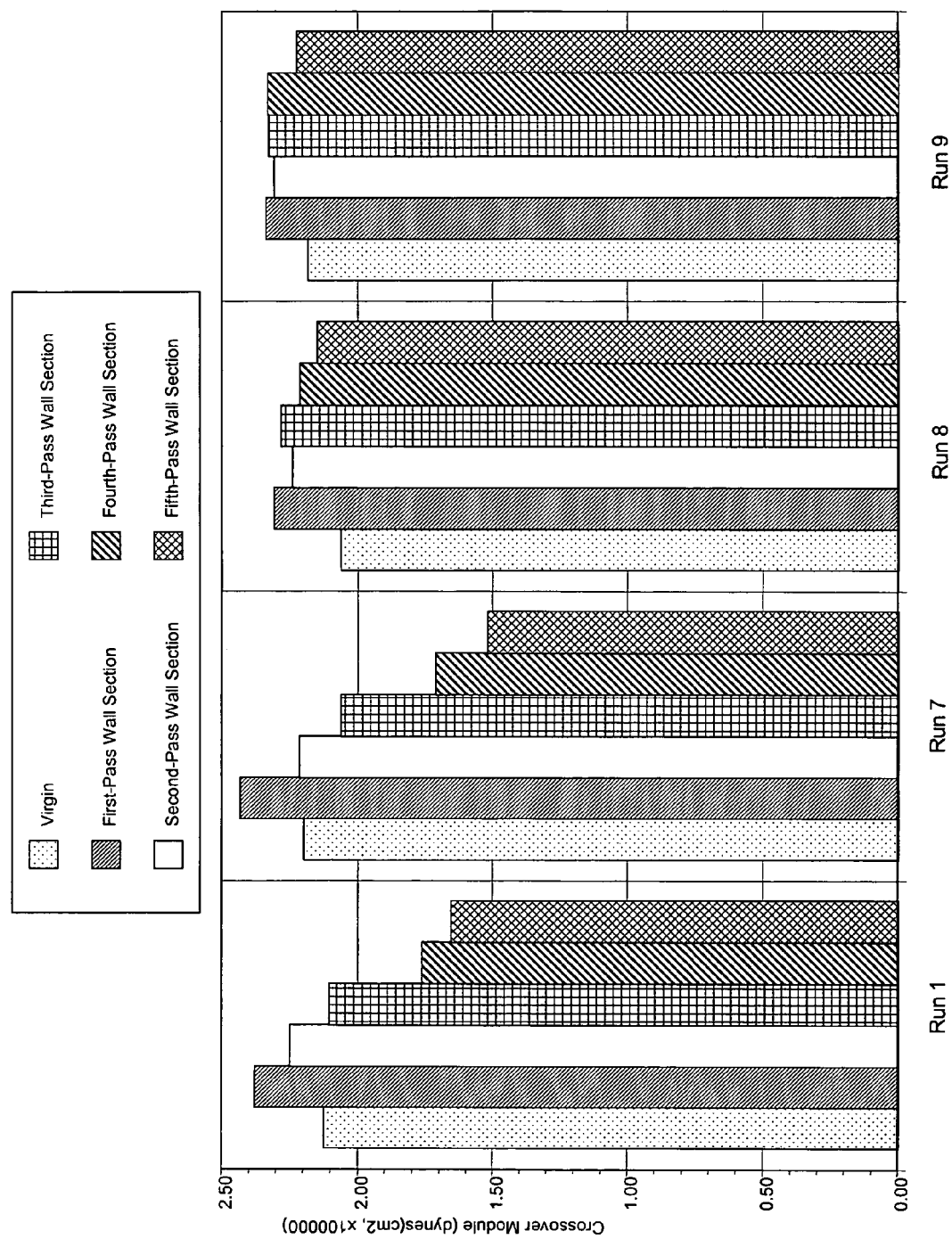
FIG. 26 compares the effect of regrind on crossover modulus for various compositions.
Figure 27:
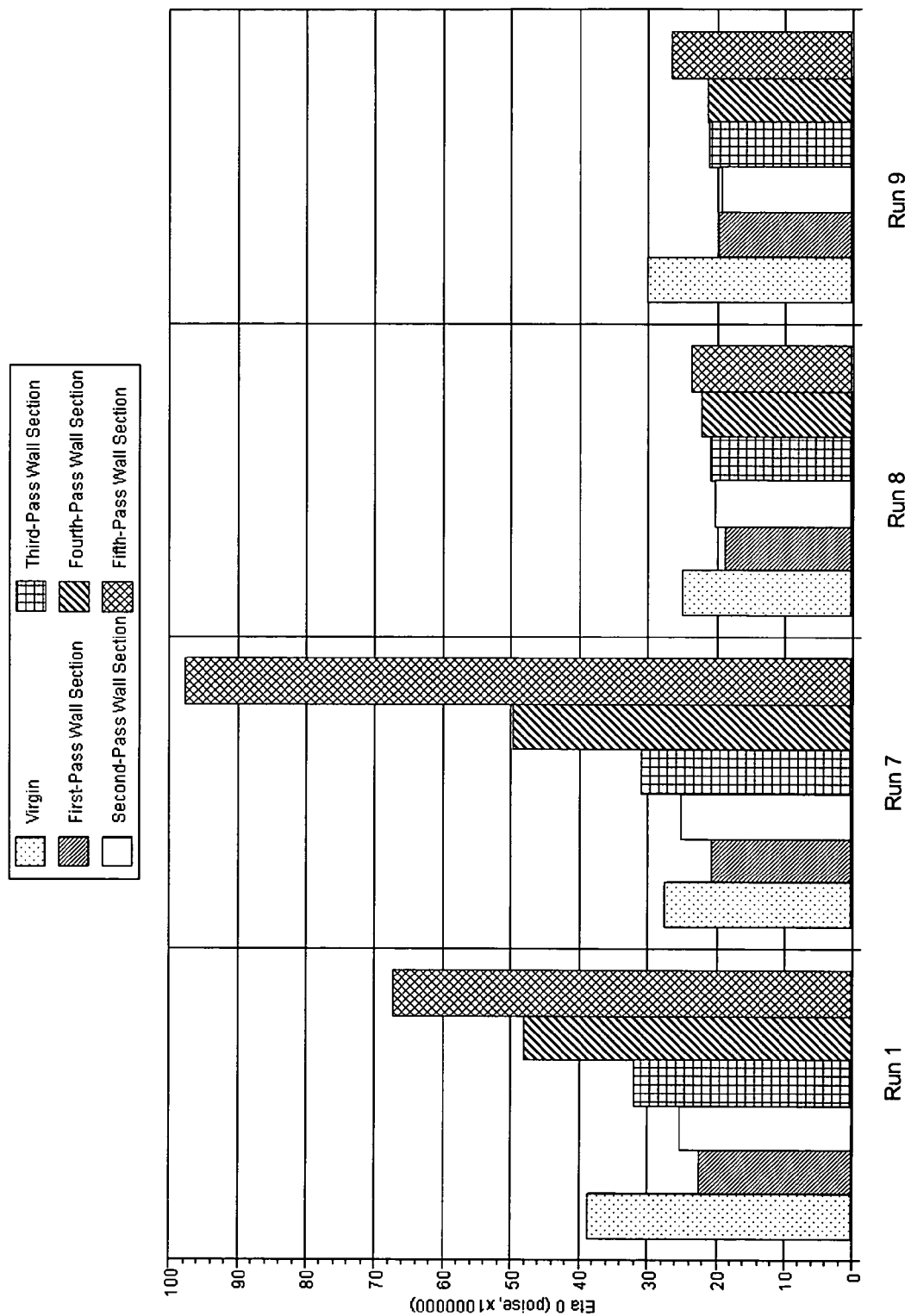
FIG. 27 compares the effect of regrind on Eta (0), zero shear viscosity, for various compositions.
Figure 28:
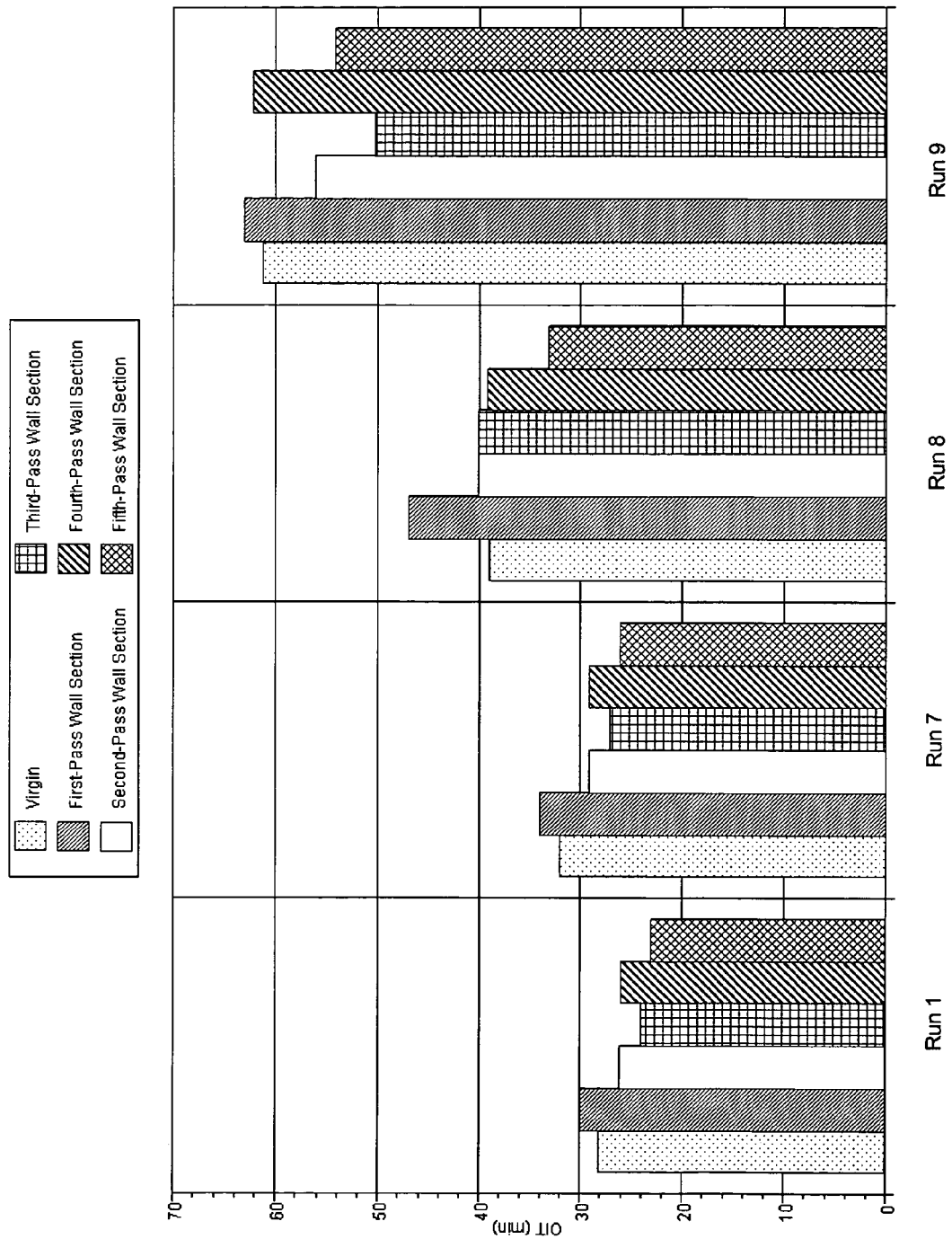
FIG. 28 compares the effect of regrind on OIT for various compositions.
Figure 29:
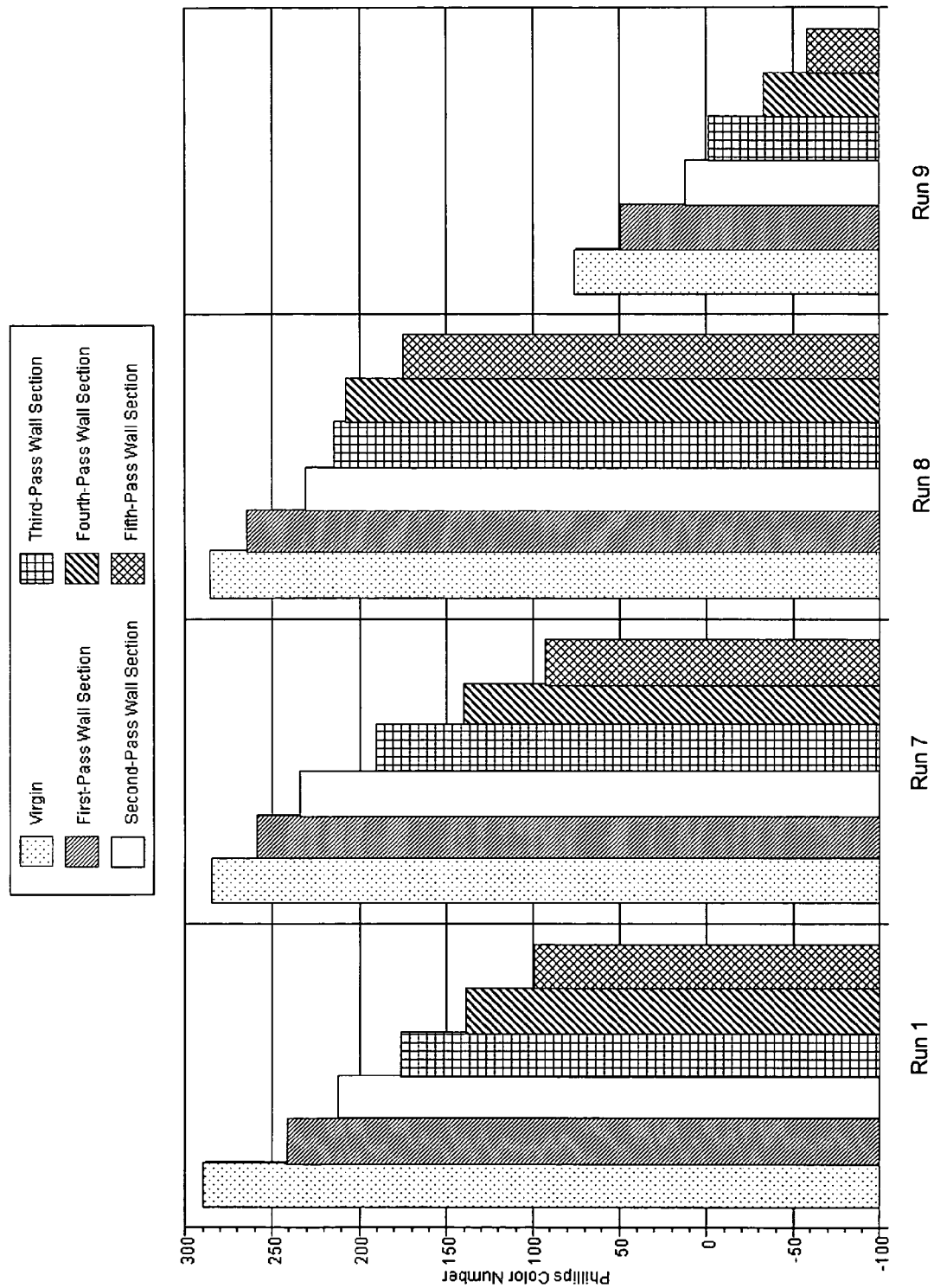
FIG. 29 compares the effect of regrind on the Phillips Polyethylene Color Number for various compositions.

The effects of regrind or multi-pass on various physical properties were evaluated. The results of these evaluations are reported in FIGS. 1–20. As indicated in these figures, the compositions made in accordance with the present invention showed improved and/or enhanced stability. The effects of the addition of a UV concentrate or stabilizer on the PE # was evaluated and reported in FIG. 21. As indicated, compositions made in accordance with the present invention showed improved color stability.

Examples 7–12

The following compositions were prepared and evaluated as described above. Run 1 was employed as a control composition for comparison to Runs 7–9, and Run 4 was employed as a control composition for comparison to Runs 10–12.

| Run Number | Additive | Amount in Composition (wt. %) |
|---|---|---|
| 7 | Irganox 1010 | 0.07 |
|   | Doverphos S-9228 | 0.10 |
|   | DHT-4A | 0.01 |
| 8 | Irganox 1010 | 0.07 |
|   | Doverphos S-9228 | 0.05 |
|   | Irgafos 168 | 0.05 |
|   | DHT-4A | 0.01 |
| 9 | Irganox 1010 | 0.05 |
|   | Irgafos 168 | 0.15 |
| 10 | Irganox 1010 | 0.07 |
|   | Doverphos S-9228 | 0.10 |
|   | DHT-4A | 0.01 |
|   | UV Concentrate | 1.00 |
| 11 | Irganox 1010 | 0.07 |
|   | Doverphos S-9228 | 0.05 |
|   | Irgafos 168 | 0.05 |
|   | DHT-4A | 0.01 |
|   | UV Concentrate | 1.00 |
| 12 | Irganox 1010 | 0.05 |
|   | Irgafos 168 | 0.15 |
|   | UV Concentrate | 1.00 |

Figure 30:
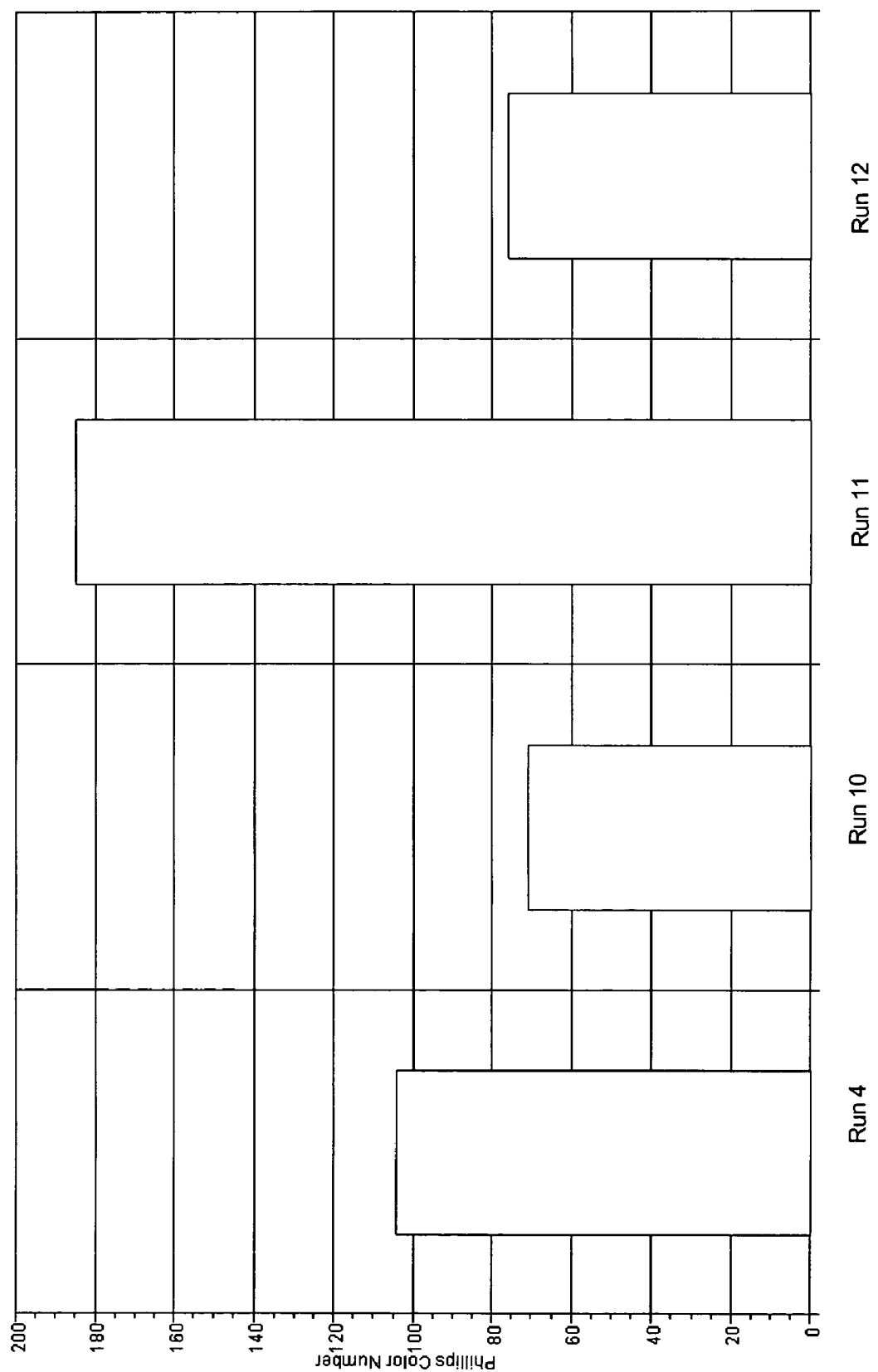
FIG. 30 compares the effect of the addition of a UV concentrate on the Phillips Color Number for various compositions.

The effects of regrind or multi-pass on various physical properties were evaluated. The results of these evaluations are reported in FIGS. 22–29. As indicated in these figures, the compositions made in accordance with the present invention showed improved and/or enhanced stability. The effects of the addition of a UV concentrate or stabilizer on the PE # was evaluated and reported in FIG. 30. As indicated, compositions made in accordance with the present invention showed improved color.

While this invention has been described in detail for the purpose of illustration, it is not to be construed as limited thereby but is intended to cover all changes and modifications within the spirit and scope thereof.

That which is claimed is:

1. A composition formed by combining components comprising:
   a) a polyolefin;
   b) at least one high activity phosphite comprising an arylalkyl diphosphite having a formula,

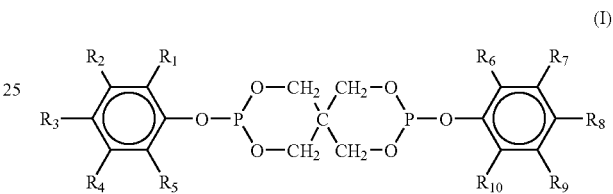

(I)

wherein $R_1$, $R_2$, $R_3$, $R_4$, $R_5$, $R_6$, $R_7$, $R_8$, $R_9$, and $R_{10}$ can be the same or different and are selected from hydrogen or straight-chained, branched, cyclic, acyclic, aromatic, aliphatic, mixed aliphatic, or cycloaliphatic organic radicals having from about 1 to about 20 carbon atoms per radical;

c) at least one hydrolytically stable phosphite comprising a triarylphosphite having a formula:

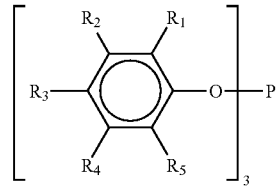

wherein $R_1$, $R_2$, $R_3$, $R_4$, and $R_5$, are selected from hydrogen or straight-chained, branched, cyclic, acyclic, aromatic, aliphatic, mixed aliphatic, or cycloaliphatic organic radicals having from about 1 to about 20 carbon atoms per radical;

d) optionally, a primary polymer stabilizer;
e) optionally, an acid scavenger;
f) optionally, an inorganic base, Lewis base, or aliphatic amine;
g) optionally, water; and
h) optionally, a hindered amine, wherein the at least one high activity phosphite and the at least one hydrolytically stable phosphite are present in the composition in respective amounts sufficient to raise the Phillips Color Number (PE #) with processing to a value greater than the PE # of a composition formed by combining like amounts of the polyolefin, the high activity phosphate, a hindered phenol, water, and an acid scavenger.

2. The composition according to claim 1, further comprising an ultraviolet absorber or light stabilizer.

3. The composition according to claim 2, wherein the ultraviolet absorber or light stabilizer is a 2-(2'-Hydroxyphenyl)-benzotriazole; a 2-Hydroxy-benzophenone; an ester of substituted and unsubstituted benzoic acids; an acrylate; a nickel compound; a hindered amine; an oxalic acid diamide; or any mixture thereof.

4. The composition according to claim 3, wherein the hindered amines are bis-(2,2,6,6-tetramethylpiperidyl)-sebacate; bis-(1,2,2,6,6-pentamethylpiperidyl)-sebacate; n-butyl-3,5-di-t-butyl-4-hydroxybenzyl malonic acid bis-(1,2,2,6,6-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylendiamine and 4-t-octylamino-2,6-dichloro-1,3,5-s-triazine; tris-(2,2,6,6-tetramethylpiperidyl)-nitrilotriacetate; tetrakis-(2,2,6,6-tetramethyl-4-piperidyl)-1,2,3,5-butane-tetracarbonic acid; 1,1'-(1,2-ethanediyl)-bis-(3,3,5,5-tetramethylpiperazinone); di-(1-hydroxy-2,2,6,6-tetramethylpiperidin-4-yl)sebacate; 1-hydroxy-2,2,6,6-tetramethyl-4-benzoxypiperidine; 1-hydroxy-2,2,6,6-tetramethyl-4(3,5-di-t-butyl-4hydroxyhydrocinnamoyloxy)piperidine; N-(1-hydroxy-2,2,6,6-tetramethylpiperidin-4-yl)-ϵ-caprolactam, or any mixture thereof.

5. The composition according to claim 1, wherein the polyolefin is a homopolymer of one mono-1-olefin having from about 2 to about 10 carbon atoms per molecule or a copolymer of at least 2 different mono-1-olefins having about 2 to about 10 carbon atoms per molecule.

6. The composition according to claim 1, wherein the polyolefin is an ethylene homopolymer.

7. The composition according to claim 1, wherein the polyolefin is a copolymer of ethylene and a higher alpha-olefin comonomer having from about 3 to about 16 carbon atoms per molecule.

8. The composition according to claim 1, wherein the comonomer is present in the polyolefin within a range of about 1 to about 20 weight percent comonomer based on the total weight of the copolymer.

9. The composition according to claim 1, wherein the polyolefin is prepared in the presence of an inorganic oxide supported chromium oxide catalyst system.

10. The composition according to claim 6, wherein the inorganic oxide of the inorganic oxide supported chromium catalyst system is a silica-titania support.

11. The composition according to claim 7, wherein the polyolefin contains from about 1 mg/kg to about 10 mg/kg, based on the mass of the neat polyolefin, titania catalyst residue calculated as titanium.

12. The composition according to claim 1, wherein the polyolefin is prepared in the presence of a transition metal halide catalyst system.

13. The composition according to claim 1, wherein the polyolefin is prepared in the presence of a catalyst system comprising a metallocene.

14. The composition according to claim 1, wherein $R_2$, $R_4$, $R_5$, $R_7$, $R_9$, and $R_{10}$ in the high activity phosphite are hydrogen and $R_2$, $R_3$, $R_6$, and $R_8$ are mixed aliphatic and aromatic organic radicals having from about 1 to about 20 carbon atoms per radical.

15. The composition according to claim 1, wherein the high activity phosphite is bis(2,4-dicumylphenyl)pentaerythritol disphosphite.

16. The composition according to claim 1, wherein the high activity phosphite is bis(2,4-di-tert-butylphenyl)pentaerythritol disphosphite.

17. The composition according to claim 1, wherein $R_2$, $R_4$, $R_5$, $R_7$, $R_9$, and $R_{10}$ in the second arylalkyl diphosphite are hydrogen and $R_1$, $R_3$, $R_6$, and $R_8$ are selected from straight-chained or branched organic radicals having from about 1 to about 20 carbon atoms per radical.

18. The composition according to claim 1, wherein the another arylalkyl diphosphite is bis(2,4-di-tert-butylphenyl) pentaerythritol diphosphite.

19. The composition according to claim 1, wherein the another arylalkyl diphosphite is bis(2,4-dicumylphenyl)pentaerythritol diphosphite.

20. The composition according to claim 1, wherein $R_2$, $R_4$, and $R_5$ in the triarylphosphite are hydrogen and $R_1$ and $R_3$ are selected from straight-chained or branched organic radicals having from about 1 to about 20 carbon atoms per radical.

21. The composition according to claim 1, wherein the triarylphosphite is tris(2,4-di-tert-butylphenyl)phosphite.

22. The composition according to claim 1, wherein the high activity phosphite and the hydrolytically stable phosphite are present in a total phosphite amount within a range of about 50 mg/kg to about 20,000 mg/kg based on the mass of the neat polyolefin.

23. The composition according to claim 1, wherein the high activity phosphite and the hydrolytically stable phosphite are present in a total phosphite amount within a range of 100 mg/kg to 1,500 mg/kg based on the mass of the neat polyolefin.

24. The composition according to claim 1, wherein the high activity phosphite and the hydrolytically stable phosphite are present in a total phosphite amount within a range of 100 mg/kg to 1,200 mg/kg based on the mass of the neat polyolefin.

25. The composition according to claim 1, wherein the hydrolytically stable phosphite is present in an amount within a range of about 2% to about 90% by weight of the total amount of the high activity phosphite and the hydrolytically stable phosphite added to the neat polyolefin.

26. The composition according to claim 1, wherein the hydrolytically stable phosphite is present in an amount within a range of about 10% to about 60% by weight of the total amount of the high activity phosphite and the hydrolytically stable phosphite added to the neat polyolefin.

27. The composition according to claim 1, wherein the primary polymer stabilizer is a hindered phenol selected from monophenols, bisphenols, thiobisphenols, polyphenols, hydroxybenzyl aromates, amides of β-(3,5-ditert-butyl-4-hydroxyphenyl)-propionic acid, esters of β-(3,5-di-tert-butyl-4hydroxyphenyl)-propionic acid with mono- or polyvalent alcohols, spiro compounds, or any mixture thereof.

28. The composition according to claim 1, wherein the primary polymer stabilizer is a hindered phenol selected from tetrakis(methylene 3(3,5-di-t-butyl-4-hydroxyphenyl) propionate)methane; 1,3,5-tri-(3,5-di-tert-butyl-4-hydroxybenzyl)-2,4,6-trimethylbenzene; β-(3,5-di-tert-butyl-4hydroxyphenyl)-propionic acid-n-octadecyl ester; 2,6-di-tert-butyl-4-methylphenol; 3,9-bis-[1,1-dimethyl-2-(3,5-di-tert-butyl-4-hydroxy-phenyl)-ethyl]2,4,8,10-tetraoxaspiro-[5,5]-undecane; or any mixture thereof.

29. The composition according to claim 1, wherein the primary polymer stabilizer is tetrakis[methylene(3,5-di-tert-butyl-4hydroxyhydrocinnamate)]methane.

30. The composition according to claim 1, wherein the primary polymer stabilizer is present in an amount less than about 5000 mg/kg based on the mass of the neat polyolefin.

31. The composition according to claim 1, wherein the primary polymer stabilizer is present in an amount within a range of about 50 mg/kg to about 2500 mg/kg based on the mass of the neat polyolefin.

32. The composition according to claim 1, wherein water is present in an amount up to about 5000 mg/kg based on the mass of the neat polyolefin.

33. The composition matter according to claim 1, wherein water is present in an amount up to 1000 mg/kg based on the mass of the neat polyolefin.

34. The composition according to claim 1, wherein the water has a pH within a range of about 4 to about 10.

35. The composition according to claim 1, wherein the water has a pH within a range of about 6 to about 8.

36. The composition according to claim 4, wherein the hindered amine is present in an amount within a range of about 50 mg/kg to about 5000 mg/kg based on the mass of the neat polyolefin.

37. The composition according to claim 1, wherein the aliphatic amine is triisopropanolamine and triisopropanolamine is present in an amount within a range of about 0.25 mg/kg to about 100 mg/kg based on the mass of the neat polyolefin.

38. A composition formed by combining components comprising:
a) a polyolefin selected from homopolymers of one mono-1-olefin having from about 2 to about 10 carbon atoms per molecule or copolymers of at least 2 different mono-1-olefins having about 2 to about 10 carbon atoms per molecule;
b) a high activity phosphite comprising an arylalkyl diphosphite having a formula,

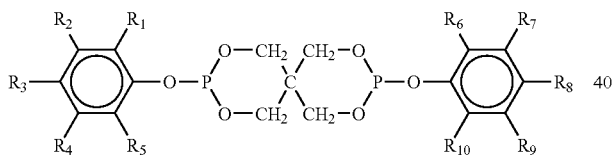
(I)

wherein $R_2$, $R_4$, $R_5$, $R_7$, $R_9$, and $R_{10}$ are hydrogen and $R_1$, $R_3$, $R_6$, and $R_8$ are mixed aliphatic and aromatic organic radicals having from about 1 to about 20 carbon atoms per radical;
c) a hydrolytically stable phosphite comprising a triarylphosphite having a formula,

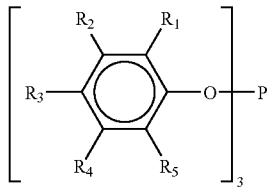

wherein $R_2$, $R_4$, and $R_5$ in the triarylphosphite are hydrogen and $R_1$ and $R_3$ are selected from straight-chained or branched organic radicals having from about 1 to about 20 carbon atoms per radical, the high activity phosphite and the hydrolytically stable phosphite being present in a total phosphite amount within a range of about 50 mg/kg to about 20,000 mg/kg based on the mass of the neat polyolefin;
d) optionally, another arylalkyl diphosphite of formula (I), wherein $R_2$, $R_4$, $R_5$, $R_7$, $R_9$, and $R_{10}$ in the another arylalkyl diphosphite are hydrogen and $R_1$, $R_3$, $R_6$, and $R_8$ are selected from straight-chained or branched organic radicals having from about 1 to about 20 carbon atoms per radical;
e) optionally, a hindered phenol in an amount within a range of about 50 mg/kg to about 5000 mg/kg based on the mass of the neat polyolefin;
f) optionally, water in an amount within a range of 1 mg/kg to about 5000 mg/kg based on the mass of the neat polyolefin;
g) optionally, a hindered amine in an amount within a range of about 50 mg/kg to about 5,000 mg/kg based on the mass of the neat polyolefin;
h) triisopropanolamine in an amount within a range of about 0.25 mg/kg to about 100 mg/kg based on the mass of the neat polyolefin; and
i) optionally, a acid scavenger in an amount within a range of about 1.25 mg/kg to about 500 mg/kg based on the mass of the neat polyolefin.

39. The composition according to claim 38, wherein the high activity phosphite and the hydrolytically stable phosphite are present in a total phosphite amount within a range of 1 mg/kg to 1,500 mg/kg based on the mass of the neat polyolefin.

40. The composition according to claim 38, wherein the high activity phosphite and the hydrolytically stable phosphite are present in a total phosphite amount within a range of 1 mg/kg to 1,200 mg/kg based on the mass of the neat polyolefin.

41. A process comprising blending:
a) a polyolefin;
b) a high activity phosphite comprising an arylalkyl diphosphite having a formula,

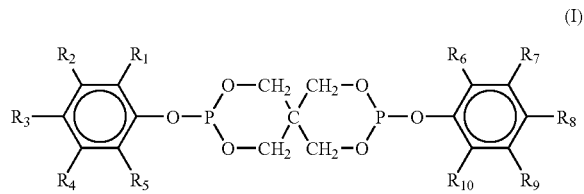
(I)

wherein $R_1$, $R_2$, $R_3$, $R_4$, $R_5$, $R_6$, $R_7$, $R_8$, $R_9$, and $R_{10}$ can be the same or different and are selected from hydrogen or straight chained, branched, cyclic, acyclic, aromatic, aliphatic, mixed aliphatic, or cycloaliphatic organic radicals having from about 1 to about 20 carbon atoms per radical;
c) a hydrolytically stable phosphite comprising a triarylphosphite having a formula,

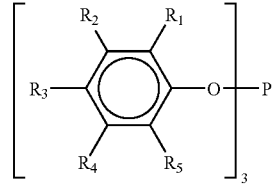

wherein $R_1$, $R_2$, $R_3$, $R_4$, and $R_5$ are selected from hydrogen or straight chained, branched, cyclic, acyclic, aromatic, aliphatic, mixed aliphatic, or cycloaliphatic organic radicals having from about 1 to about 20 carbon atoms per radical;

d) optionally, another arylalkyl diphosphite of formula (I), wherein $R_1$, $R_2$, $R_3$, $R_4$, $R_5$, $R_6$, $R_7$, $R_8$, $R_9$, and $R_{10}$ can be the same or different and are selected from hydrogen or straight-chained, or branched, cyclic, acyclic, aromatic, aliphatic, mixed aliphatic, or cycloaliphatic organic radicals having from about 1 to about 20 carbon atoms per radical, which is different from the high activity phosphite;

e) optionally, a hindered phenol;
f) optionally, water;
g) triisopropanolamine;
h) optionally, an acid scavenger; and
i) optionally, a hindered amine.

42. A process according to claim 41, wherein the blending procedure is selected from mixing, pelletizing, extruding, or mixtures thereof.

43. A process to improve the melt stability upon recycle of a polyolefin comprising blending:
a) a polyolefin;
b) a high activity phosphite comprising an arylalkyl diphosphite having a formula,

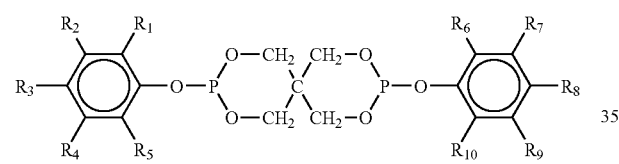

(I)

wherein $R_1$, $R_2$, $R_3$, $R_4$, $R_5$, $R_6$, $R_7$, $R_8$, $R_9$, and $R_{10}$ can be the same or different and are selected from the group consisting of hydrogen or straight-chained, branched, cyclic, acyclic, aromatic, aliphatic, mixed aliphatic, or cycloaliphatic organic radicals having from about 1 to about 20 carbon atoms per radical;

c) a hydrolytically stable phosphite comprising a triarylphosphite having a formula,

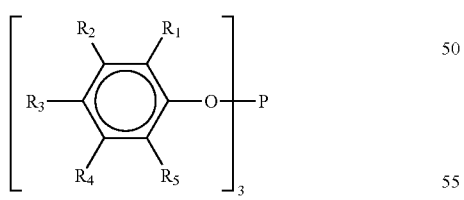

wherein $R_1$, $R_2$, $R_3$, $R_4$, and $R_5$ are selected from hydrogen or straight-chained, branched, cyclic, acyclic, aromatic, aliphatic, mixed aliphatic, or cycloaliphatic organic radicals having from about 1 to about 20 carbon atoms per radical;

d) optionally, another arylalkyl diphosphite of formula (I), wherein $R_1$, $R_2$, $R_3$, $R_4$, $R_5$, $R_6$, $R_7$, $R_8$, $R_9$, and $R_{10}$ can be the same or different and are selected from hydrogen or straight-chained, branched, cyclic, acyclic, aromatic, aliphatic, mixed aliphatic, or cycloaliphatic organic radicals having from about 1 to about 20 carbon atoms per radical, which is different from the high activity phosphite;

e) optionally, a hindered amine in an amount within the range of about 50 mg/kg to about 5,000 mg/kg based on the mass of the neat polyolefin;

f) triisopropanolamine in an amount within the range of about 0.5 mg/kg to about 50 mg/kg based on the mass of the neat polyolefin;

g) optionally, a hindered phenol;
h) optionally, water; and
i) optionally, an acid scavenger.

44. An article of manufacture prepared from a polymer produced by a process comprising blending:
a) a polyolefin;
b) a high activity phosphite comprising an arylalkyl diphosphite having a formula,

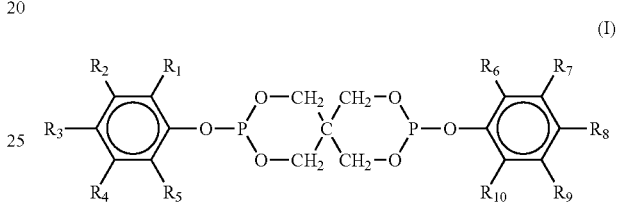

(I)

wherein $R_1$, $R_2$, $R_3$, $R_4$, $R_5$, $R_6$, $R_7$, $R_8$, $R_9$, and $R_{10}$ can be the same or different and are selected from hydrogen or straight-chained, branched, cyclic, acyclic, aromatic, aliphatic, mixed aliphatic, or cycloaliphatic organic radicals having from about 1 to about 20 carbon atoms per radical;

c) a hydrolytically stable phosphite comprising a triarylphosphite having a formula,

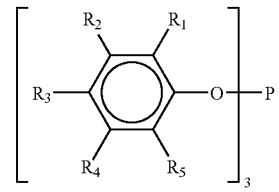

wherein $R_1$, $R^2$, $R^3$, $R^4$, and $R^5$ are selected from hydrogen or straight-chained, branched, cyclic, acyclic, aromatic, aliphatic, mixed aliphatic, or cycloaliphatic organic radicals having from about 1 to about 20 carbon atoms per radical;

d) optionally, a second arylalkyl diphosphite of formula (I), wherein $R_1$, $R_2$, $R_3$, $R_4$, $R_5$, $R_6$, $R_7$, $R_8$, $R_9$, and $R_{10}$ can be the same or different and are selected from hydrogen or straight-chained, branched, cyclic, acyclic, aromatic, aliphatic, mixed aliphatic, or cycloaliphatic organic radicals having from about 1 to about 20 carbon atoms per radical, which is different from the high activity phosphite;

e) optionally, a hindered amine in an amount within a range of about 50 mg/kg to about 5,000 mg/kg based on the mass of the neat polyolefin;

f) triisopropanolamine in an amount within a range of about 0.25 mg/kg to about 100 mg/kg based on the mass of the neat polyolefin;

g) optionally, a hindered phenol;
h) optionally, water; and
i) optionally, an acid scavenger.

45. A process to improve the Phillips color number of whiteness index of a polyolefin comprising blending:

a) a polyolefin;
b) a high activity phosphite comprising an arylalkyl diphosphite having a formula,

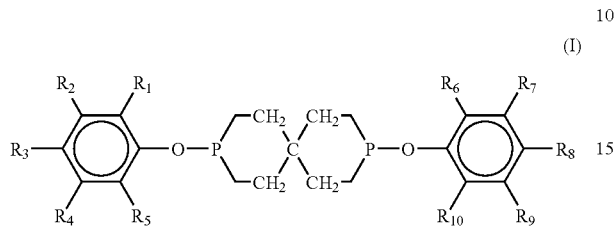
(I)

wherein $R_1$, $R_2$, $R_3$, $R_4$, $R_5$, $R_6$, $R_7$, $R_8$, $R_9$, and $R_{10}$ can be the same or different and are selected from hydrogen or straight-chained, branched, cyclic, acyclic, aromatic, aliphatic, mixed aliphatic, or cycloaliphatic organic radicals having from about 1 to about 20 carbon atoms per radical;

c) a hydrolytically stable phosphite comprising a triarylphosphite having a formula,

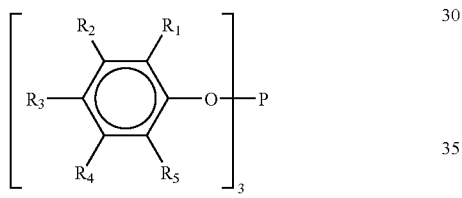

wherein $R_1$, $R_2$, $R_3$, $R_4$, and $R_5$ are selected from hydrogen or straight-chained, branched, cyclic, acyclic, aromatic, aliphatic, mixed aliphatic, or cycloaliphatic organic radicals having from about 1 to about 20 carbon atoms per radical;

d) optionally, another arylalkyl diphosphite of formula (I), wherein $R_1$, $R_2$, $R_3$, $R_4$, $R_5$, $R_6$, $R_7$, $R_8$, $R_9$, and $R_{10}$ can be the same or different and are selected from hydrogen or straight-chained, branched, cyclic, acyclic, aromatic, aliphatic, mixed aliphatic, or cycloaliphatic organic radicals having from about 1 to about 20 carbon atoms per radical, which is different from the high activity phosphite;

e) optionally, a hindered amine in an amount within a range of about 50 mg/kg to about 5,000 mg/kg based on the mass of the neat polyolefin;

f) triisopropanol amine in an amount within a range of about 0.25 mg/kg to about 100 mg/kg based on the mass of the neat polyolefin;

g) optionally, a hindered phenol;
h) optionally, water; and
i) optionally, an acid scavenger.

46. A kit comprising:

a) at least one high activity phosphite comprising an arylalkyl diphosphite having a formula,

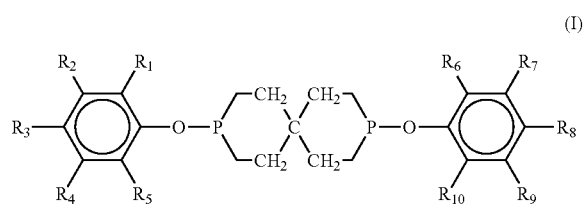
(I)

wherein $R_1$, $R_2$, $R_3$, $R_4$, $R_5$, $R_6$, $R_7$, $R_8$, $R_9$, and $R_{10}$ can be the same or different and are selected from hydrogen or straight-chained, branched, cyclic, acyclic, aromatic, aliphatic, mixed aliphatic, cycloaliphatic organic radicals having from about 1 to about 20 carbon atoms per radical;

b) at least one hydrolytically stable phosphite comprising a triarylphosphite having a formula:

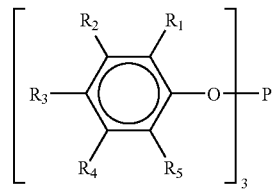

wherein $R_1$, $R_2$, $R_3$, $R_4$, and $R_5$, are selected from hydrogen or straight-chained, branched, cyclic, acyclic, aromatic, aliphatic, mixed aliphatic, cycloaliphatic organic radicals having from about 1 to about 20 carbon atoms per radical; and c) triisopropanol amine.

47. The kit according to claim 46, wherein the at least one high activity phosphite and the at least one hydrolytically stable phosphite are in a mixture with one another.

48. The kit according to claim 46, wherein the at least one high activity phosphite and the at least one hydrolytically stable phosphite are separate from one another.

49. The kit according to claim 48, wherein the at least one high activity phosphite comprises a plurality of high activity phosphites and each such phosphite is separate from one another.

50. The kit according to claim 48, wherein the at least one hydrolytically stable phosphite comprises a plurality of hydrolytically stable phosphites and each such phosphite is separate from one another.

* * * * *